US012789226B2

(12) United States Patent
Izuta et al.

(10) Patent No.: US 12,789,226 B2
(45) Date of Patent: Nov. 10, 2026

(54) SUBSTRATE PROCESSING METHOD AND SUBSTRATE PROCESSING APPARATUS

(71) Applicant: SCREEN Holdings Co., Ltd., Kyoto (JP)

(72) Inventors: Takashi Izuta, Kyoto (JP); Hiroki Tajiri, Kyoto (JP); Masayuki Orisaka, Kyoto (JP)

(73) Assignee: SCREEN Holdings Co., Ltd. (JP)

(*) Notice: Subject to any disclaimer, the term of this patent is extended or adjusted under 35 U.S.C. 154(b) by 753 days.

(21) Appl. No.: 17/947,747

(22) Filed: Sep. 19, 2022

(65) Prior Publication Data

US 2023/0101475 A1 Mar. 30, 2023

(30) Foreign Application Priority Data

Sep. 22, 2021 (JP) ................................ 2021-154888
Jan. 28, 2022 (JP) ................................ 2022-011613

(51) Int. Cl.
*B05D 1/18* (2006.01)
*B05C 3/04* (2006.01)
*B05C 11/10* (2006.01)

(52) U.S. Cl.
CPC .................. *B05D 1/18* (2013.01); *B05C 3/04* (2013.01); *B05C 11/1013* (2013.01)

(58) Field of Classification Search
None
See application file for complete search history.

(56) References Cited

U.S. PATENT DOCUMENTS 5,875,804 A 3/1999 Tanaka et al. ................ 134/182
5,911,837 A * 6/1999 Matthews ......... H01L 21/67028 134/25.4
6,013,156 A * 1/2000 Holbrook .......... H01L 21/67253 156/345.15
6,656,321 B2 * 12/2003 Furukawa ............... C03C 15/00 156/345.11

(Continued)

FOREIGN PATENT DOCUMENTS

CN 111430270 A 7/2020
CN 113257661 A 8/2021

(Continued)

OTHER PUBLICATIONS

Machine Generated English Translation of the description of JP2020136679A . Published Aug. 31, 2020 (Year: 2020).*

(Continued)

*Primary Examiner* — Sylvia Macarthur

(74) *Attorney, Agent, or Firm* — OSTROLENK FABER LLP

(57) ABSTRACT

A substrate processing method is executed by a substrate processing apparatus. The substrate processing apparatus includes a processing tank, and a bubble supply pipe disposed in the processing tank. In the substrate processing (Continued)

method, a substrate holding section immerses a substrate in an alkaline processing liquid stored in the processing tank. A bubble supply section supplies bubbles to the alkaline processing liquid from below the substrate with the substrate immersed in the alkaline processing liquid, the bubbles being supplied from a plurality of bubble holes provided in the bubble supply pipe.

15 Claims, 21 Drawing Sheets

(56) References Cited

U.S. PATENT DOCUMENTS

| | | | | |
|---|---|---|---|---|
| 6,681,781 | B2 * | 1/2004 | Puri | B08B 3/12 257/E21.228 |
| 8,152,928 | B2 | 4/2012 | Watanabe et al. | 134/1 |
| 9,278,857 | B2 | 3/2016 | Park et al. | |
| 9,610,712 | B2 | 4/2017 | Park et al. | |
| 10,828,666 | B2 | 11/2020 | Park et al. | |
| 2007/0267040 | A1 | 11/2007 | Watanabe et al. | 134/1 |
| 2008/0308132 | A1 | 12/2008 | Tomita et al. | 134/36 |
| 2011/0088731 | A1 | 4/2011 | Tomita et al. | 134/36 |
| 2013/0196122 | A1 | 8/2013 | Park et al. | 428/195.1 |
| 2016/0158972 | A1 | 6/2016 | Park et al. | |
| 2017/0157643 | A1 | 6/2017 | Park et al. | |
| 2019/0103294 | A1 | 4/2019 | Masutomi et al. | |
| 2019/0181025 | A1 * | 6/2019 | Ota | G05B 23/0243 |
| 2020/0098597 | A1 | 3/2020 | Takahashi et al. | |
| 2020/0227290 | A1 | 7/2020 | Kimura et al. | |
| 2020/0303207 | A1 | 9/2020 | Higuchi et al. | |
| 2021/0327729 | A1 | 10/2021 | Takahashi et al. | |
| 2023/0101475 | A1 * | 3/2023 | Izuta | B05C 11/1013 427/430.1 |
| 2023/0274956 | A1 | 8/2023 | Kimura et al. | |

FOREIGN PATENT DOCUMENTS

| | | | | | |
|---|---|---|---|---|---|
| JP | H1022254 | A | | 1/1998 | |
| JP | 2000-068246 | A | | 3/2000 | |
| JP | 2012-119603 | A | | 6/2012 | |
| JP | 2015-511400 | A | | 4/2015 | |
| JP | 2019-67995 | A | | 4/2019 | |
| JP | 2019-106476 | A | | 6/2019 | |
| JP | 2020047885 | A | | 3/2020 | |
| JP | 2020136679 | A | * | 8/2020 | H10P 50/283 |
| JP | 2021106254 | A | | 7/2021 | |
| JP | 2021-114545 | A | | 8/2021 | |
| KR | 10-2007-0111973 | A | | 11/2007 | |
| KR | 10-2008-0104990 | A | | 12/2008 | |
| KR | 10-2019-0034254 | A | | 4/2019 | |
| KR | 20190034254 | A | * | 4/2019 | |
| TW | 202013561 | A | | 4/2020 | |
| WO | WO-2021149324 | A1 | * | 7/2021 | H10P 72/0402 |

OTHER PUBLICATIONS

Machine Generated English Translation of the claims of JP2020136679A . Published Aug. 31, 2020 (Year: 2020).*

Office Action dated Jan. 27, 2024 issued in corresponding Korean Patent Application No. 10-2022-0116303.

Office Action dated Jun. 12, 2023, issued for corresponding Taiwanese Patent Application No. 111135452.

* cited by examiner

Contact angle: 110 degrees
(hydrophobic properties)

Contact angle: 80 degrees
(hydrophilic properties)

Contact angle: 10 degrees
(hydrophilic properties)

SUBSTRATE PROCESSING METHOD AND SUBSTRATE PROCESSING APPARATUS

INCORPORATION BY REFERENCE

The present application claims priority under 35 U.S.C. § 119 to Japanese Patent Application No. 2021-154888, filed Sep. 22, 2021, and Japanese Patent Application No. 2022-11613, filed Jan. 28, 2022. The contents of these applications are incorporated herein by reference in their entirety.

BACKGROUND

The present disclosure relates to substrate processing methods and substrate processing apparatuses.

Patent Document 1 (JP 2020-47885 A) describes a substrate processing apparatus that includes a processing tank, a substrate holding unit, a fluid supply unit, and a controller. The processing tank stores a processing liquid for treating a substrate. The substrate holding unit holds a substrate in the processing liquid of the processing tank. The fluid supply unit supplies a fluid to the processing tank. The fluid is a gas. The controller controls the fluid supply unit. The controller controls the fluid supply unit such that the fluid supply unit changes the supply of the fluid during the period of time from the start to the end of the supply of the fluid to the processing tank with the processing tank storing the processing liquid and a substrate immersed therein.

However, in the substrate processing apparatus described in Patent Document 1, the processing liquid is phosphoric acid. That is, the processing liquid is acidic.

Meanwhile, the inventor of the present application has demonstrated a novel finding concerning the possibility that if the processing liquid is alkaline, the concentration of dissolved oxygen in the processing liquid has an influence on the processing of a substrate. Therefore, the inventor of the present application has paid attention to the processing of a substrate using an alkaline processing liquid.

SUMMARY

It is an object of the present disclosure to provide a substrate processing method and substrate processing apparatus that are capable of effectively treating a substrate using an alkaline processing liquid.

According to an aspect of the present disclosure, a substrate processing method is executed by a substrate processing apparatus. The substrate processing apparatus includes a processing tank, and a bubble supply pipe disposed in the processing tank. The substrate processing method includes an immersion step and a bubble supply step. In the immersion step, a substrate is immersed in an alkaline processing liquid stored in the processing tank. In the bubble supply step, bubbles are supplied to the alkaline processing liquid from below the substrate with the substrate immersed in the alkaline processing liquid, the bubbles being supplied from a plurality of bubble holes provided in the bubble supply pipe.

In an embodiment of the present disclosure, the substrate processing apparatus preferably further includes a plate disposed in the processing tank below the bubble supply pipe. The method preferably further includes introducing an alkaline processing liquid into the processing tank, upward from a plurality of processing liquid holes provided in the plate, with the alkaline processing liquid stored in the processing tank.

In an embodiment of the present disclosure, the substrate processing apparatus preferably includes a plurality of the bubble supply pipes. The method preferably further includes adjusting the bubbles for each of the bubble supply pipes.

In an embodiment of the present disclosure, the supplying the bubbles preferably includes supplying a gas to each of the bubble supply pipes separately to supply the bubbles from the bubble holes to the alkaline processing liquid. The adjusting the bubbles preferably includes controlling a control condition for adjusting the bubbles for each of the bubble supply pipes to adjust the bubbles for each of the bubble supply pipes. The control condition preferably includes at least one of a flow rate of the gas, a timing of supply of the gas, and a duration of supply of the gas.

In an embodiment of the present disclosure, the adjusting the bubbles preferably includes controlling the control condition for each of the bubble supply pipes, based on a physical quantity indicating the processing amount of the substrate before immersion of the substrate in the alkaline processing liquid.

In an embodiment of the present disclosure, the supplying the bubbles preferably includes supplying a gas to each of the bubble supply pipes separately to supply the bubbles from the bubble holes to the alkaline processing liquid. The adjusting the bubbles preferably includes adjusting the bubbles for each of the bubble supply pipes using a trained model built by being trained with training data. The training data preferably includes pre-immersion processing information and post-immersion processing information. The pre-immersion processing information preferably indicates the physical quantity indicating the processing amount of a learning target substrate before immersion in the alkaline processing liquid. The post-immersion processing information preferably indicates the physical quantity indicating the processing amount of the learning target substrate after immersion in the alkaline processing liquid and pulling up from the alkaline processing liquid. The training data preferably further includes at least one of flow rate information indicating a flow rate of the gas, timing information indicating a timing of supply of the gas, and duration information indicating a duration of supply of the gas, in a case where the learning target substrate is immersed in the alkaline processing liquid. The adjusting the bubbles preferably includes inputting input information to the trained mode to obtain output information from the trained model. The input information preferably includes information about the physical quantity indicating the processing amount of the substrate before immersion in the alkaline processing liquid. The output information preferably includes information indicating a control condition. The control condition preferably includes at least one of a flow rate of the gas, a timing of supply of the gas, and a duration of supply of the gas, in a case where the substrate is immersed in the alkaline processing liquid. The adjusting the bubbles preferably includes adjusting the bubbles based on the output information.

In an embodiment of the present disclosure, the supplying the bubbles preferably includes supplying a gas to each of the bubble supply pipes separately to supply the bubbles from the bubble holes to the alkaline processing liquid. The adjusting the bubbles preferably includes adjusting the bubbles for each of the bubble supply pipes using a trained model built by being trained with training data. The training data preferably includes pre-immersion processing information and post-immersion processing information. The pre-immersion processing information preferably indicates the physical quantity indicating a processing amount of a learning target substrate before immersion in the alkaline processing liquid. The post-immersion processing information preferably indicates the physical quantity indicating the processing amount of the learning target substrate after immersion in the alkaline processing liquid and pulling up from the alkaline processing liquid. The training data preferably further includes at least one of flow rate information indicating a flow rate of the gas, timing information indicating a timing of supply of the gas, and duration information indicating a duration of supply of the gas, in a case where the learning target substrate is immersed in the alkaline processing liquid. The adjusting the bubbles preferably includes inputting input information to the trained model to obtain output information from the trained model. The input information preferably includes information about a physical quantity indicating a processing amount of the substrate before immersion in the alkaline processing liquid, and information indicating a control condition. The control condition preferably includes at least one of a flow rate of the gas, a timing of supply of the gas, and a duration of supply of the gas, in a case where the substrate is immersed in the alkaline processing liquid. The output information preferably includes information indicating a result of clustering of the input information. The adjusting the bubbles preferably includes controlling the control condition based on the output information.

In an embodiment of the present disclosure, the bubble supply pipe preferably has a hydrophilic property.

In an embodiment of the present disclosure, a material for the bubble supply pipe is preferably quartz or polyether ether ketone.

According to another aspect of the present disclosure, a substrate processing apparatus includes a processing tank, a substrate holding section, and a bubble supply pipe. The processing tank that stores an alkaline processing liquid. The substrate holding section that holds a substrate, and immerse the substrate in the alkaline processing liquid stored in the processing tank. The bubble supply pipe has a plurality of bubble holes and is disposed in the processing tank, and supplies bubbles to the alkaline processing liquid from below the substrate with the substrate immersed in the alkaline processing liquid, the bubbles being supplied from the plurality of bubble holes.

In an embodiment of the present disclosure, the substrate processing apparatus preferably further includes a processing liquid introduction section. The processing liquid introduction section is preferably disposed below the bubble supply pipe inside the processing tank. The processing liquid introduction section preferably includes a plate having a plurality of processing liquid holes. The processing liquid introduction section preferably introduces an alkaline processing liquid into the processing tank, upward from the plurality of processing liquid holes, with the alkaline processing liquid stored in the processing tank.

In an embodiment of the present disclosure, a plurality of the bubble supply pipes are preferably disposed in the processing tank. The substrate processing apparatus preferably further includes a bubble adjustment section that adjusts the bubbles for each of the bubble supply pipes.

In an embodiment of the present disclosure, the substrate processing apparatus preferably further includes a controller. The bubble adjustment section preferably supplies a gas to each of the bubble supply pipes separately to supply the bubbles from the bubble holes to the alkaline processing liquid. The controller preferably controls the bubble adjustment section to control a control condition for adjusting the bubbles for each of the bubble supply pipes. The control condition preferably includes at least one of a flow rate of the gas, a timing of supply of the gas, and a duration of supply of the gas.

In an embodiment of the present disclosure, the controller preferably controls the control condition for each of the bubble supply pipes based on a physical quantity indicating a processing amount of the substrate before immersion in the alkaline processing liquid.

In an embodiment of the present disclosure, the substrate processing apparatus preferably further includes storage and a controller. The storage is preferably configured to store a trained model built by being trained with training data. The controller preferably controls the storage. The bubble adjustment section preferably supplies a gas to each of the bubble supply pipes separately to supply the bubbles from the bubble holes to the alkaline processing liquid. The training data preferably includes pre-immersion processing information and post-immersion processing information. The pre-immersion processing information preferably indicates a physical quantity indicating a processing amount of a learning target substrate before immersion in the alkaline processing liquid. The post-immersion processing information preferably indicates the physical quantity indicating the processing amount of the learning target substrate after immersion in the alkaline processing liquid and pulling up from the alkaline processing liquid. The training data preferably further includes at least one of flow rate information indicating a flow rate of the gas, timing information indicating a timing of supply of the gas, and duration information indicating a duration of supply of the gas, during immersion of the learning target substrate in the alkaline processing liquid. The controller preferably inputs input information to the trained model to obtain output information from the trained model. The input information preferably includes information about a physical quantity indicating a processing amount of the substrate before immersion in the alkaline processing liquid. The output information preferably includes information indicating a control condition. The control condition preferably includes at least one of a flow rate of the gas, a timing of supply of the gas, and a duration of supply of the gas, during immersion of the substrate in the alkaline processing liquid. The controller preferably adjusts the bubbles based on the output information.

In an embodiment of the present disclosure, the substrate processing apparatus preferably further includes storage and a controller. The storage preferably stores a trained model built by being trained with training data. The controller preferably controls the storage. The bubble adjustment section preferably supplies a gas to each of the bubble supply pipes separately to supply the bubbles from the bubble holes to the alkaline processing liquid. The training data preferably includes pre-immersion processing information and post-immersion processing information. The pre-immersion processing information preferably indicates a physical quantity indicating a processing amount of a learning target substrate before immersion in the alkaline processing liquid. The post-immersion processing information preferably indicates the physical quantity indicating the processing amount of the learning target substrate after immersion in the alkaline processing liquid and pulling up from the alkaline processing liquid. The training data preferably further includes at least one of flow rate information indicating a flow rate of the gas, timing information indicating a timing of supply of the gas, and duration information indicating a duration of supply of the gas, in a case where the learning target substrate is immersed in the alkaline processing liquid. The controller preferably inputs input information to the trained model to obtain output information from the trained model. The input information preferably includes information about a physical quantity indicating a processing amount of the substrate before immersion in the alkaline processing liquid, and information indicating a control condition. The control condition preferably includes at least one of a flow rate of the gas, a timing of supply of the gas, and a duration of supply of the gas, during immersion of the substrate in the alkaline processing liquid. The output information preferably includes information indicating a result of clustering of the input information. The controller preferably controls the control condition based on the output information.

In an embodiment of the present disclosure, the substrate holding section preferably holds a plurality of the substrates with the substrates spaced apart in a predetermined direction. The bubble supply pipe preferably extends in the predetermined direction. In the bubble supply pipe, the plurality of bubble holes are preferably arranged and spaced apart in the predetermined direction. An array of the plurality of substrates preferably includes a plurality of clearances. Each of the plurality of clearances is preferably a space between adjacent ones of the substrates in the predetermined direction. The plurality of bubble holes preferably include a first bubble hole, a second bubble hole, and a plurality of third bubble holes. The first bubble hole is preferably disposed outward in the predetermined direction of one of the plurality of substrates disposed at one end in the predetermined direction. The second bubble hole is preferably disposed outward in the predetermined direction of one of the plurality of substrates disposed at the other end in the predetermined direction. The plurality of third bubble holes are preferably disposed, corresponding to the plurality of clearances, respectively. The number of first bubble holes is preferably greater than the number of ones, of the plurality of third bubble holes, disposed corresponding to one of the clearances. The number of second bubble holes is preferably greater than the number of the ones, of the plurality of third bubble holes, disposed corresponding to the one of the clearances.

In an embodiment of the present disclosure, the bubble supply pipe preferably has a hydrophilic property.

In an embodiment of the present disclosure, a material for the bubble supply pipe is preferably quartz or polyether ether ketone.

DETAILED DESCRIPTION

Figure 1:
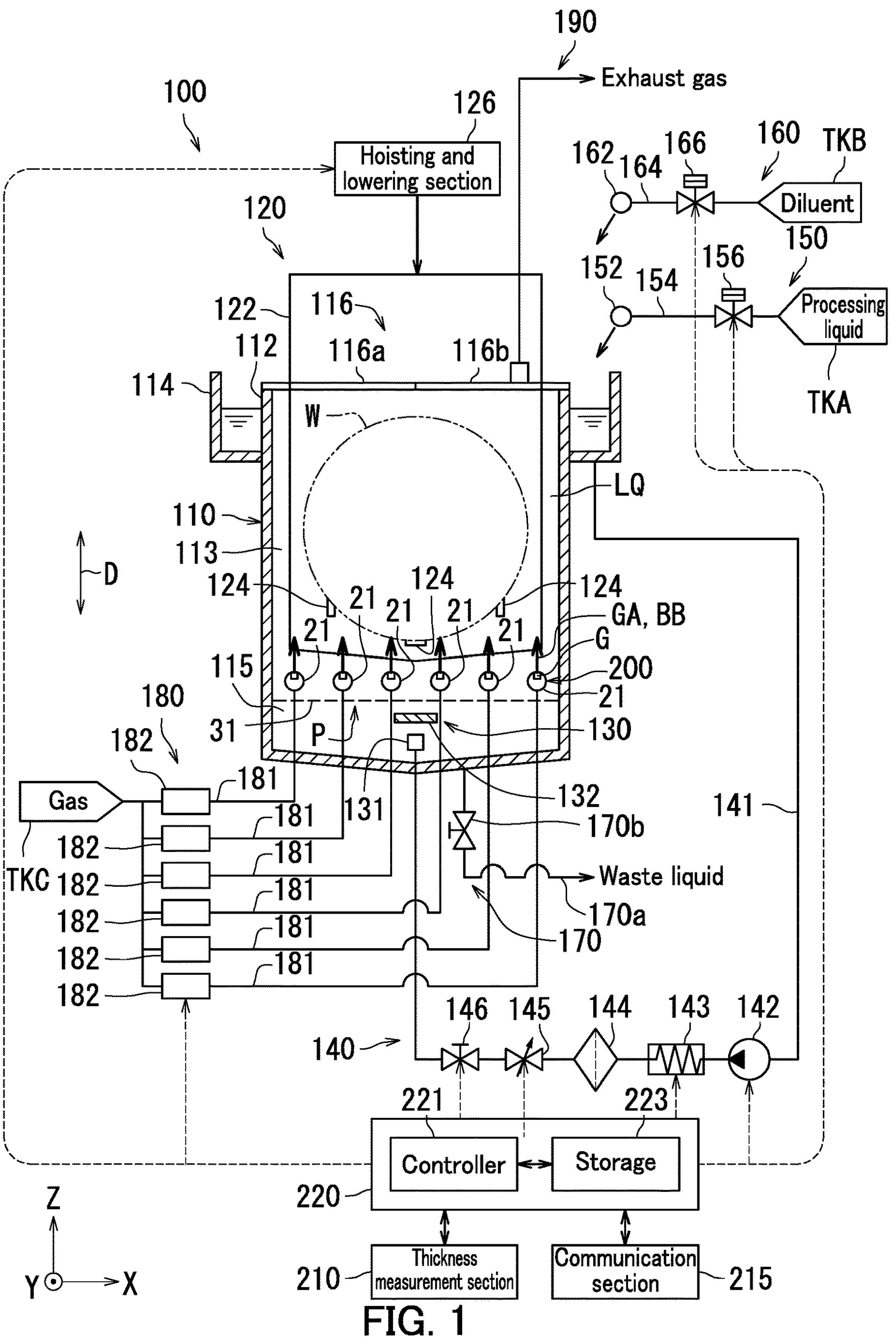
FIG. 1 is a schematic cross-sectional view illustrating a substrate processing apparatus according to a first embodiment of the present disclosure.

Embodiments of the present disclosure will be described below with reference to the accompanying drawings. It should be noted that the same or corresponding parts are indicated by the same reference characters and will not redundantly be described. In the drawings, an X axis, a Y axis, and a Z axis are illustrated as appropriate for ease of understanding. The X axis, the Y axis, and the Z axis are orthogonal to each other. The X axis and the Y axis are parallel to a horizontal direction, and the Z axis is parallel to a vertical direction. As used herein, the term "plan view" refers to a view seen from directly above. As used herein, the term "back view" refers to a view seen from directly below.

First Embodiment

A substrate processing apparatus 100 according to a first embodiment of the present disclosure will be described with reference to FIGS. 1 to 10. Firstly, the substrate processing apparatus 100 will be described with reference to FIG. 1. FIG. 1 is a schematic cross-sectional view illustrating the substrate processing apparatus 100. The substrate processing apparatus 100 of FIG. 1, which is of the batch type, simultaneously treats a plurality of substrates W with a processing liquid LQ that is alkaline (hereinafter referred to as an "alkaline processing liquid LQ"). It should be noted that the substrate processing apparatus 100 can treat a single substrate W.

The substrate processing apparatus 100 includes a processing tank 110, a substrate holding section 120, a processing liquid introduction section 130, a circulation section 140, a processing liquid supply section 150, a diluent supply section 160, a drainage section 170, a bubble adjustment section 180, an exhaust pipe section 190, a bubble supply section 200, a thickness measurement section 210, a communication section 215, and a control device 220.

The processing tank 110 stores the alkaline processing liquid LQ. In the processing tank 110, a plurality of substrates W are immersed and treated with the alkaline processing liquid LQ.

Examples of the alkaline processing liquid LQ include an aqueous solution containing tetramethyl ammonia hydroxide (TMAH), an aqueous solution containing trimethyl-2 hydroxyethylammonium hydroxide (TMY), ammonium hydroxide (ammonia water), and an ammonia-hydrogen peroxide water mixture (SC1). The alkaline processing liquid LQ is, for example, an etchant that is alkaline (hereinafter referred to as an "alkaline etchant").

The substrate holding section 120 holds a plurality of substrates W. The substrate holding section 120 can also hold a single substrate W. The substrate holding section 120 includes a lifter. The substrate holding section 120 immerses a plurality of substrates W in the alkaline processing liquid LQ stored in the processing tank 110 with the substrates W aligned and spaced apart. The processing liquid introduction section 130 supplies the alkaline processing liquid LQ to the processing tank 110. The circulation section 140 circulates the alkaline processing liquid LQ stored in the processing tank 110, and supplies the alkaline processing liquid LQ to the processing liquid introduction section 130. The processing liquid supply section 150 supplies the alkaline processing liquid LQ to the processing tank 110. The diluent supply section 160 supplies a diluent to the processing tank 110. The drainage section 170 drains the alkaline processing liquid LQ from the processing tank 110. The diluent is, for example, deionized water (DIW)

The bubble supply section 200 is disposed in the processing tank 110. The bubble supply section 200 supplies a gas GA supplied from the bubble adjustment section 180 to the alkaline processing liquid LQ in the processing tank 110. Specifically, the bubble supply section 200 supplies bubbles BB of the gas GA to the alkaline processing liquid LQ in the processing tank 110 (e.g., FIGS. 7A to 9D). The gas GA is, for example, an inert gas. The inert gas is, for example, nitrogen or argon.

The bubble supply section 200 includes at least one bubble supply pipe 21. In the first embodiment, the bubble supply section 200 includes a plurality of bubble supply pipes 21. For example, the bubble supply section 200 includes an even number of bubble supply pipes 21. In the example of FIG. 1, the bubble supply section 200 includes six bubble supply pipes 21. It should be noted that the number of bubble supply pipes 21 is not particularly limited, and may be odd, for example. The plurality of bubble supply pipes 21 may or may not be at the same level in a vertical direction D. The bubble supply pipe 21 is, for example, a bubbler pipe.

Figure 5:
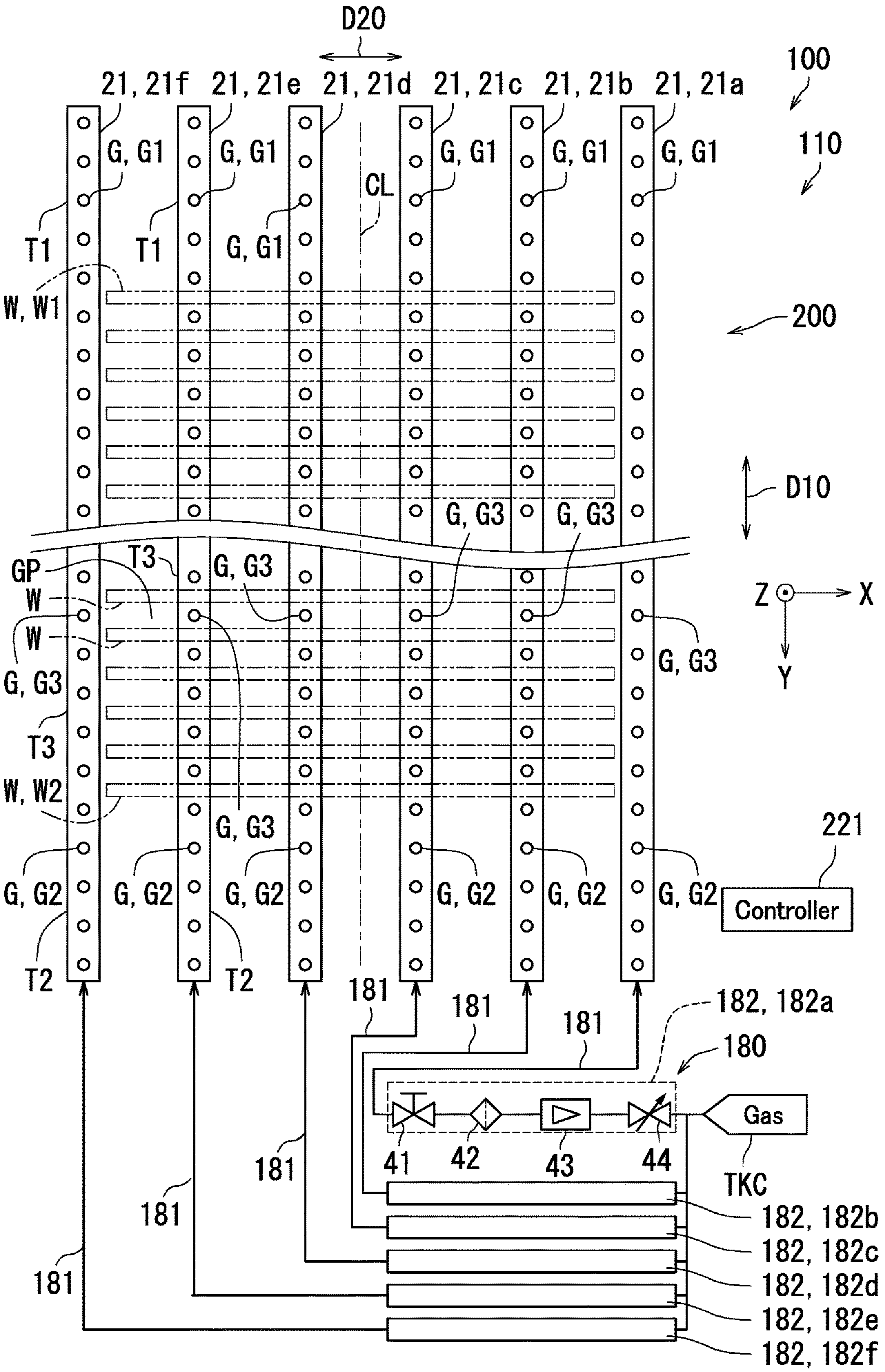
FIG. 5 is a schematic plan view illustrating a gas supply section in the substrate processing apparatus of the first embodiment.

Each bubble supply pipe 21 has a bubble hole G. In the example of FIG. 1, the bubble hole G faces upward in the vertical direction. Although not seen in FIG. 1, each bubble supply pipe 21 has a plurality of bubble holes G (FIG. 5). The bubble supply pipe 21 emits, from the bubble holes G, the gas GA supplied from the bubble adjustment section 180, to supply the bubbles BB to the alkaline processing liquid LQ. In other words, the gas GA produces the bubbles BB. The bubble supply section 200 will be described in detail below.

As described above with reference to FIG. 1, in the first embodiment, the supply of the bubbles BB to the alkaline processing liquid LQ can reduce the concentration of dissolved oxygen in the alkaline processing liquid LQ compared to when the bubbles BB are not supplied. As a result, the substrate W immersed in the alkaline processing liquid LQ can be effectively treated with the alkaline processing liquid LQ. Specifically, by supplying the bubbles BB, the amount of processing (hereinafter referred to as a "processing amount") of the substrate W with the alkaline processing liquid LQ can be increased compared to when the bubbles BB are not supplied. In the first embodiment, as an example, the processing of the substrate W with the alkaline processing liquid LQ is etching of the substrate W. In this case, the processing amount of the substrate W with the alkaline processing liquid LQ is the amount of etching of the substrate W. Therefore, by supplying the bubbles BB, the amount of etching of the substrate W with the alkaline processing liquid LQ can be increased.

In addition, in the first embodiment, by supplying the bubbles BB to the alkaline processing liquid LQ, the alkaline processing liquid LQ that is in contact with a surface of the substrate W can be effectively replaced with a fresh alkaline processing liquid LQ. As a result, when a surface pattern including a recessed portion is formed in a surface of the substrate W, the alkaline processing liquid LQ in the recessed portion can be effectively replaced with a fresh alkaline processing liquid LQ due to a diffusion phenomenon. Therefore, the wall surface of the recessed portion of the surface pattern can be effectively treated (etched) with the alkaline processing liquid LQ irrespective of the depth thereof, i.e., at shallow to deep levels. The surface of the substrate W is herein a main surface of the substrate W.

Figure 2:
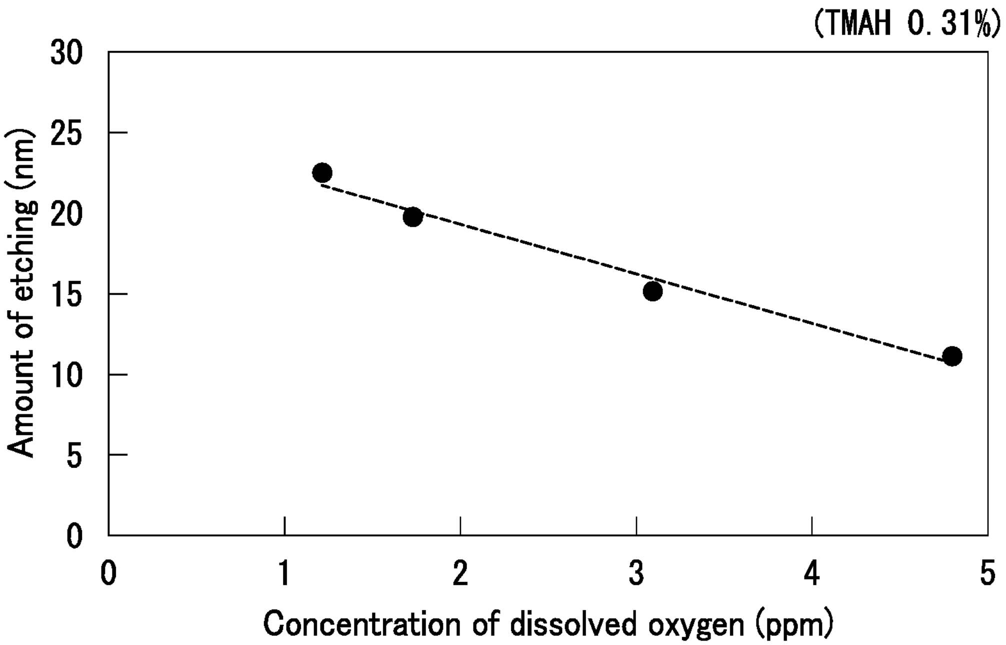
FIG. 2 is a graph illustrating a relationship between the concentration of dissolved oxygen in an alkaline processing liquid and the amount of etching in the first embodiment.

Next, a relationship between the concentration of dissolved oxygen and the amount of etching will be described with reference to FIG. 2. FIG. 2 is a graph illustrating a relationship between the concentration of dissolved oxygen in the alkaline processing liquid LQ and the amount of etching. The horizontal axis represents the concentration (ppm) of dissolved oxygen in the alkaline processing liquid LQ, and the vertical axis represents the amount of etching of the substrate W.

FIG. 2 illustrates an example in which TMAH was used as the alkaline processing liquid LQ. The concentration of TMAH was 0.31%. The gas GA was nitrogen. Therefore, the bubbles BB were bubbles of nitrogen. A polysilicon film (polysilicon layer) had been formed on the substrate W. FIG. 2 illustrates the amount of etching of the polysilicon film when the substrate W was immersed in TMAH. The amount of etching is the value obtained by subtracting the thickness of the polysilicon film after immersion in TMAH from the thickness of the polysilicon film before the immersion. The amount of etching may be referred to as the "amount of etching of the substrate W" As used herein, the term "substrate W after immersion" refers to "a substrate W that has been completely treated by immersion and then has been pulled up from the alkaline processing liquid LQ."

As illustrated in FIG. 2, the amount of etching (processing amount) of the substrate W increased with a decrease in the concentration of dissolved oxygen. The amount of etching (processing amount) was generally directly proportional to the concentration of dissolved oxygen. The proportional constant is negative.

Figure 3:
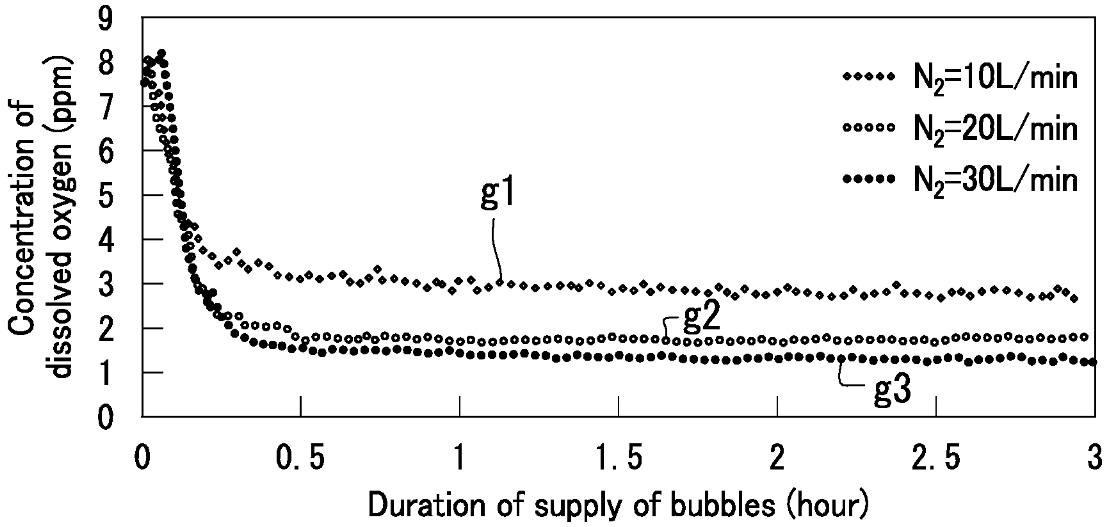
FIG. 3 is a graph illustrating a relationship between the duration of supply of bubbles and the concentration of dissolved oxygen in an alkaline processing liquid in the first embodiment.

Next, a relationship between the duration of supply of the bubbles BB and the concentration of dissolved oxygen will be described with reference to FIG. 3. FIG. 3 is a graph illustrating the relationship between the duration of supply of the bubbles BB and the concentration of dissolved oxygen in the alkaline processing liquid LQ. The horizontal axis represents the duration (hour) of supply of the bubbles BB, and the vertical axis represents the concentration (ppm) of dissolved oxygen in the alkaline processing liquid LQ.

FIG. 3 illustrates an example in which TMAH was used as the alkaline processing liquid LQ. The concentration of TMAH was 0.31%. The gas GA for producing the bubbles BB was nitrogen. Therefore, the bubbles BB were bubbles of nitrogen. Plotted points g1 indicate the concentration of dissolved oxygen when the flow rate of the gas GA was 10 L/min. Plotted points g2 indicate the concentration of dissolved oxygen when the flow rate of the gas GA was 20 L/min. Plotted points g3 indicate the concentration of dissolved oxygen when the flow rate of the gas GA was 30 L/min. In this case, the flow rate of the gas GA indicates the flow rate of the gas GA that was supplied to a single bubble supply pipe 21.

As can be seen from the plotted points g1 to g3, the concentration of dissolved oxygen in the alkaline processing liquid LQ became almost constant in about one hour. After the concentration of dissolved oxygen had become almost constant, the concentration of dissolved oxygen in the alkaline processing liquid LQ was lower in the case where the flow rate of the gas GA was higher. In other words, after the concentration of dissolved oxygen had become almost constant, the concentration of dissolved oxygen in the alkaline processing liquid LQ was lower in the case where more bubbles BB were supplied to the alkaline processing liquid LQ. This is because as the flow rate of the gas GA is increased, more bubbles BB are supplied to the alkaline processing liquid LQ.

From the plotted points g1 to g3, the following was inferred. Specifically, it was inferred that when the alkaline processing liquid LQ of the processing tank 110 shows therein distribution of the bubbles BB, the concentration of dissolved oxygen is lower in a region where there are more bubbles BB in the alkaline processing liquid LQ, and the concentration of dissolved oxygen is higher in a region where there are less bubbles BB in the alkaline processing liquid LQ. The inventor of the present application has verified such inference by experiments.

Thus, as described above with reference to FIGS. 2 and 3, as more bubbles BB were supplied to the alkaline processing liquid LQ, the concentration of dissolved oxygen in the alkaline processing liquid LQ decreased. As the concentration of dissolved oxygen in the alkaline processing liquid LQ decreased, the amount of etching (processing amount) of the substrate W increased.

Thus, as more bubbles BB were supplied to the alkaline processing liquid LQ, the amount of etching (processing amount) of the substrate W increased. In other words, as the flow rate of the gas GA for producing the bubbles BB increased, the amount of etching (processing amount) of the substrate W increased. Meanwhile, as less bubbles BB were supplied to the alkaline processing liquid LQ, the amount of etching (processing amount) of the substrate W decreased. In other words, as the flow rate of the gas GA for producing the bubbles BB decreased, the amount of etching (processing amount) of the substrate W decreased.

In addition, from the graphs of FIGS. 2 and 3, it was inferred that when the bubbles BB are non-uniformly distributed in the alkaline processing liquid LQ of the processing tank 110, the amount of etching (processing amount) of the substrate W is greater in a region where there are more bubbles BB in the alkaline processing liquid LQ, and the amount of etching (processing amount) of the substrate W is smaller in a region where there are less bubbles BB in the alkaline processing liquid LQ. The inventor of the present application has verified such inference by experiments.

Referring back to FIG. 1, the substrate processing apparatus 100 will be further described. The bubble adjustment section 180 supplies the gas GA to the bubble supply section 200. The bubble adjustment section 180 also adjusts the gas GA to be supplied to the bubble supply section 200, and thereby adjusts the bubbles BB supplied by the bubble supply section 200. The exhaust pipe section 190 discharges water vapor and the gas GA from the processing tank 110.

The thickness measurement section 210 measures a thickness of a target constituting the substrate W (hereinafter referred to as a "target TG") in a noncontact manner, and generates a thickness detection signal indicating the thickness of the target TG. The thickness detection signal is input to the control device 220. The target TG is to be treated with the alkaline processing liquid LQ. The target TG is, for example, the substrate W itself, a substrate body (e.g., a substrate body made of silicon), or a material formed on a surface of the substrate body. The material formed on the surface of the substrate body is, for example, the same material as that of the substrate body (e.g., a polysilicon film), or a material different from that of the substrate body (e.g., a silicon oxide film, a silicon nitride film, or a resist). The "material" may form a film or a layer.

The thickness measurement section 210 measures the thickness of the target TG using, for example, a spectral interference technique. Specifically, the thickness measurement section 210 includes an optical probe, a signal line, and a thickness meter. The optical probe has a lens. The signal line connects the optical probe with the thickness meter. The signal line includes, for example, an optical fiber. The thickness meter has a light source and a photodetector. Light emitted by the light source of the thickness meter is transmitted to the target TG through the signal line and the optical probe. Light reflected by the target TG is received by the photodetector of the thickness meter through the optical probe and the signal line. The thickness meter analyzes the light received by the photodetector to calculate the thickness of the target TG. The thickness meter generates a thickness detection signal indicating the calculated thickness of the target TG.

The communication section 215 is connected to a network, through which the communication section 215 communicates with an external device. Examples of the network include the Internet, local area networks (LANs), public telephone networks, and near-field wireless networks. The communication section 215 is a communication device, such as a network interface controller. The communication section 215 may have a wired communication module or a wireless communication module.

The control device 220 controls elements of the substrate processing apparatus 100. For example, the control device 220 controls the substrate holding section 120, the circulation section 140, the processing liquid supply section 150, the diluent supply section 160, the drainage section 170, the bubble adjustment section 180, and the thickness measurement section 210.

The control device 220 includes a controller 221 and storage 223. The controller 221 includes processors such as a central processing section (CPU) and a graphical processing section (GPU). The storage 223 includes a storage device and stores data and a computer program. A processor of the controller 221 executes the computer program stored in the storage device of the storages 223 to control elements of the substrate processing apparatus 100. For example, the storage 223 includes a main storage device, such as a semiconductor memory, and an auxiliary storage device, such as a semiconductor memory or a hard disk drive. The storage 223 may include a removable medium, such as an optical disk. The storage 223 is, for example, a non-transitory computer-readable storage medium. The control device 220 may include an input device and a display device.

Still referring to FIG. 1, the substrate processing apparatus 100 will be described in detail. The processing tank 110 has a two-tank structure including an inner tank 112 and an outer tank 114. The inner tank 112 and the outer tank 114 each have an upper opening that is open upward. The inner tank 112 is configured to store the alkaline processing liquid LQ and accommodate a plurality of substrates W. The outer tank 114 is provided on an outer surface of the upper opening of the inner tank 112. The height of an upper edge of the outer tank 114 is greater than the height of an upper edge of the inner tank 112.

The processing tank 110 further has a lid 116. The lid 116 is openable and closeable relative to the upper opening of the inner tank 112. When the lid 116 is closed, the lid 116 can block the upper opening of the inner tank 112.

The lid 116 has a hinged door 116*a* and a hinged door 116*b*. The hinged door 116*a* is located on one side of the upper opening of the inner tank 112. The hinged door 116*a* is disposed in the vicinity of the upper edge of the inner tank 112, and is openable and closeable relative to the upper opening of the inner tank 112. The hinged door 116*b* is located on the other side of the upper opening of the inner tank 112. The hinged door 116*b* is disposed in the vicinity of the upper edge of the inner tank 112, and is openable and closeable relative to the upper opening of the inner tank 112. When the hinged door 116*a* and the hinged door 116*b* are closed to cover the upper opening of the inner tank 112, the inner tank 112 can be blocked.

The substrate holding section 120 is moved upward and downward in the vertical direction while holding a plurality of substrates W. When the substrate holding section 120 is moved downward in the vertical direction, the plurality of substrates W held by the substrate holding section 120 are immersed in the alkaline processing liquid LQ stored in the inner tank 112.

The substrate holding section 120 includes a body board 122 and a holding rod 124. The body board 122 extends in the vertical direction D (Z direction). The holding rod 124 extends in a horizontal direction (Y direction) from one main surface of the body board 122. In the example of FIG. 1, three holding rods 124 extend in the horizontal direction from one main surface of the body board 122. The plurality of substrates W are aligned and spaced apart, and are held in upright position (vertical position) by the plurality of holding rods 124, with a lower edge of each substrate W being in contact with the holding rods 124.

The substrate holding section 120 may further include a hoisting and lowering section 126. The hoisting and lowering section 126 hoists and lowers the body board 122 between a processing level (level illustrated in FIG. 2B) where the plurality of substrates W held by the substrate holding section 120 are located in the inner tank 112 and a retreat level (level illustrated in FIG. 2A) where the plurality of substrates W held by the substrate holding section 120 are located above the inner tank 112. Therefore, when the body board 122 is moved to the processing level by the hoisting and lowering section 126, the plurality of substrates W held by the holding rods 124 are immersed in the alkaline processing liquid LQ. As a result, the plurality of substrates W are subjected to processing.

In the processing tank 110 (specifically, the inner tank 112), the processing liquid introduction section 130 is disposed below the bubble supply section 200 (specifically, the bubble supply pipes 21).

Unless otherwise specified, the processing tank 110 hereinafter refers to the inner tank 112.

The processing liquid introduction section 130 includes a plate 31. The plate 31 is in the shape of a generally flat plate. The plate 31 divides the inside of the processing tank 110 into a processing compartment 113 and an introduction compartment 115. In other words, the processing tank 110 has the processing compartment 113 and the introduction compartment 115. The processing compartment 113 is located in the processing tank 110 above the plate 31. The bubble supply section 200 is disposed in the processing compartment 113. The substrates W are disposed in the processing compartment 113. The introduction compartment 115 is located in the processing tank 110 below the plate 31.

The plate 31 is disposed below the bubble supply section 200. The plate 31 covers a bottom surface of the processing tank 110. The plate 31 is generally perpendicular to the vertical direction D. The plate 31 has a plurality of processing liquid holes P. The processing liquid holes P penetrate through the plate 31. The processing liquid holes P are disposed throughout the plate 31. The processing liquid holes P face upward in the vertical direction.

The processing liquid introduction section 130 introduces the alkaline processing liquid LQ into the processing tank 110 upward from the plurality of processing liquid holes P with the alkaline processing liquid LQ stored in the processing tank 110. Therefore, the processing liquid introduction section 130 can generate a laminar flow of the alkaline processing liquid LQ supplied from the circulation section 140. In other words, the processing liquid introduction section 130 introduces the alkaline processing liquid LQ into the processing tank 110 by generating a laminar flow of the alkaline processing liquid LQ. The laminar flow of the alkaline processing liquid LQ flows from the plurality of processing liquid holes P upward generally in the vertical direction D.

In the first embodiment, the alkaline processing liquid LQ is introduced into the processing tank 110 by the laminar flow of the alkaline processing liquid LQ, and therefore, turbulence in the flow of the bubbles BB supplied to the alkaline processing liquid LQ by the bubble supply section 200 can be reduced. Therefore, the bubbles BB can effectively reduce the concentration of dissolved oxygen in the alkaline processing liquid LQ. As a result, the substrates W can be effectively treated (etched) with the alkaline processing liquid LQ.

Specifically, the processing liquid introduction section 130 includes at least one discharge part 131 and at least one dispersion board 132. The discharge part 131 is, for example, a nozzle or a pipe. The dispersion board 132 is, for example, in the shape of a generally flat board. The dispersion board 132 is generally perpendicular to the vertical direction D. The discharge part 131 and the dispersion board 132 are disposed in the introduction compartment 115.

The discharge part 131 is located below the dispersion board 132. The discharge part 131 is opposite the dispersion board 132 in the vertical direction D. The discharge part 131 discharges the alkaline processing liquid LQ supplied from the circulation section 140 toward the dispersion board 132. Therefore, the alkaline processing liquid LQ strikes the dispersion board 132. As a result, the pressure of the alkaline processing liquid LQ is dispersed by the dispersion board 132. In other words, the dispersion board 132 disperses the pressure of the alkaline processing liquid LQ discharged by the discharge part 131. Thereafter, the alkaline processing liquid LQ whose pressure has been dispersed by the dispersion board 132 is diffused in the introduction compartment 115 generally in the horizontal direction. Moreover, a laminar flow of the alkaline processing liquid LQ is supplied into the processing compartment 113 from the processing liquid holes P of the plate 31 upward in the vertical direction D. Thus, the processing liquid introduction section 130 generates the laminar flow of the alkaline processing liquid LQ along the vertical direction D, and therefore, has the function of straightening the flow of the alkaline processing liquid LQ.

The circulation section 140 includes a pipe 141, a pump 142, a heater 143, a filter 144, a metering valve 145, and a valve 146. The pump 142, the heater 143, the filter 144, the metering valve 145, and the valve 146 are arranged in the stated order from upstream to downstream of the pipe 141.

The pipe 141 guides the alkaline processing liquid LQ sent out from the processing tank 110 back to the processing tank 110. Specifically, an upstream end of the pipe 141 is connected to the outer tank 114. Therefore, the pipe 141 guides the alkaline processing liquid LQ from the outer tank 114 to the processing liquid introduction section 130. The processing liquid introduction section 130 is connected to a downstream end of the pipe 141. Specifically, the discharge part 131 is connected to the downstream end of the pipe 141.

The pump 142 sends the alkaline processing liquid LQ from the pipe 141 to the discharge part 131. Therefore, the discharge part 131 discharges the alkaline processing liquid LQ supplied from the pipe 141. The filter 144 filters the alkaline processing liquid LQ flowing in the pipe 141.

The heater 143 heats the alkaline processing liquid LQ flowing in the pipe 141. Specifically, the heater 143 adjusts the temperature of the alkaline processing liquid LQ. The metering valve 145 adjusts the opening degree of the pipe 141 to adjust the flow rate of the alkaline processing liquid LQ to be supplied to the discharge part 131. The valve 146 opens and closes the pipe 141.

The processing liquid supply section 150 includes a nozzle 152, a pipe 154, and a valve 156. The nozzle 152 discharges the alkaline processing liquid LQ to the outer tank 114. It should be noted that the nozzle 152 may supply the alkaline processing liquid LQ to the inner tank 112.

The nozzle 152 is connected to the pipe 154. The alkaline processing liquid LQ is supplied to the pipe 154 from a processing liquid supply source TKA. The valve 156 is disposed in the pipe 154. When the valve 156 is opened, the alkaline processing liquid LQ discharged from the nozzle 152 is supplied to the outer tank 114. Thereafter, the alkaline processing liquid LQ is supplied from the outer tank 114 through the pipe 141 and then through the processing liquid introduction section 130 to the inner tank 112.

The diluent supply section 160 includes a nozzle 162, a pipe 164, and a valve 166. The nozzle 162 discharges a diluent to the outer tank 114. The nozzle 162 is connected to the pipe 164. The diluent is supplied to the pipe 164 from a diluent supply source TKB. The valve 166 is disposed in the pipe 164. When the valve 166 is opened, the diluent discharged from the nozzle 162 is supplied to the outer tank 114.

The drainage section 170 includes a drainage pipe **170*a* and a valve 170*b*. The drainage pipe 170*a* is connected to a bottom wall of the inner tank 112 of the processing tank 110. The valve 170*b* is disposed in the drainage pipe 170*a*. When the valve 170*b* is opened, the alkaline processing liquid LQ stored in the inner tank 112 is discharged out through the drainage pipe 170*a***. The discharged alkaline processing liquid LQ is sent and treated in a waste liquid processing apparatus (not illustrated).

The bubble supply section 200 is disposed in the processing tank 110 (processing compartment 113). Specifically, the plurality of bubble supply pipes 21 are disposed in the processing tank 110 (processing compartment 113). More specifically, the plurality of bubble supply pipes 21 are disposed in the processing tank 110 above the plate 31 and below the substrates W. A material for the bubble supply pipe 21 is, for example, quartz or a resin.

Each bubble supply pipe 21 supplies the gas GA to the alkaline processing liquid LQ stored in the processing tank 110. Specifically, the bubble supply pipe 21 supplies the gas GA to the alkaline processing liquid LQ upward, i.e., toward the liquid surface of the alkaline processing liquid LQ. In this case, the bubble supply pipe 21 supplies the gas GA in the form of the bubbles BB to the alkaline processing liquid LQ.

Specifically, each bubble supply pipe 21 supplies the bubbles BB to the alkaline processing liquid LQ from below the substrates W through the plurality of bubble holes G with the substrates W immersed in the alkaline processing liquid LQ. Therefore, the concentration of dissolved oxygen in the alkaline processing liquid LQ can be reduced compared to when the bubbles BB are not supplied. As a result, the substrate W immersed in the alkaline processing liquid LQ can be effectively treated with the alkaline processing liquid LQ. In other words, by supplying the bubbles BB, the processing amount of the substrate W with the alkaline processing liquid LQ can be increased compared to when the bubbles BB are not supplied. This feature will be described in detail below. In addition, by supplying the bubbles BB, the alkaline processing liquid LQ that is in contact with a surface of the substrate W can be effectively replaced with a fresh alkaline processing liquid LQ.

The bubble adjustment section 180 supplies the gas GA supplied from a gas supply source TKC to the plurality of bubble supply pipes 21. Specifically, the substrate processing apparatus 100 further includes a plurality of pipes 181. The plurality of pipes 181 are connected to the plurality of bubble supply pipes 21, respectively. The bubble adjustment section 180 supplies the gas GA supplied from the gas supply source TKC, from the plurality of pipes 181 to the plurality of bubble supply pipes 21, respectively. Specifically, the bubble adjustment section 180 includes a plurality of bubble adjustment mechanisms 182. The plurality of bubble adjustment mechanisms 182 are connected to the plurality of pipes 181, respectively. Specifically, one end of the pipe 181 is connected to the bubble supply pipe 21, and the other end of the pipe 181 is connected to the bubble adjustment mechanism 182. The plurality of bubble adjustment mechanisms 182 are provided, corresponding to the plurality of bubble supply pipes 21, respectively. Each bubble adjustment mechanism 182 supplies the gas GA supplied from the gas supply source TKC, to the corresponding bubble supply pipe 21 through the corresponding pipe 181.

The bubble adjustment section 180 also adjusts the bubbles BB for each bubble supply pipe 21. Therefore, in the first embodiment, the in-plane uniformity of the processing of each substrate W can be improved. Specifically, the bubble adjustment section 180 adjusts the amount and/or number of the bubbles BB for each bubble supply pipe 21.

Thus, as described above with reference to FIGS. 2 and 3, the more the bubbles BB, the greater the processing amount of the substrate W, and the less the bubbles BB, the smaller the processing amount of the substrate W. Therefore, in the case where the substrate W before immersion in the alkaline processing liquid LQ shows distribution of thickness, the processing amount of each region of a surface of the substrate W can be adjusted by adjusting the distribution of the bubbles BB on the surface of the substrate W. As a result, for example, the bubbles BB are increased in a region of the surface of the substrate W where the substrate W has a greater thickness. Alternatively, for example, the bubbles BB are decreased in a region of the surface of the substrate W where the substrate W has a smaller thickness. This can improve the in-plane uniformity of the processing of the substrate W.

Specifically, in the bubble adjustment section 180, each bubble adjustment mechanism 182 adjusts the flow rate of the gas GA to be supplied to the corresponding bubble supply pipe 21. The adjustment of the flow rate of the gas GA includes causing the flow rate of the gas GA to be constant, increasing the flow rate of the gas GA, decreasing the flow rate of the gas GA, and causing the flow rate of the gas GA to be zero.

The controller 221 controls the hoisting and lowering section 126, the valve 146, the metering valve 145, the heater 143, the pump 142, the valve 156, the valve 166, the valve 170*b*, and the bubble adjustment section 180 (the plurality of bubble adjustment mechanisms 182).

Figure 4A:
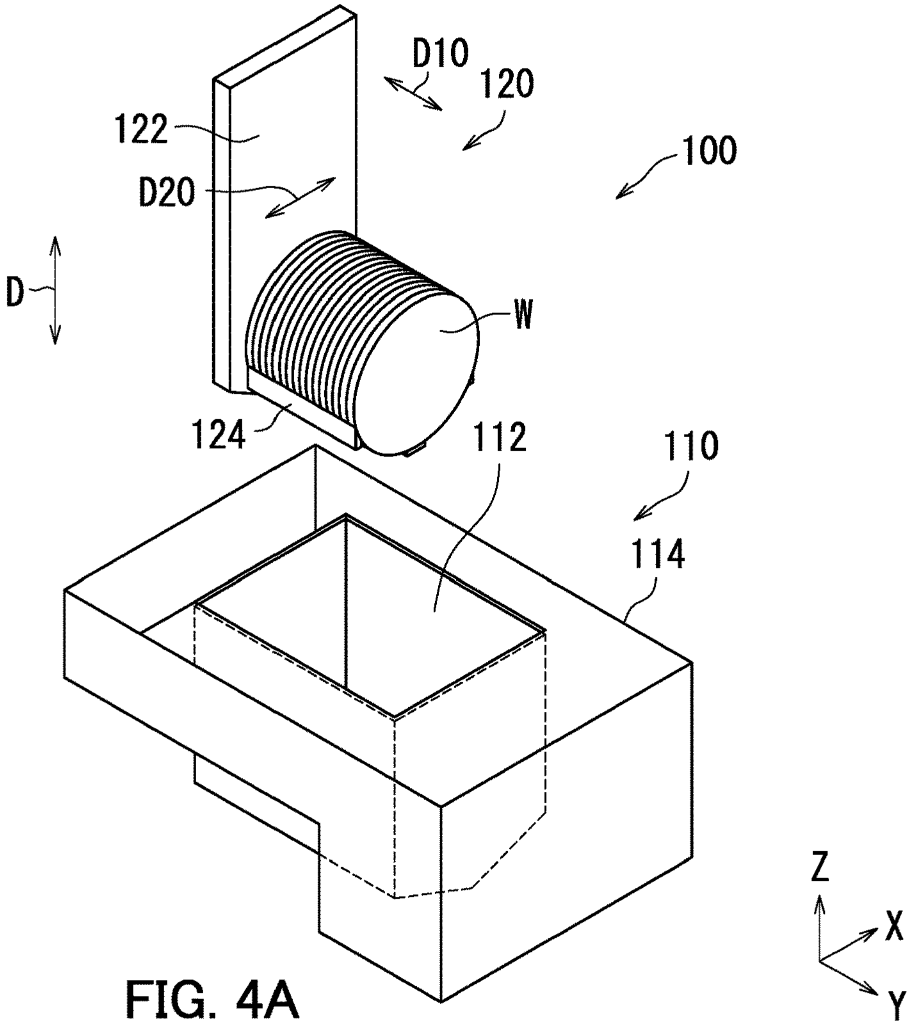
FIG. 4A is a diagram illustrating a state of a substrate before immersion in an alkaline processing liquid in the first embodiment.
Figure 4B:
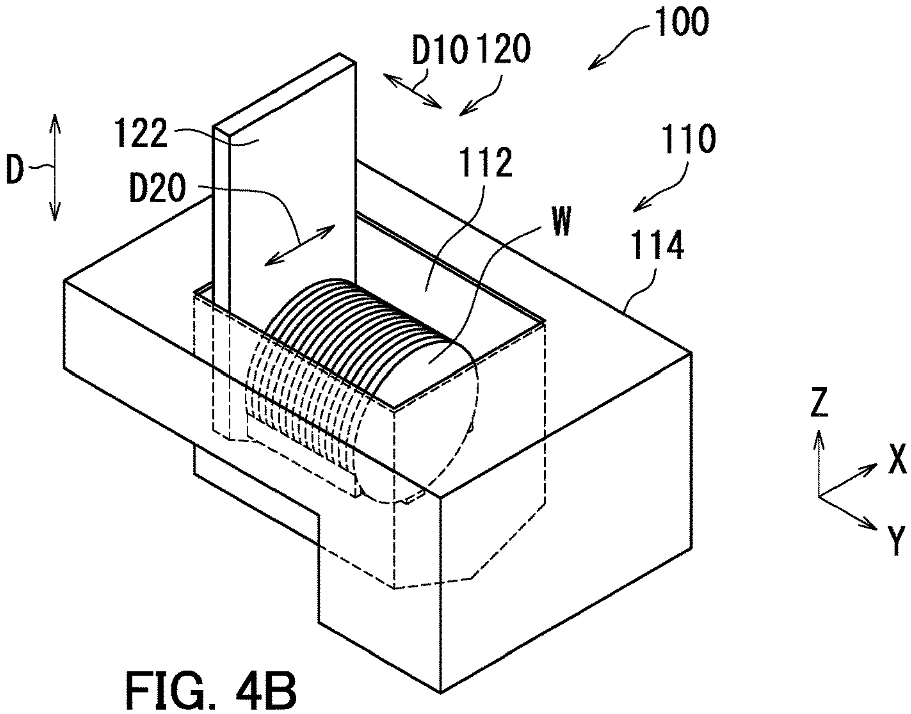
FIG. 4B is a diagram illustrating a state of a substrate immersed in an alkaline processing liquid in the first embodiment.

Next, the substrate processing apparatus 100 before and after immersion of the substrates W in the processing tank 110 will be described with reference to FIGS. 4A and 4B. FIGS. 4A and 4B are schematic perspective views of the substrate processing apparatus 100 before and after immersion of the substrate Win the processing tank 110. It should be noted that the lid 116 and the alkaline processing liquid LQ in the processing tank 110, which are illustrated in FIG. 1, are not illustrated in FIGS. 4A and 4B for simplicity and to avoid unnecessarily obscuring the figures. FIGS. 4A and 4B illustrate an example in which a batch of substrates W (e.g., 25 substrates) is treated in the processing tank 110.

As illustrated in FIG. 4A, the substrate holding section 120 holds a plurality of substrates W (a batch of substrates W) with the substrates W spaced apart in a first direction D10 (Y direction). The plurality of substrates W are arranged in line in the first direction D10. In other words, the first direction D10 indicates the direction in which the plurality of substrates W are aligned. The first direction D10 is generally parallel to the horizontal direction, and is generally perpendicular to the vertical direction D. Each substrate W is generally parallel to a second direction D20. The second direction D20 is generally orthogonal to the first direction D10 and the vertical direction D, and is generally parallel to the horizontal direction.

The first direction D10 corresponds to an example of a "predetermined direction" of the present disclosure.

In FIG. 4A, the substrate holding section 120 is located above the inner tank 112. The substrate holding section 120 is lowered downward in the vertical direction (Z direction) while holding the plurality of substrates W. As a result, the plurality of substrates W are put into the inner tank 112. As illustrated in FIG. 4B, when the substrate holding section 120 is lowered to the inner tank 112, the plurality of substrates W are immersed in the alkaline processing liquid LQ in the inner tank 112.

Next, the bubble supply section 200 will be described with reference to FIG. 5. FIG. 5 is a schematic plan view illustrating the bubble supply section 200. As illustrated in FIG. 5, if it is necessary to distinguish the plurality of bubble supply pipes 21 from each other, the plurality of bubble supply pipes 21 are described as a bubble supply pipe 21*a*, a bubble supply pipe 21*b*, a bubble supply pipe 21*c*, a bubble supply pipe 21*d*, a bubble supply pipe 21*e*, and a bubble supply pipe 21*f*, which are arranged in the stated order from right to left in FIG. 5.

The plurality of bubble supply pipes 21 are arranged in parallel and spaced apart in a plan view thereof. In the example of FIG. 5, the plurality of bubble supply pipes 21 are arranged symmetrically about a virtual center line CL. The virtual center line CL extends through a center of each substrate Win the first direction D10.

Specifically, the plurality of bubble supply pipes 21 are arranged in the processing tank 110 generally in parallel and spaced apart in the second direction D20. The bubble supply pipes 21 extend in the first direction D10. In each bubble supply pipe 21, the plurality of bubble holes G are arranged in a generally straight line and spaced apart in the first direction D10. In the example of FIG. 5, in each bubble supply pipe 21, the plurality of bubble holes G are arranged in a generally straight line and equally spaced in the first direction D10. In each bubble supply pipe 21, each bubble hole G is provided in an upper surface of the bubble supply pipe 21.

Each bubble supply pipe 21 has a first pipe section T1, a second pipe section T2, and a third pipe section T3. The first pipe section T1 extends outward in the first direction D10 relative to one (W1) of the plurality of substrates W that is disposed at one end in the first direction D10. The second pipe section T2 extends outward in the first direction D10 relative to one (W2) of the plurality of substrates W that is disposed at the other end in the first direction D10. The third pipe section T3 is a portion of the bubble supply pipe 21 between the first pipe section T1 and the second pipe section T2.

In each bubble supply pipe 21, the plurality of bubble holes G include a plurality of first bubble holes G1, a plurality of second bubble holes G2, and a plurality of third bubble holes G3.

In the first pipe section T1, the first bubble holes G1 of the plurality of bubble holes G are disposed. In the example of FIG. 5, five first bubble holes G1 are disposed in the first pipe section T1. In the second pipe section T2, the second bubble holes G2 of the plurality of bubble holes G are disposed. In the example of FIG. 5, five second bubble holes G2 are disposed in the second pipe section T2. In the third pipe section T3 between the first pipe section T1 and the second pipe section T2, the third bubble holes G3 are disposed.

Specifically, a plurality of clearances GP are present in the array of the plurality of substrates W. Each clearance GP is a space between adjacent substrates W in the first direction D10. The plurality of clearances GP are separated by the substrates W and are aligned in the first direction D10.

In each bubble supply pipe 21, the first bubble holes G1 are disposed outward of the substrate W1 in the first direction D10. In each bubble supply pipe 21, the second bubble holes G2 are disposed outward of the substrate W2 in the first direction D10. In each bubble supply pipe 21, the plurality of third bubble holes G3 are disposed, corresponding to the plurality of clearances GP, respectively. In the example of FIG. 5, in each of the bubble supply pipes 21*b* to 21*e*, the plurality of third bubble holes G3 face the plurality of clearances GP, respectively, in the vertical direction D. In each of the bubble supply pipes 21*a* and 21*f*, the plurality of third bubble holes G3 face the plurality of clearances GP, respectively, in a direction intersecting with the vertical direction D.

In each bubble supply pipe 21, the number of first bubble holes G1 is preferably greater than the number of ones, of the plurality of third bubble holes G3, disposed corresponding to one of the clearances GP. In addition, in each bubble supply pipe 21, the number of second bubble holes G2 is preferably greater than the number of ones, of the plurality of third bubble holes G3, disposed corresponding to the one of the clearances GP. In this preferable example, the bubbles BB smoothly rise in the vicinity of the opposite ends of the array of substrates W in the first direction D10. Therefore, the bubbles BB can be effectively supplied to the surfaces of substrates W in the vicinity of the opposite ends in the first direction D10 (e.g., the substrates W1 and W2). As a result, the alkaline processing liquid LQ that is in contact with substrates W in the vicinity of the opposite ends in the first direction D10 can be effectively replaced with a fresh alkaline processing liquid LQ. For example, a large number of bubbles BB can be effectively supplied to the clearance GP between the substrate W1 and the adjacent substrate W, and the clearance GP between the substrate W2 and the adjacent substrate W, and therefore, the alkaline processing liquid LQ can be effectively replaced with a fresh alkaline processing liquid LQ at these clearances GP.

It should be noted that, for example, unless the first bubble holes G1 and the second bubble holes G2 are provided, the rise of the bubbles BB may be reduced in the vicinity the opposite ends of the array of substrates W in the first direction D10 due to an influence of the downward flow of the alkaline processing liquid LQ. As a result, the bubbles BB may have difficulties in entering clearances GP in the vicinity of the opposite ends of the array of substrates W in the first direction D10. For this reason, by providing a greater number of the first bubble holes G1 and the second bubble holes G2 than the number of the third bubble holes G3 in each clearance GP, the bubbles BB are caused to smoothly rise, whereby the influence of the downward flow of the alkaline processing liquid LQ is reduced. It should be noted that the downward flow of the alkaline processing liquid LQ may, for example, be produced by the liquid surface as the alkaline processing liquid LQ rises in the clearances GP to reach the liquid surface. It should be noted that in the example of FIG. 5, the plurality of bubble holes G include the five first bubble holes G1 and the five second bubble holes G2. In each bubble supply pipe 21, a third bubble hole G3 is disposed for each clearance GP. In other words, in each bubble supply pipe 21, a third bubble hole G3 is disposed, facing each clearance GP. In this case, for example, in the case where the substrate holding section 120 holds K substrates W, (K−1) third bubble holes G3 are provided. K represents, for example, an integer of two or more. K is, for example, 50.

Here, in the example of FIG. 5, the bubble supply pipe 21*a* and the bubble supply pipe 21*f* are located outward of the substrates W in the second direction D20 in the plan view. It should be noted that the bubble supply pipe 21*a* and the bubble supply pipe 21*f* may overlap with the substrates W in the plan view. The bubble supply pipe 21*a* and the bubble supply pipe 21*f* are the outermost ones of the bubble supply pipes 21*a* to 21*f* in the second direction D20. The bubble supply pipe 21*c* and the bubble supply pipe 21*d* are the innermost ones of the bubble supply pipes 21*a* to 21*f* in the second direction D20. The bubble supply pipe 21*b* is disposed between the bubble supply pipe 21*a* and the bubble supply pipe 21*c*. The bubble supply pipe 21*e* is disposed between the bubble supply pipe 21*d* and the bubble supply pipe 21*f*.

Still referring to FIG. 5, the bubble adjustment section 180 and the pipe 181 will be described. The bubble adjustment section 180 supplies the gas GA to each bubble supply pipe 21 separately, and thereby supplies the bubbles BB from the bubble holes G to the alkaline processing liquid LQ (FIG. 1) in the processing tank 110. As the flow rate of the gas GA supplied to the bubble supply pipe 21 is increased, more bubbles BB are supplied from the bubble supply pipe 21.

Specifically, an end of each pipe 181 is connected to an end portion of the corresponding bubble supply pipe 21 in the first direction D10. Meanwhile, the other end of each pipe 181 is connected to the corresponding bubble adjustment mechanism 182. Each bubble adjustment mechanism 182 supplies the gas GA to the corresponding bubble supply pipe 21 through the corresponding pipe 181. Each bubble adjustment mechanism 182 also adjusts the flow rate of the gas GA to be supplied to the corresponding pipe 181 separately, and thereby adjusts the flow rate of the gas GA to be supplied to the corresponding bubble supply pipe 21 separately.

Specifically, the bubble adjustment mechanism 182 includes a valve 41, a filter 42, a flow rate meter 43, and a metering valve 44. The valve 41, the filter 42, the flow rate meter 43, and the metering valve 44 are disposed in the stated order in the pipe 181 from downstream to upstream of the pipe 181.

The metering valve 44 adjusts the opening degree of the pipe 181 to adjust the flow rate of the gas GA to be supplied to the pipe 181, and thereby adjusts the flow rate of the gas GA to be supplied to the bubble supply pipe 21. The flow rate meter 43 measures the flow rate of the gas GA flowing in the pipe 181. The metering valve 44 adjusts the flow rate of the gas GA based on the result of the measurement by the flow rate meter 43. It should be noted that, for example, a mass flow controller may be provided instead of the metering valve 44 and the flow rate meter 43.

The filter 42 removes foreign matter from the gas GA flowing in the pipe 181. The valve 41 opens and closes the pipe 181. Specifically, the valve 41 switches between supply and shut-off of the gas GA from the pipe 181 to the bubble supply pipe 21.

It should be noted that if it is necessary to distinguish the plurality of bubble adjustment mechanisms 182 from each other, the plurality of bubble adjustment mechanisms 182 are described as a bubble adjustment mechanism 182*a*, a bubble adjustment mechanism 182*b*, a bubble adjustment mechanism 182*c*, a bubble adjustment mechanism 182*d*, a bubble adjustment mechanism 182*e*, and a bubble adjustment mechanism 182*f*, which are arranged in the stated order from top to bottom in FIG. 5. The bubble adjustment mechanisms 182*a* to 182*f* adjust the flow rate of the gas GA to be supplied to the bubble supply pipes 21*a* to 21*f*, respectively.

Figure 6:
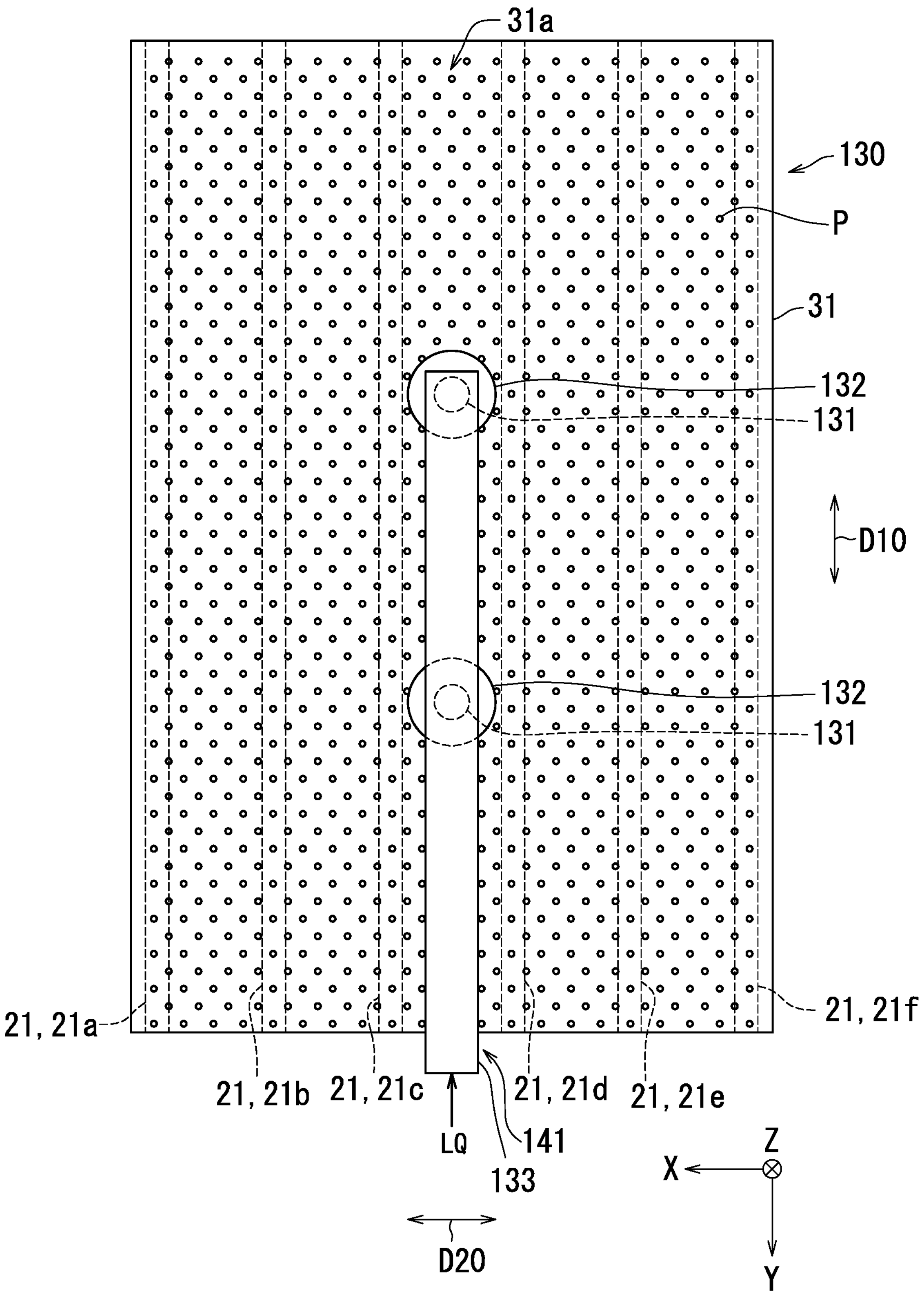
FIG. 6 is a schematic back view illustrating a processing liquid introduction section in the substrate processing apparatus of the first embodiment.

Next, the processing liquid introduction section 130 will be described with reference to FIG. 6. FIG. 6 is a schematic back view illustrating the processing liquid introduction section 130. As illustrated in FIG. 6, the processing liquid introduction section 130 includes a plurality of discharge parts 131 and a plurality of dispersion boards 132. In the example of FIG. 6, the processing liquid introduction section 130 includes two discharge parts 131 and two dispersion boards 132. The plurality of discharge parts 131 are arranged and spaced apart in the first direction D10. The plurality of dispersion boards 132 are arranged and spaced apart in the first direction D10. The plurality of dispersion boards 132 correspond to the plurality of discharge parts 131, respectively. The plurality of dispersion boards 132 are disposed below the plate 31. In the example of FIG. 6, the dispersion board 132 is in the shape of a generally circular board. The plurality of discharge parts 131 are disposed below the plurality of dispersion boards 132, respectively.

The discharge part 131 and the dispersion board 132 are disposed, corresponding to a middle region 31*a* of the plate 31 in the second direction D20 in the back view. The middle region 31*a* extends in the first direction D10.

The pipe 141 of the circulation section 140 (FIG. 1) includes a pipe 133. The pipe 133 extends from one end toward the other end of the plate 31 in the first direction D10. The pipe 133 extends in the first direction D10. The pipe 133 is opposite a back surface of the plate 31. In other words, the pipe 133 is disposed below the plate 31. Specifically, the pipe 133 is disposed below the dispersion boards 132.

The discharge part 131 is connected to an upper surface of the pipe 133. The discharge part 131 is in communication with the pipe 133. The discharge part 131 protrudes upward in the vertical direction from the pipe 133 toward the dispersion board 132. The alkaline processing liquid LQ is supplied from the circulation section 140 to the pipe 133. As a result, the discharge part 131 discharges the alkaline processing liquid LQ toward the dispersion board 132. Therefore, the pressure of the alkaline processing liquid LQ is dispersed, so that the alkaline processing liquid LQ is spread in the horizontal direction. Thereafter, the alkaline processing liquid LQ rises from the plurality of processing liquid holes P to form a laminar flow. The plurality of processing liquid holes P are formed throughout the plate 31.

Next, an example of processing of the substrate W by adjusting the bubbles BB will be described with reference to FIGS. 7A to 7D. FIGS. 7A to 7D are schematic diagrams illustrating an example of a flow of the processing of the substrate W.

Figures 7A, 7B, 7C, 7D:
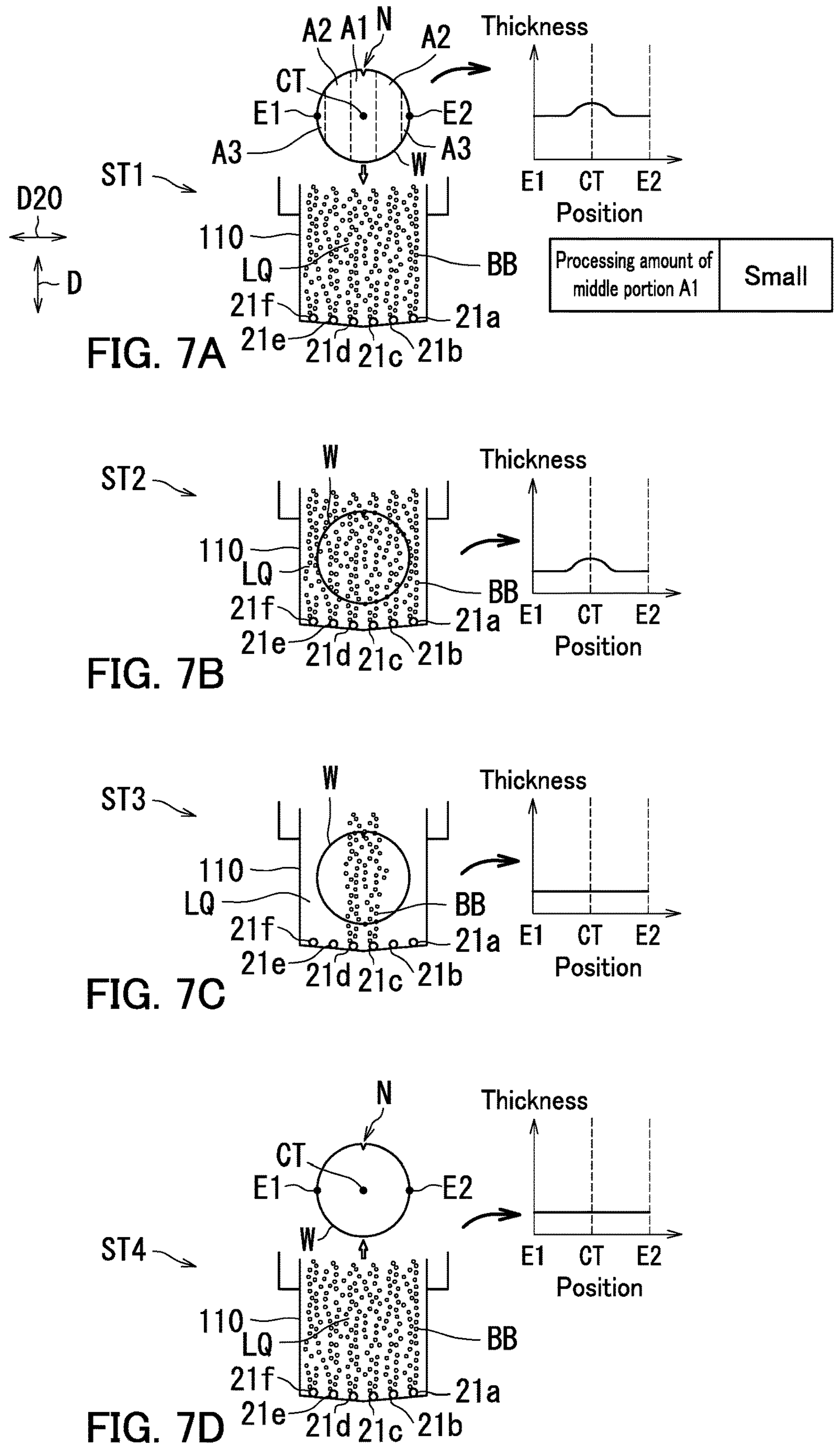
FIG. 7A is a diagram illustrating a state of a substrate before immersion in an alkaline processing liquid in the first embodiment.
FIG. 7B is a schematic diagram illustrating a state in which the substrate is immersed in the alkaline processing liquid, and all bubble supply pipes supply bubbles in the first embodiment.
FIG. 7C is a schematic diagram illustrating a state in which the substrate is immersed in the alkaline processing liquid, and bubbles are supplied from two bubble supply pipes which correspond to a substrate middle portion in the first embodiment.
FIG. 7D is a schematic diagram illustrating a state in which the substrate has been pulled up from the alkaline processing liquid in the first embodiment.

FIG. 7A illustrates a state ST1 of the substrate W before immersion in the alkaline processing liquid LQ. The substrate W has been subjected to another processing before immersion.

Another processing performed on the substrate W before immersion in the alkaline processing liquid LQ of the processing tank 110 is hereinafter referred to as a "preliminary processing."

The substrate W includes a substrate middle portion A1, two substrate intermediate portions A2, and two substrate end portions A3. The substrate middle portion A1 includes a center CT of the substrate W, and extends in the vertical direction D. The substrate middle portion A1 indicates a middle region of the substrate W in the second direction D20. The substrate end portions A3 indicate end regions of the substrate W in the second direction D20. The substrate end portions A3 extend in the vertical direction D. One of the two substrate end portions A3 includes an edge E1 of the substrate W. The other of the two substrate end portions A3 includes an edge E2 of the substrate W. The edges E1 and E1 indicate peaks of the substrate W of the second direction D20. The substrate intermediate portions A2 are regions between the substrate middle portion A1 and the substrate end portions A3. The two substrate intermediate portions A2 interpose the substrate middle portion A1.

The substrate W has a notch N. The substrate holding section 120 (FIG. 1) holds the substrate W with the notch N located at a peak in the vertical direction D. Therefore, the substrate W is immersed in the alkaline processing liquid LQ with the notch N located at a peak in the vertical direction D.

Furthermore, in a state in which the notch N is located at a peak in the vertical direction D, the thickness of the substrate W in the second direction D2 is indicated. In the state ST1, the thickness of the substrate middle portion A1 is greater than the thicknesses of the substrate intermediate portions A2 and the substrate end portions A3. Therefore, the processing amount (the amount of etching) of the substrate middle portion A1 in the preliminary processing is smaller than the processing amounts (the amounts of etching) of the substrate intermediate portions A2 and the substrate end portions A3 in the preliminary processing.

In the state ST1, all of the bubble supply pipes 21*a* to 21*f* supply the bubbles BB to the alkaline processing liquid LQ. For example, after a first predetermined period of time has passed since the start of supply of the bubbles BB, the substrate W is immersed in the alkaline processing liquid LQ. The first predetermined period of time indicates the time it takes for the concentration of dissolved oxygen in the alkaline processing liquid LQ to become substantially constant. The first predetermined period of time is, for example, 2 hours. In other words, after the concentration of dissolved oxygen in the alkaline processing liquid LQ has become substantially constant (FIG. 3), the substrate W is immersed in the alkaline processing liquid LQ.

FIG. 7B illustrates a state ST2 in which the substrate W is immersed in the alkaline processing liquid LQ, and all of the bubble supply pipes 21*a* to 21*f* supply the bubbles BB. The processing in the state ST2 is performed for a second predetermined period of time. As a result, the substrate W is entirely treated, so that the thickness of the substrate W is entirely reduced. The second predetermined period of time is determined based on a target value of the processing amount. After the processing in the state ST2, processing is performed in a state ST3.

FIG. 7C illustrates the state ST3 in which the substrate W is immersed in the alkaline processing liquid LQ, and the bubbles BB are supplied from the two bubble supply pipes 21*c* and 21*d*, which correspond to the substrate middle portion A1. The processing in the state ST3 is performed for a third predetermined period of time. The third predetermined period of time is determined based on the thickness (FIG. 7A) of the substrate W before immersion. In other words, the third predetermined period of time is determined based on the processing amount (FIG. 7A) of the substrate W before immersion.

In the substrate W before immersion, the processing amount of the substrate middle portion A1 in the preliminary processing is smaller than the processing amounts of the substrate intermediate portions A2 and the substrate end portions A3 (FIG. 7A). Thus, before immersion, the thickness of the substrate middle portion A1 is greater than the thicknesses of the substrate intermediate portions A2 and the substrate end portions A3. Therefore, in order to improve the in-plane uniformity of the thickness of the substrate W, it is necessary to cause the processing amount of the substrate middle portion A1 to be greater than the processing amounts of the substrate intermediate portions A2 and the substrate end portions A3.

Therefore, in the state ST3, only the two bubble supply pipes 21*c* and 21*d*, which correspond to the substrate middle portion A1, supply the bubbles BB, and the two bubble supply pipes 21*b* and 21*e*, which correspond to the substrate intermediate portions A2, and the two bubble supply pipes 21*a* and 21*f*, which correspond to the substrate end portions A3, shut off the supply of the bubbles BB. Therefore, the concentrations of dissolved oxygen in the vicinity of the substrate intermediate portions A2 and the substrate end portions A3 are higher than the concentration of dissolved oxygen in the vicinity of the substrate middle portion A1. In other words, the concentration of dissolved oxygen in the vicinity of the substrate middle portion A1 is relatively low compared to the concentrations of dissolved oxygen in the vicinity of the substrate intermediate portions A2 and the substrate end portions A3. Therefore, the processing amount of the substrate middle portion A1 with the alkaline processing liquid LQ is greater than the processing amounts of the substrate intermediate portions A2 and the substrate end portions A3 with the alkaline processing liquid LQ. As a result, the thicknesses of the substrate middle portion A1, the substrate intermediate portions A2, and the substrate end portions A3 become substantially the same. In other words, the in-plane uniformity of the processing amount of the substrate W is improved. After the processing in the state ST3, processing is performed in a state ST4.

It should be noted that the flow rate of the gas GA supplied from the bubble adjustment section 180 to each of the bubble supply pipes 21*c* and 21*d* may be greater than the flow rate of the gas GA supplied from the bubble adjustment section 180 to each of the bubble supply pipes 21*a*, 21*b*, 21*e*, and 21*f* In that case, like the foregoing, the concentration of dissolved oxygen in the vicinity of the substrate middle portion A1 can be relatively low compared to the concentrations of dissolved oxygen in the vicinity of the substrate intermediate portions A2 and the substrate end portions A3. As a result, like the foregoing, the in-plane uniformity of the processing amount of the substrate W is improved.

FIG. 7D illustrates the state ST4 in which the substrate W has been pulled up from the alkaline processing liquid LQ. In the state ST4, all of the bubble supply pipes 21*a* to 21*f* supply the bubbles BB to the alkaline processing liquid LQ. The state ST4 is maintained for at least a fourth predetermined period of time. The fourth predetermined period of time indicates the time it takes for the concentration of dissolved oxygen in the alkaline processing liquid LQ to become substantially constant. The fourth predetermined period of time is, for example, 2 hours.

Next, another example of the processing of the substrate W by adjusting the bubbles BB will be described with reference to FIGS. 8A to 8D. FIGS. 8A to 8D are schematic diagrams illustrating an example of a flow of the processing of the substrate W. A difference between the state of FIG. 8 and the state of FIG. 7 will be mainly described below.

Figure 8A:
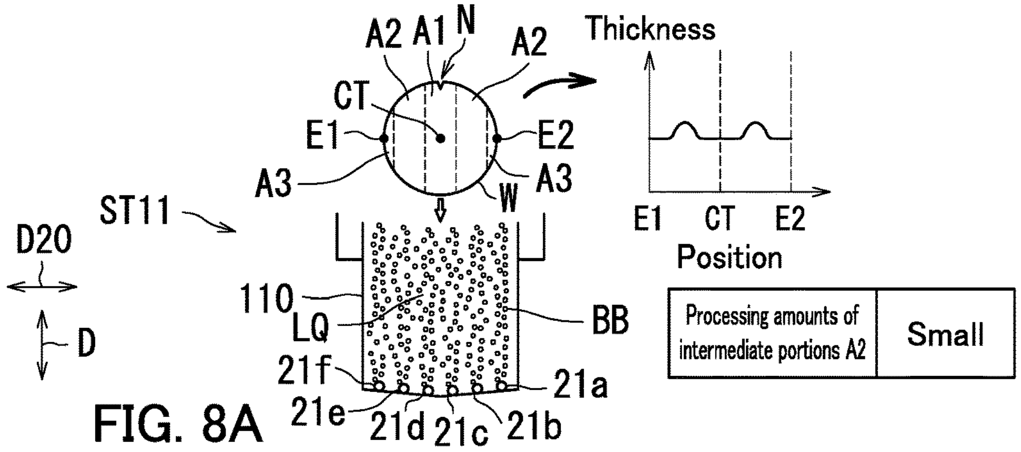
FIG. 8A is a diagram illustrating a state of a substrate before immersion in an alkaline processing liquid in the first embodiment.

FIG. 8A illustrates a state ST11 of the substrate W before immersion in the alkaline processing liquid LQ. The substrate W has been subjected to another processing before immersion. In other words, the substrate W has been subjected to a preliminary processing.

In the state ST11, the thicknesses of the substrate intermediate portions A2 are greater than the thicknesses of the substrate middle portion A1 and the substrate end portions A3. Therefore, the processing amounts (the amounts of etching) of the substrate intermediate portions A2 in the preliminary processing are smaller than the processing amounts (the amount of etching) of the substrate middle portion A1 and the substrate end portions A3 in the preliminary processing.

In the state ST11, all of the bubble supply pipes 21*a* to 21*f* supply the bubbles BB to the alkaline processing liquid LQ.

Figure 8B:
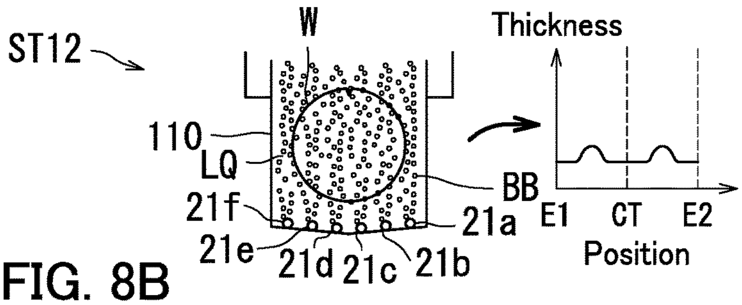
FIG. 8B is a schematic diagram illustrating a state in which the substrate is immersed in the alkaline processing liquid, and all bubble supply pipes supply bubbles in the first embodiment.

FIG. 8B illustrates a state ST12 in which the substrate W is immersed in the alkaline processing liquid LQ, and all of the bubble supply pipes 21*a* to 21*f* supply the bubbles BB.

Figure 8C:
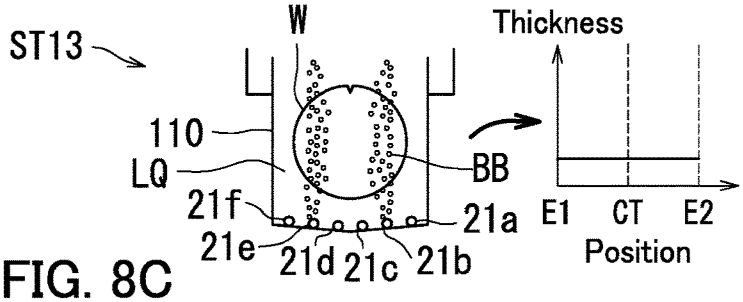
FIG. 8C is a schematic diagram illustrating a state in which the substrate is immersed in the alkaline processing liquid, and bubbles are supplied from two bubble supply pipes which correspond to substrate intermediate portions in the first embodiment.

FIG. 8C illustrates a state ST13 in which the substrate W is immersed in the alkaline processing liquid LQ, and the two bubble supply pipes 21*b* and 21*e*, which correspond to the substrate intermediate portions A2, supply the bubbles BB. The processing in the state ST13 is performed for a third predetermined period of time. The third predetermined period of time is determined based on the thickness (FIG. 8A) of the substrate W before immersion. In other words, the third predetermined period of time is determined based on the processing amount (FIG. 8A) of the substrate W before immersion.

In the substrate W before immersion, the processing amounts of the substrate intermediate portions A2 in the preliminary processing are smaller than the processing amounts of the substrate middle portion A1 and the substrate end portions A3 (FIG. 8A). In other words, before immersion, the thicknesses of the substrate intermediate portions A2 are greater than the thicknesses of the substrate middle portion A1 and the substrate end portions A3. Therefore, in order to improve the in-plane uniformity of the thickness of the substrate W, it is necessary to cause the processing amounts of the substrate intermediate portions A2 to be greater than the processing amounts of the substrate middle portion A1 and the substrate end portions A3.

To this end, in the state ST13, only the two bubble supply pipes 21*b* and 21*e*, which correspond to the substrate intermediate portions A2, supply the bubbles BB, and the two bubble supply pipes 21*c* and 21*d*, which correspond to the substrate middle portion A1, and the two bubble supply pipes 21*a* and 21*f*, which correspond to the substrate end portions A3, shut off the supply of the bubbles BB. Therefore, the concentrations of dissolved oxygen in the vicinity of the substrate middle portion A1 and the substrate end portions A3 are higher than the concentrations of dissolved oxygen in the vicinity of the substrate intermediate portions A2. In other words, the concentrations of dissolved oxygen in the vicinity of the substrate intermediate portions A2 are relative low compared to the concentrations of dissolved oxygen in the vicinity of the substrate middle portion A1 and the substrate end portions A3. Therefore, the processing amounts of the substrate intermediate portions A2 with the alkaline processing liquid LQ are greater than the processing amounts of the substrate middle portion A1 and the substrate end portions A3 with the alkaline processing liquid LQ. As a result, the thicknesses of the substrate middle portion A1, the substrate intermediate portions A2, and the substrate end portions A3 become substantially the same. Thus, the in-plane uniformity of the processing amount of the substrate W is improved. After the processing in the state ST13, processing in a state ST14 is performed.

It should be noted that the flow rate of the gas GA supplied from the bubble adjustment section 180 to each of the bubble supply pipes 21*b* and 21*e* may be caused to be greater than the flow rate of the gas GA supplied from the bubble adjustment section 180 to each of the bubble supply pipes 21*a*, 21*c*, 21*d*, and 21*f*. In that case, like the foregoing, the concentrations of dissolved oxygen in the vicinity of the substrate intermediate portions A2 can be caused to be relatively low compared to the concentrations of dissolved oxygen in the vicinity of the substrate middle portion A1 and the substrate end portions A3. As a result, like the foregoing, the in-plane uniformity of the processing amount of the substrate W is improved.

Figure 8D:
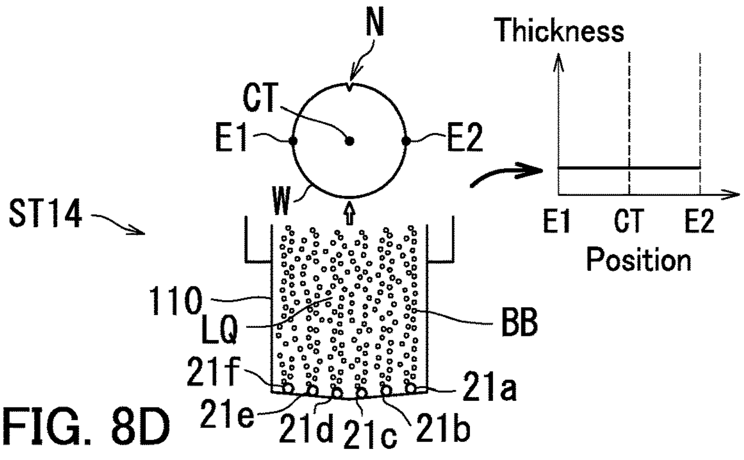
FIG. 8D is a schematic diagram illustrating a state in which the substrate has been pulled up from the alkaline processing liquid in the first embodiment.

FIG. 8D illustrates the state ST14 in which the substrate W has been pulled up from the alkaline processing liquid LQ.

Next, still another example of processing of the substrate W by adjusting the bubbles BB will be described with reference to FIGS. 9A to 9D. FIGS. 9A to 9D are schematic diagrams illustrating a flow of the processing of the substrate W. A difference between the state of FIGS. 9A to 9D and the state of FIG. 7 will be mainly described below.

Figure 9A:
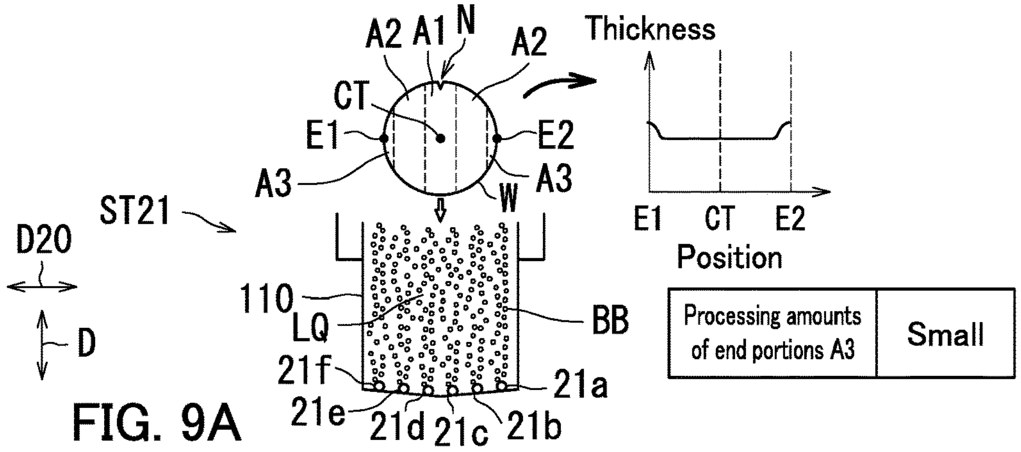
FIG. 9A is a diagram illustrating a state of a substrate before immersion in an alkaline processing liquid in the first embodiment.

FIG. 9A illustrates a state ST21 of the substrate W before immersion in the alkaline processing liquid LQ. The substrate W has been subjected to another processing before immersion. In other words, the substrate W has been subjected to a preliminary processing.

In the state ST21, the thicknesses of the substrate end portions A3 are greater than the thicknesses of the substrate middle portion A1 and the substrate intermediate portions A2. Therefore, the processing amounts (the amounts of etching) of the substrate end portions A3 in the preliminary processing are smaller than the processing amounts (the amount of etching) of the substrate middle portion A1 and the substrate intermediate portions A2 in the preliminary processing.

In the state ST21, all of the bubble supply pipes 21*a* to 21*f* supply the bubbles BB to the alkaline processing liquid LQ.

Figure 9B:
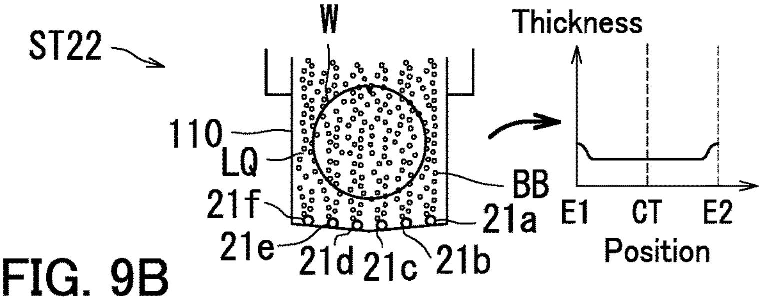
FIG. 9B is a schematic diagram illustrating a state in which the substrate is immersed in the alkaline processing liquid, and all bubble supply pipes supply bubbles in the first embodiment.

FIG. 9B illustrates a state ST22 in which the substrate W is immersed in the alkaline processing liquid LQ, and all of the bubble supply pipes 21*a*-21*f* supply the bubbles BB.

Figure 9C:
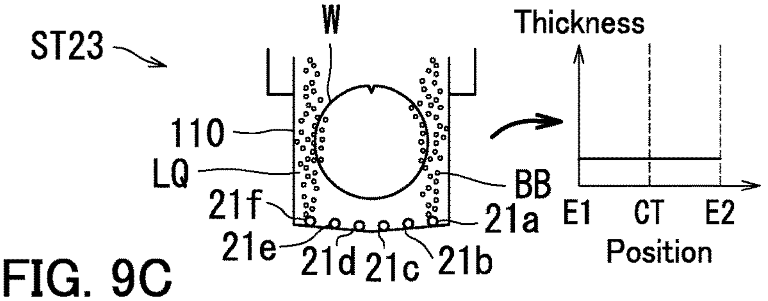
FIG. 9C is a schematic diagram illustrating a state in which the substrate is immersed in the alkaline processing liquid, and bubbles are supplied from two bubble supply pipes which correspond to substrate end portions in the first embodiment.

FIG. 9C illustrates a state ST23 in which the substrate W is immersed in the alkaline processing liquid LQ, and the two bubble supply pipes 21*a* and 21*f*, which correspond to the substrate end portions A3, supply the bubbles BB. The processing in the state ST23 is performed for a third predetermined period of time. The third predetermined period of time is determined based on the thickness (FIG. 9A) of the substrate W before immersion. In other words, the third predetermined period of time is determined based on the processing amount (FIG. 9A) of the substrate W before immersion.

In the substrate W before immersion, the processing amounts of the substrate end portions A3 in the preliminary processing are smaller than the processing amounts of the substrate middle portion A1 and the substrate intermediate portions A2 (FIG. 9A). In other words, before immersion, the thicknesses of the substrate end portions A3 are greater than the thicknesses of the substrate middle portion A1 and the substrate intermediate portions A2. Therefore, in order to improve the in-plane uniformity of the thickness of the substrate W, it is necessary to cause the processing amounts of the substrate end portions A3 to be greater than the processing amounts of the substrate middle portion A1 and the substrate intermediate portions A2.

To this end, in the state ST23, only the two bubble supply pipes 21*a* and 21*f*, which correspond to the substrate end portions A3, supply the bubbles BB, and the two bubble supply pipes 21*c* and 21*d*, which correspond to the substrate middle portion A1, and the two bubble supply pipes 21*b* and 21*e*, which correspond to the substrate intermediate portions A2, shut off the supply of the bubbles BB. Therefore, the concentrations of dissolved oxygen in the vicinity of the substrate middle portion A1 and the substrate intermediate portions A2 are higher than the concentrations of dissolved oxygen in the vicinity of the substrate end portions A3. In other words, the concentrations of dissolved oxygen in the vicinity of the substrate end portions A3 are relatively low compared to the concentrations of dissolved oxygen in the vicinity of the substrate middle portion A1 and the substrate intermediate portions A2. Therefore, the processing amounts of the substrate end portions A3 with the alkaline processing liquid LQ are greater than the processing amounts of the substrate middle portion A1 and the substrate intermediate portions A2 with the alkaline processing liquid LQ. As a result, the thicknesses of the substrate middle portion A1, the substrate intermediate portions A2, and the substrate end portions A3 become substantially the same. Thus, the in-plane uniformity of the processing amount of the substrate W is improved. After the processing in the state ST23, processing in a state ST24 is performed.

It should be noted that the flow rate of the gas GA supplied from the bubble adjustment section 180 to each of the bubble supply pipes 21*a* and 21*f* may be caused to be greater than the flow rate of the gas GA supplied from the bubble adjustment section 180 to each of the bubble supply pipes 21*b* to 21*e*. In that case, like the foregoing, the concentrations of dissolved oxygen in the vicinity of the substrate end portions A3 can be caused to be relatively low compared to the concentrations of dissolved oxygen in the vicinity of the substrate middle portion A1 and the substrate intermediate portions A2. As a result, like the foregoing, the in-plane uniformity of the processing amount of the substrate W is improved.

Figure 9D:
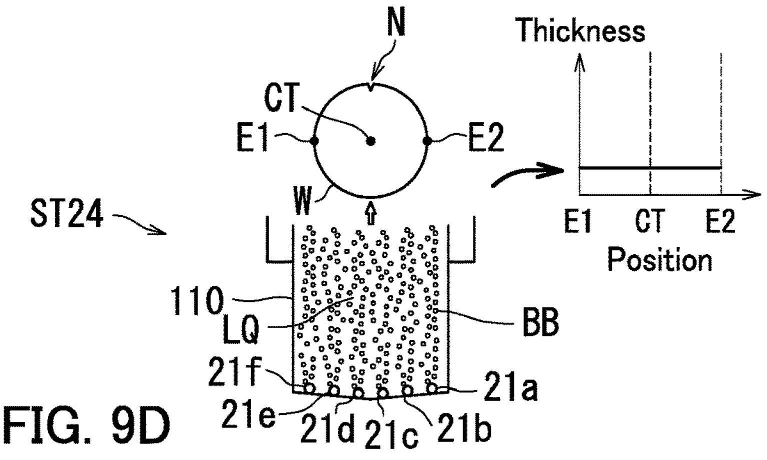
FIG. 9D is a schematic diagram illustrating a state in which the substrate has been pulled up from the alkaline processing liquid in the first embodiment.

FIG. 9D illustrates the state ST24 in which the substrate W has been pulled up from the alkaline processing liquid LQ.

In the foregoing, the processing of the substrate W by adjusting the bubbles BB has been described with reference to FIG. 7A to 9D. It should be noted that which of the bubble supply pipes 21*a* to 21*f* shuts off the supply of the bubbles BB is determined based on the distribution of the thickness of the substrate W before immersion, i.e., the distribution of the processing amount of the substrate W before immersion. In other words, which of the bubble supply pipes 21*a* to 21*f* continues supplying the bubbles BB is determined based on the distribution of the thickness of the substrate W before immersion, i.e., the distribution of the processing amount of the substrate W before immersion.

For example, if the processing amounts of the substrate intermediate portions A2 and the substrate end portions A3 before immersion are smaller than the processing amount of the substrate middle portion A1 before immersion, the bubble supply pipes 21*a*, 21*b*, 21*e*, and 21*f* supply the bubbles BB, and the bubble supply pipes 21*c* and 21*d* shut off the supply of the bubbles BB.

For example, if the processing amount of the substrate middle portion A1 before immersion is greater than the processing amounts of the substrate intermediate portions A2 and the substrate end portions A3 before immersion, the bubble supply pipes 21*c* and 21*d* shut off the supply of the bubbles BB, and the bubble supply pipes 21*a*, 21*b*, 21*e*, and 21*f* supply the bubbles BB.

For example, the processing amounts of the substrate intermediate portions A2 before immersion are greater than the processing amounts of the substrate middle portion A1 and the substrate end portions A3 before immersion, the bubble supply pipes 21*b* and 21*e* shut off the supply of the bubbles BB, and the bubble supply pipes 21*a*, 21*c*, 21*d*, and 21*f* supply the bubbles BB.

For example, if the processing amounts of the substrate end portions A3 before immersion are greater than the processing amounts of the substrate middle portion A1 and the substrate intermediate portions A2 before immersion, the bubble supply pipes 21*a* and 21*f* shut off the supply of the bubbles BB, and the bubble supply pipes 21*b* to 21*e* supply the bubbles BB. There are any other possible combinations of the bubble supply pipes 21*a* to 21*f* that supply and shut off the bubbles BB.

The concentration of dissolved oxygen may be adjusted in the vicinity of each of the substrate middle portion A1, the substrate intermediate portions A2, and the substrate end portions A3 by adjusting the flow rate of the gas GA for producing the bubbles BB for each of the bubble supply pipes 21*a* to 21*f* based on the distribution of the thickness of the substrate W before immersion, i.e., the distribution of the processing amount of the substrate W before immersion. In other words, the concentration of dissolved oxygen may be adjusted in the vicinity of each of the substrate middle portion A1, the substrate intermediate portions A2, and the substrate end portions A3 by adjusting the amount and/or number of the bubbles BB for each of the bubble supply pipes 21*a* to 21*f* based on the distribution of the thickness of the substrate W before immersion, i.e., the distribution of the processing amount of the substrate W before immersion.

For example, if the processing amount of the substrate middle portion A1 before immersion is smaller than the processing amounts of the substrate intermediate portions A2 and the substrate end portions A3 before immersion, the flow rate of the gas GA supplied to each of the bubble supply pipes 21*c* and 21*d* is caused to be relatively high compared to the flow rate of the gas GA supplied to each of the bubble supply pipes 21*a*, 21*b*, 21*e*, and 21*f*. As a result, the bubbles BB from the bubble supply pipes 21*c* and 21*d* are relatively increased, so that the concentration of dissolved oxygen in the vicinity of the substrate middle portion A1 is relatively reduced. As a result, the processing amount of the substrate middle portion A1 is relatively increased, so that the in-plane uniformity of the processing amount of the substrate W can be improved.

For example, if the processing amounts of the substrate intermediate portions A2 before immersion are smaller than the processing amounts of the substrate middle portion A1 and the substrate end portions A3 before immersion, the flow rate of the gas GA supplied to each of the bubble supply pipes 21*b* and 21*e* is caused to be relatively high compared to the flow rate of the gas GA supplied to each of the bubble supply pipes 21*a*, 21*c*, 21*d*, and 21*f*. As a result, the bubbles BB supplied from each of the bubble supply pipes 21*b* and 21*e* is relatively increased, so that the concentrations of dissolved oxygen in the vicinity of the substrate intermediate portions A2 are relatively reduced. As a result, the processing amounts of the substrate intermediate portions A2 are relatively increased, so that the in-plane uniformity of the processing amount of the substrate W can be improved.

For example, if the processing amounts of the substrate end portions A3 before immersion are smaller than the processing amounts of the substrate middle portion A1 and the substrate intermediate portions A2 before immersion, the flow rate of the gas GA supplied to each of the bubble supply pipes 21*a* and 21*f* is caused to be relatively high compared to the flow rate of the gas GA supplied to each of the bubble supply pipes 21*b* to 21*e*. As a result, the bubbles BB from the bubble supply pipes 21*a* and 21*f* are relatively increased, so that the concentrations of dissolved oxygen in the vicinity of the substrate end portions A3 are relatively reduced. As a result, the processing amounts of the substrate end portions A3 are relatively increased, so that the in-plane uniformity of the processing amount of the substrate W can be improved.

For example, if the processing amounts of the substrate intermediate portions A2 and the substrate end portions A3 before immersion are smaller than the processing amount of the substrate middle portion A1 before immersion, the flow rate of the gas GA supplied to each of the bubble supply pipes 21*a*, 21*b*, 21*e*, and 21*f* is caused to be relatively high compared to the flow rate of the gas GA supplied to each of the bubble supply pipes 21*c* and 21*d*. In addition, there are any other possible combinations of the flow rates of the gas GA supplied to the bubble supply pipes 21*a* to 21*f*.

For example, if the processing amount of the substrate middle portion A1 before immersion is greater than the processing amounts of the substrate intermediate portions A2 and the substrate end portions A3 before immersion, the flow rate of the gas GA supplied to each of the bubble supply pipes 21*c* and 21*d* is caused to be relatively low compared to the flow rate of the gas GA supplied to each of the bubble supply pipes 21*a*, 21*b*, 21*e*, and 21*f*.

For example, if the processing amounts of the substrate intermediate portions A2 before immersion are greater than the processing amounts of the substrate middle portion A1 and the substrate end portions A3 before immersion, the flow rate of the gas GA supplied to each of the bubble supply pipes 21*b* and 21*e* is caused to be relatively low compared to the flow rate of the gas GA supplied to each of the bubble supply pipes 21*a*, 21*c*, 21*d*, and 21*f*.

For example, if the processing amounts of the substrate end portions A3 before immersion are greater than the processing amounts of the substrate middle portion A1 and the substrate intermediate portions A2 before immersion, the flow rate of the gas GA supplied to each of the bubble supply pipes 21*a* and 21*f* is caused to be relatively low compared to the flow rate of the gas GA supplied to each of the bubble supply pipes 21*b* to 21*e*.

It should be noted that the gas GA may be supplied to the bubble supply pipes 21*a* to 21*f* either in a bilaterally symmetric manner as described above (e.g., the states ST3, ST13, and ST23) or in a bilaterally asymmetric manner. In other words, the supply of the gas GA to the bubble supply pipes 21*a* to 21*f* may be adjusted on a pipe-by-pipe basis. Still in other words, the bubbles BB from the bubble supply pipes 21*a* to 21*f* may be adjusted either in a bilaterally symmetric manner as described above or in a bilaterally asymmetric manner. Still in other words, the bubbles BB from the bubble supply pipes 21*a* to 21*f* may be adjusted on a pipe-by-pipe basis.

Thus, when the bubbles BB from the bubble supply pipes 21*a* to 21*f* are adjusted with the substrate W immersed in the alkaline processing liquid LQ (e.g., the states ST3, ST13, and ST23), the bubble supply pipes 21*a* to 21*f* may have different flow rates of the gas GA (different amounts and/or numbers of the bubbles BB), or alternatively, the bubble supply pipes 21*a* to 21*f* may have the same flow rate of the gas GA (the same amount and/or number of the bubbles BB).

When the bubbles BB from the bubble supply pipe 21*a* to 21*f* are adjusted with the substrate W immersed in the alkaline processing liquid LQ (e.g., the states ST3, ST13, and ST23), the total flow rate SM1 of the gas GA during immersion may be the same as or different from the total flow rate SM0 of the gas GA before immersion, depending on the distribution of the thickness of the substrate W before immersion, i.e., the distribution of the processing amount of the substrate W before immersion. The total flow rate SM1 of the gas GA may be higher or lower than the total flow rate SM0 of the gas GA. The total flow rate SM1 of the gas GA is the total flow rate of the gas GA that is supplied to the bubble supply pipes 21*a* to 21*f* with the substrate W immersed in the alkaline processing liquid LQ (e.g., the states ST3, ST13, and ST23). The total flow rate SM0 of the gas GA is the total flow rate of the gas GA that is supplied to the bubble supply pipes 21*a* to 21*f* without the substrate W immersed in the alkaline processing liquid LQ (e.g., the states ST1, ST11, and ST21).

Moreover, in FIGS. 7A to 8D, the processing of the substrate W by adjusting the bubbles BB (e.g., the states ST3, ST13, and ST23) was performed after the processing by supplying the bubbles BB from all of the bubble supply pipes 21*a* to 21*f* (e.g., the states ST2, ST12, and ST22). It should be noted that the timing of the processing of the substrate W by adjusting the bubbles BB is not particularly limited.

For example, the processing of the substrate W by adjusting the bubbles BB may be performed before the processing by supplying the bubbles BB from all of the bubble supply pipes 21*a* to 21*f*. Alternatively, for example, the processing of the substrate W by adjusting the bubbles BB may be performed alone without the processing by supplying the bubbles BB from all of the bubble supply pipes 21*a* to 21*f*.

Moreover, the period of time (third predetermined period of time) for which the processing of the substrate W by adjusting the bubbles BB is performed (e.g., the states ST3, ST13, and ST23) can be arbitrarily set according to the processing amount of the substrate W before immersion. In the processing of the substrate W by adjusting the bubbles BB, the bubble supply pipes 21*a* to 21*f* may have different supply durations and/or supply timings of the bubbles BB.

Thus, as described above with reference to FIGS. 1 to 9D, the processing amount is selectively adjusted for each surface region of the substrate W (the substrate middle portion A1, the substrate intermediate portions A2, the substrate end portions A3), by adjusting the bubbles BB from each bubble supply pipe 21. This feature will be described as a process of the controller 221 of FIG. 1.

Specifically, the controller 221 controls a condition to be controlled (hereinafter referred to as a "control condition CN") for adjusting the bubbles BB, for each bubble supply pipe 21, by controlling the bubble adjustment section 180. In this case, the control condition CN includes at least one of the flow rate of the gas GA supplied to the bubble supply pipe 21, the timing of supply of the gas GA to the bubble supply pipe 21, and the duration of supply of the gas GA to the bubble supply pipe 21.

In the first embodiment, the amount and/or number of the bubbles BB can be adjusted for each bubble supply pipe 21 by controlling at least one of the flow rate of the gas GA, the supply timing of the gas GA, and the supply duration of the gas GA for each bubble supply pipe 21. In other words, the distribution of the concentration of dissolved oxygen in the alkaline processing liquid LQ of the processing tank 110 can be controlled by controlling at least one of the flow rate of the gas GA, the supply timing of the gas GA, and the supply duration of the gas GA for each bubble supply pipe 21. As a result, the distribution of the processing amount of the substrate W during immersion can be controlled based on the distribution of the processing amount of the substrate W before immersion (i.e., the processing amount of the substrate W by a preliminary processing). Therefore, the in-plane uniformity of the processing amount of the substrate W can be improved. For example, in the first embodiment, a film (e.g., a polysilicon film) consituting the substrate W after the processing of the substrate W by immersion in the alkaline processing liquid LQ can be caused to have substantially a uniform thickness throughout the surface of the substrate W.

Specifically, the controller 221 controls the control condition CN for adjusting the bubbles BB for each bubble supply pipe 21 by controlling the plurality of bubble adjustment mechanisms 182 separately. In this case, the controller 221 may change the flow rate of the gas GA, the supply timing of the gas GA, and/or the supply duration of the gas GA for each bubble supply pipe 21 by controlling the plurality of bubble adjustment mechanisms 182 separately.

More specifically, the controller 221 controls the control condition CN for each bubble supply pipe 21, based on a physical quantity indicating the processing amount of the substrate W before immersion in the alkaline processing liquid LQ. The processing amount of the substrate W before immersion in the alkaline processing liquid LQ indicates the processing amount of the substrate W in a preliminary processing. In this case, the processing amount of the substrate W is, for example, the amount of etching or the etching rate of the target TG (e.g., the substrate W itself, the substrate body, a film, or a layer) consituting the substrate W. The physical quantity of the processing amount of the substrate W may be the processing amount of the substrate W itself, the processing amount of the target TG constituting the substrate W, the thickness itself of the substrate W, or the thickness of the target TG constituting the substrate W.

In the first embodiment, the control condition CN is controlled for each bubble supply pipe 21 based on the physical quantity indicating the processing amount of the substrate W before immersion in the alkaline processing liquid LQ, and therefore, the processing of the substrate W can be performed according to the processing amount of the substrate W before immersion, by immersion in the alkaline processing liquid LQ. As a result, the in-plane uniformity of the processing amount of the substrate W can be further effectively improved.

More specifically, the controller 221 controls the control condition CN for each bubble supply pipe 21 based on the distribution of the physical quantity indicating the processing amount of the substrate W before immersion in the alkaline processing liquid LQ. In this case, the distribution of the physical quantity indicating the processing amount of the substrate W before immersion in the alkaline processing liquid LQ is the distribution of the "physical quantity indicating the processing amount" in the surface of the substrate W.

Figure 10:
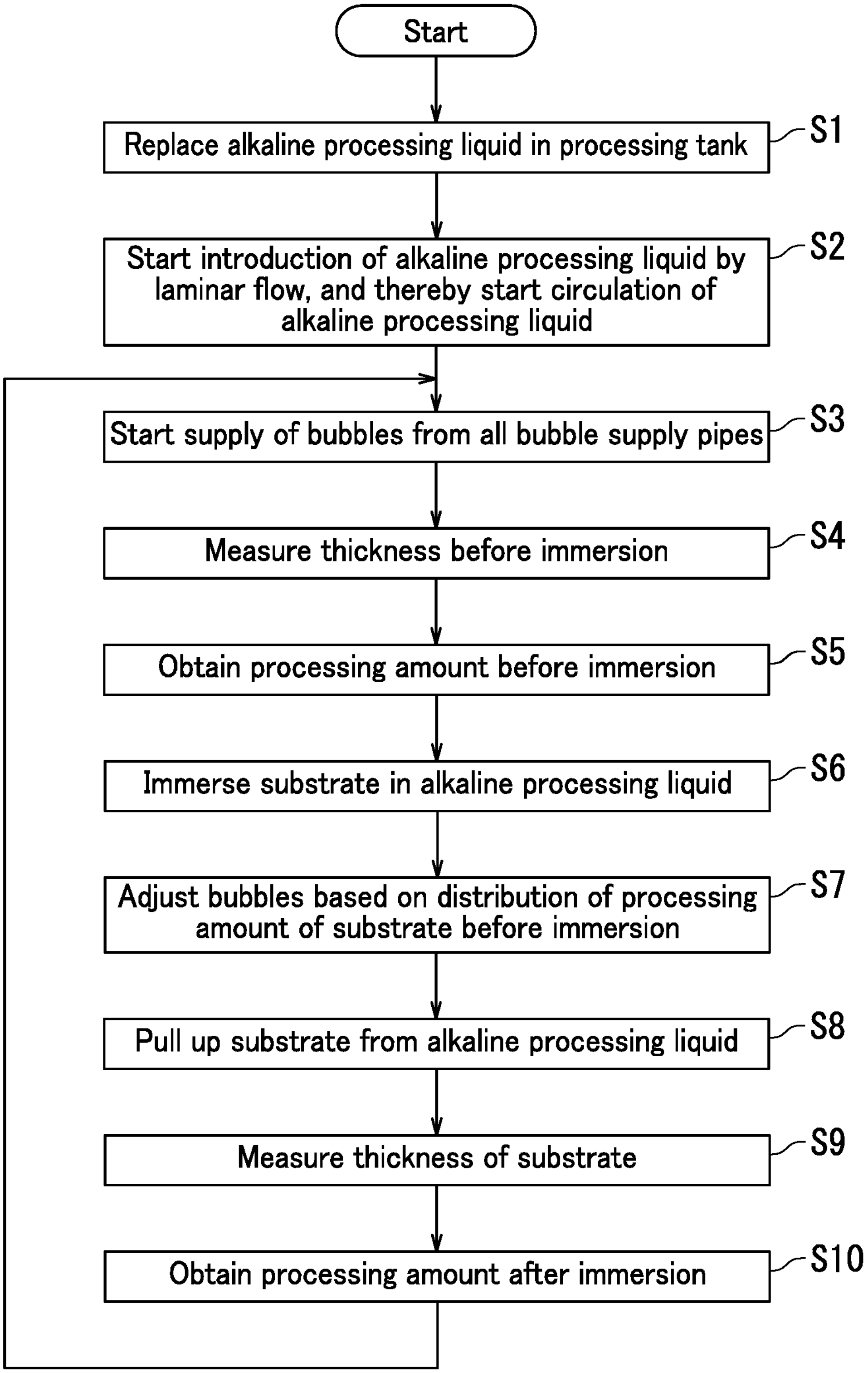
FIG. 10 is a flowchart illustrating a substrate processing method according to the first embodiment.

Next, a substrate processing method according to the first embodiment will be described with reference to FIGS. 1 and 10. The substrate processing method is executed by the substrate processing apparatus 100. FIG. 10 is a flowchart illustrating the substrate processing method of the first embodiment. As illustrated in FIG. 10, the substrate processing method includes steps S1 to S10. Steps S1 to S10 are executed under the control of the controller 221.

Initially, in step S1, the alkaline processing liquid LQ in the processing tank 110 is replaced. For example, the controller 221 replaces the alkaline processing liquid LQ in the processing tank 110 by controlling the substrate holding section 120, the processing liquid introduction section 130, the circulation section 140, the processing liquid supply section 150, the diluent supply section 160, and the drainage section 170.

Next, in step S2, the processing liquid introduction section 130 generates a laminar flow of the alkaline processing liquid LQ, and thereby starts introducing the alkaline processing liquid LQ into the processing tank 110. As a result, in the processing tank 110, the circulation of the alkaline processing liquid LQ is started. Step S2 corresponds to an example of "introducing an alkaline processing liquid" of the present disclosure.

Next, in step S3, the bubble supply section 200 starts supplying the bubbles BB from all of the bubble supply pipes 21 with the alkaline processing liquid LQ stored in the processing tank 110. Specifically, the bubble adjustment section 180 supplies the gas GA to all of the bubble supply pipes 21, so that the bubbles BB are supplied from all of the bubble supply pipes 21 to the alkaline processing liquid LQ. Step S3 corresponds to an example of "supplying bubbles" of the present disclosure. This is because step S3 is continued until step S6.

Next, in step S4, the thickness measurement section 210 measures the thickness of the substrate W before the substrate W is immersed in the alkaline processing liquid LQ. Specifically, the thickness measurement section 210 measures the distribution (in-plane distribution) of the thickness of the substrate W before immersion of the substrate W. The storage 223 stores information indicating the distribution of the thickness of the substrate W before immersion. Specifically, the thickness of the substrate W is the thickness of the target TG constituting the substrate W. Because the preliminary processing is performed on the substrate W before immersion of the substrate W, the thickness of the substrate W after the preliminary processing is measured in step S4. The thickness of the substrate W before immersion hereinafter refers to the thickness of the substrate W before immersion and after the preliminary processing. The information indicating the distribution of the thickness of the substrate W before immersion can be used as training data for machine learning.

Next, in step S5, the controller 221 obtains the processing amount of the substrate W before immersion in the alkaline processing liquid LQ, based on the result of the measurement of the thickness measurement section 210. Specifically, the controller 221 obtains the processing amount of the substrate W by the preliminary processing by calculating a difference between the thickness of the substrate W before execution of the preliminary processing and the thickness of the substrate W before immersion (after the preliminary processing). As a result, the distribution of the processing amount of the substrate W by the preliminary processing is obtained. The storage 223 stores information indicating the distribution of the processing amount of the substrate W (the substrate W before immersion) by the preliminary processing. The processing amount of the substrate W is, for example, the amount of etching of the substrate W. The information indicating the distribution of the processing amount of the substrate W (the substrate W before immersion) by the preliminary processing is used as training data for machine learning.

Next, in step S6, the substrate holding section 120 immerses a plurality of substrates W in the alkaline processing liquid LQ stored in the processing tank 110. In this case, the bubble supply section 200 supplies the bubbles BB to the alkaline processing liquid LQ from below the substrate W, i.e., from each bubble hole G provided in the bubble supply pipes 21, with the substrate W immersed in the alkaline processing liquid LQ. In step S6, all of the bubble supply pipes 21 supply the bubbles BB. After step S6 has been performed for the second predetermined period of time, the processing method proceeds to step S7. Step S6 corresponds to an example of "immersing a substrate" of the present disclosure.

Next, in step S7, the bubble adjustment section 180 adjusts the bubbles BB supplied from each bubble supply pipe 21 based on the distribution of the processing amount of the substrate W before immersion in the alkaline processing liquid LQ. Specifically, the bubble adjustment section 180 adjusts the bubbles BB for each bubble supply pipe 21. More specifically, the bubble adjustment section 180 adjusts the bubbles BB for each bubble supply pipe 21 by controlling the control condition CN for adjusting the bubbles BB for each bubble supply pipe 21. The control condition CN includes at least one of the flow rate of the gas GA, the supply timing of the gas GA, and the supply duration of the gas GA. If the immersion for the third predetermined period of time has been completed since completion of the adjustment of the bubbles BB in step S7, the processing method proceeds to step S8. The "completion of the adjustment of the bubbles BB" refers to completion of setting of each bubble adjustment mechanism 182 of the bubble adjustment section 180. Step S7 corresponds to an example of "adjusting the bubbles" of the present disclosure.

Next, in step S8, the substrate holding section 120 pulls up the plurality of substrates W from the alkaline processing liquid LQ stored in the processing tank 110.

Next, in step S9, the thickness measurement section 210 measures the thickness of the substrate W after immersion in the alkaline processing liquid LQ. The term "after immersion of the substrate W" indicates that "the processing of the substrate W by immersion has been completed, and the substrate W has been pulled up from the alkaline processing liquid LQ." Specifically, the thickness measurement section 210 measures the distribution (in-plane distribution) of the thickness of the substrate W after the substrate W has been pulled up. The storage 223 stores information indicating the distribution of the thickness of the substrate W after immersion. Specifically, the thickness of the substrate W is the thickness of the target TG constituting the substrate W. The information indicating the distribution of the thickness of the substrate W after immersion can be used as training data for machine learning. The storage 223 also stores information about the control condition CN (the flow rate of the gas GA, the supply timing of the gas GA, and the supply duration of the gas GA) for each bubble supply pipe 21 (for each bubble adjustment mechanism 182). The information about the control condition CN is used as training data for machine learning.

Next, in step S10, the controller 221 obtains the processing amount of the substrate W after immersion in the alkaline processing liquid LQ based on the result of measurement by the thickness measurement section 210. The term "after immersion of the substrate W" indicates that "the processing of the substrate W by immersion has been completed, and has been pulled up from the alkaline processing liquid LQ." Specifically, the controller 221 obtains the processing amount of the substrate W by immersion, by calculating a difference between the thickness of the substrate W before immersion and the thickness of the substrate W after immersion. As a result, the distribution of the processing amount of the substrate W by immersion is obtained. The processing amount of the substrate W indicates, for example, the amount of etching of the substrate W. The storage 223 stores information indicating the distribution of the processing amount of the substrate W after immersion. The information indicating the distribution of the processing amount of the substrate W after immersion is used as training data for machine learning. After step S10, the processing method proceeds to step S3.

Thus, as described with reference to FIG. 10, in the substrate processing method of the first embodiment, the substrate W is treated with the alkaline processing liquid LQ while the bubbles BB are supplied thereto. Therefore, the concentration of dissolved oxygen in the alkaline processing liquid LQ can be reduced. As a result, the substrate W can be effectively treated with the alkaline processing liquid LQ.

In the substrate processing method of the first embodiment, the bubbles BB are adjusted for each bubble supply pipe 21. Therefore, the amount and/or number of the bubbles BB can be adjusted for each bubble supply pipe 21 according to the distribution of the processing amount of the substrate W before immersion. As a result, the distribution of the concentration of dissolved oxygen in the alkaline processing liquid LQ can be controlled according to the distribution of the processing amount of the substrate W before immersion. Thus, the processing amount with the alkaline processing liquid LQ can be adjusted according to the distribution of the processing amount of the substrate W before immersion, whereby the in-plane uniformity of the processing amount of the substrate W can be improved.

Figure 11A:
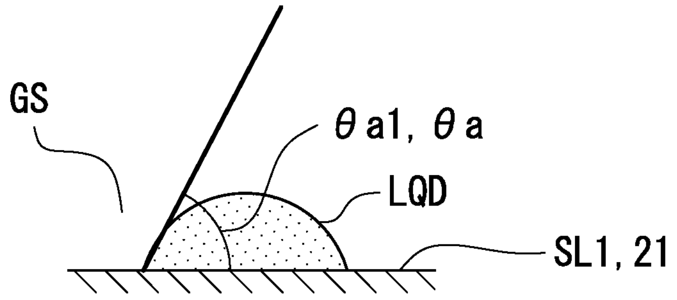
FIGS. 11A and 11B are diagrams illustrating an example of the contact angle (hydrophilic properties) of a bubble supply pipe in the first embodiment.

Next, contact angles θa1 and θa2 of a hydrophilic bubble supply pipe 21 will be described with reference to FIGS. 11A and 11B. FIG. 11A is a diagram illustrating an example of the contact angle θa1 (hydrophilic properties) of a material SL1 for the bubble supply pipe 21 in a gas GS.

As illustrated in FIG. 11A, the material SL1 of the bubble supply pipe 21 is preferably hydrophilic. In other words, the bubble supply pipe 21 is preferably hydrophilic. Hydrophilic properties indicate that the contact angle θa1 is less than 90 degrees. The contact angle θa1 is of the material SL1 of the bubble supply pipe 21 with respect to the alkaline processing liquid LQ. In other words, the contact angle θa1 is of the bubble supply pipe 21 with respect to the alkaline processing liquid LQ. Specifically, the contact angle θa1 is at a contact point between the gas GS, the alkaline processing liquid LQ, and the material SL1 (bubble supply pipe 21). The gas GS is, for example, air or an inert gas. The inert gas is, for example, nitrogen or argon.

It should be noted that, for example, the contact angle θa1 of the material SL1 of the bubble supply pipe 21 may be defined as the contact angle of the bubble supply pipe 21 with respect to water. Water is, for example, pure water. Even in the case where the contact angle θa1 is defined as the contact angle of the bubble supply pipe 21 with respect to water, the contact angle θa1 is preferably less than 90 degrees.

Next, the contact angle θa2 in the alkaline processing liquid LQ will be described. FIG. 11B is a diagram illustrating the contact angle θa2 (hydrophilic properties) of the bubble supply pipe 21 in the alkaline processing liquid LQ.

Figure 11B:
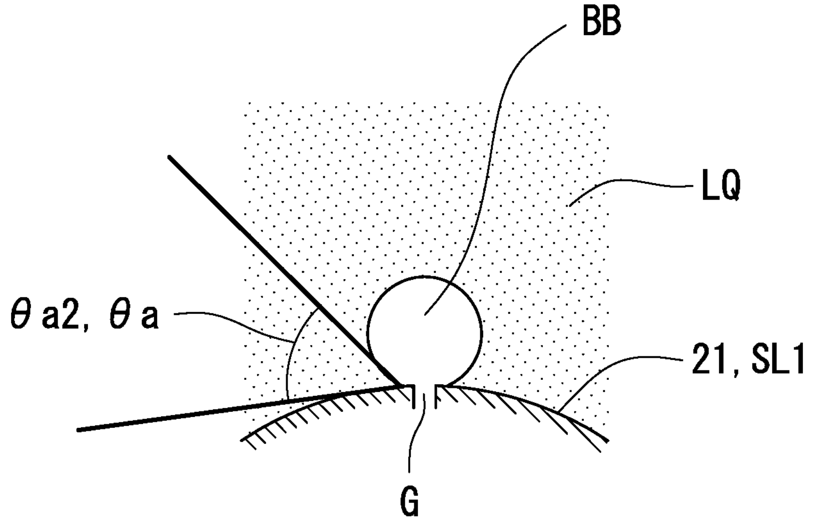

As illustrated in FIG. 11B, in the first embodiment, the bubble BB is supplied from the bubble hole G of the bubble supply pipe 21 to the alkaline processing liquid LQ. Therefore, there are an interface between the bubble BB and the alkaline processing liquid LQ, an interface between the bubble BB and the bubble supply pipe 21, and an interface between the bubble supply pipe 21 and the alkaline processing liquid LQ. As a result, in the alkaline processing liquid LQ, there is the contact angle θa2 of the bubble supply pipe 21 with respect to the alkaline processing liquid LQ. Specifically, in the alkaline processing liquid LQ, there is the contact angle θa2 of the material SL1 of the bubble supply pipe 21 with respect to the alkaline processing liquid LQ. Specifically, the contact angle θa2 is at a contact point between the bubble BB, the alkaline processing liquid LQ, and the bubble supply pipe 21.

The contact angle θa2 in the alkaline processing liquid LQ (FIG. 11B) is illustrated as the contact angle θa1 in the gas GS (FIG. 11A). In other words, the contact angle θa2 is equal to the contact angle θa1. Therefore, in the case where it is not necessary to distinguish the contact angle θa1 from the contact angle θa2, the contact angle θa1 and the contact angle θa2 may be individually or collectively referred to as a "contact angle θa."

Thus, as illustrated in FIGS. 11A and 11B, in the case where the bubble supply pipe 21 is hydrophilic, it is, for example, possible to reduce joining of a bubble BB supplied from one of two adjacent bubble holes G (FIG. 5) in the first direction D10 (FIG. 5) with a bubble BB supplied from the other bubble hole G on the surface of the bubble supply pipe 21. As a result, the occurrence of bubbles BB having a relatively great volume (size) can be reduced. This can reduce the supply of bubbles BB having a relatively great volume to the alkaline processing liquid LQ. In other words, bubbles BB having a relatively small volume can be supplied from each bubble hole G to the alkaline processing liquid LQ. Therefore, the concentration of dissolved oxygen in the alkaline processing liquid LQ can be more effectively reduced. As a result, the substrate W immersed in the alkaline processing liquid LQ can be more effectively treated (e.g., etched) with the alkaline processing liquid LQ.

In other words, the processing amount (e.g., the amount of etching) of the substrate W with the alkaline processing liquid LQ can be increased.

The supply of bubbles BB having a relatively small volume (size) from each bubble hole G (FIG. 5) to the alkaline processing liquid LQ also allows effective replacement of the alkaline processing liquid LQ that is in contact with the substrate W with a fresh alkaline processing liquid LQ. As a result, in the case where a surface pattern having a recessed portion is formed in the surface of the substrate W, the alkaline processing liquid LQ in the recessed portion can be more effectively replaced with a fresh alkaline processing liquid LQ due to a diffusion phenomenon. Therefore, the wall surface of the recessed portion of the surface pattern can be effectively treated (e.g., etched) with the alkaline processing liquid LQ irrespective of the depth thereof, i.e., at shallow to deep levels.

Moreover, the supply of bubbles BB having a relatively small volume (size) from each bubble hole G (FIG. 5) to the alkaline processing liquid LQ can effectively reduce the occurrence of variations in the processing amount in the surface of the substrate W, and can also effectively reduce the occurrence of variations in the processing amount of the substrate W between batches.

In particular, a more hydrophilic bubble supply pipe 21 is more preferable. In other words, a smaller contact angle θa of the bubble supply pipe 21 is more preferable. In this preferable example, it is, for example, possible to more effectively reduce joining of a bubble BB supplied from one of two adjacent bubble holes G (FIG. 5) in the first direction D10 (FIG. 5) with a bubble BB supplied from the other bubble hole G on the surface of the bubble supply pipe 21. As a result, bubbles BB having a smaller volume (size) can be supplied from each bubble hole G to the alkaline processing liquid LQ. Therefore, the substrate W can be more effectively treated, the substrate W can be more effectively treated irrespective of the depth thereof, i.e., from shallow to deep levels, variations in the processing amount in the surface of the substrate W can be more effectively reduced, and variations in the processing amount of the substrate W between batches can be more effectively reduced.

Specifically, the contact angle θa of the bubble supply pipe 21 is more preferably at most 85 degrees, even more preferably at most 80 degrees, still even more preferably at most 75 degrees, still even more preferably at most 70 degrees, still even more preferably at most 65 degrees, still even more preferably at most 60 degrees, still even more preferably at most 55 degrees, still even more preferably at most 50 degrees, still even more preferably at most 45 degrees, still even more preferably at most 40 degrees, still even more preferably at most 35 degrees, still even more preferably at most 30 degrees, still even more preferably at most 25 degrees, still even more preferably at most 20 degrees, still even more preferably at most 15 degrees, still even more preferably at most 10 degrees, and still even more preferably at most 5 degrees.

For example, the material SL1 of the bubble supply pipe 21 is preferably polyether ether ketone (PEEK). The contact angle θa of PEEK is about 80 degrees. Thus, in the case where the material SL1 of the bubble supply pipe 21 is PEEK, hydrophilic properties can be easily imparted to the bubble supply pipe 21.

For example, the material SL1 of the bubble supply pipe 21 is more preferably quartz. The contact angle θa of quartz is about 10 degrees. Thus, in the case where the material SL1 of the bubble supply pipe 21 is quartz, high hydrophilic properties can be imparted to the bubble supply pipe 21.

Although the bubble supply pipe 21 is preferably hydrophilic, the bubble supply pipe 21 may be hydrophobic.

Figure 12A:
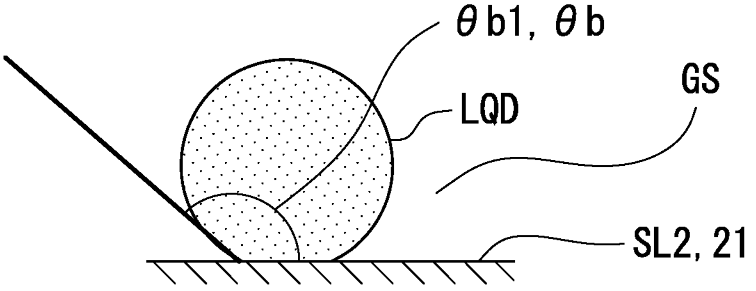
FIGS. 12A and 12B are diagrams illustrating an example of the contact angle (hydrophobic properties) of a bubble supply pipe in the first embodiment.

Next, contact angles θb1 and θb2 of a hydrophobic bubble supply pipe 21 will be described with reference to FIGS. 12A and 12B. FIG. 12A is a diagram illustrating an example of the contact angle θb1 (hydrophobic properties) of a material SL2 for the bubble supply pipe 21 in the gas GS.

As illustrated in FIG. 12A, the material SL2 of the bubble supply pipe 21 may be hydrophobic. In other words, the bubble supply pipe 21 may be hydrophobic. Hydrophobic properties indicate that the contact angle θb1 is at least 90 degrees. The contact angle θb1 is of the material SL2 of the bubble supply pipe 21 with respect to the alkaline processing liquid LQ. In other words, the contact angle θb1 is of the bubble supply pipe 21 with respect to the alkaline processing liquid LQ. Specifically, the contact angle θb1 is at a contact point between the gas GS, the alkaline processing liquid LQ, and the material SL2 (bubble supply pipe 21).

It should be noted that, for example, the contact angle θb1 of the material SL2 of the bubble supply pipe 21 may be defined as the contact angle of the bubble supply pipe 21 with respect to water. Water is, for example, pure water. Even in the case where the contact angle θb1 is defined as the contact angle of the bubble supply pipe 21 with respect to water, the contact angle θb1 may be at least 90 degrees.

Next, the contact angle θb2 in the alkaline processing liquid LQ will be described. FIG. 12B is a diagram illustrating the contact angle θb2 (hydrophobic properties) of the bubble supply pipe 21 in the alkaline processing liquid LQ.

Figure 12B:
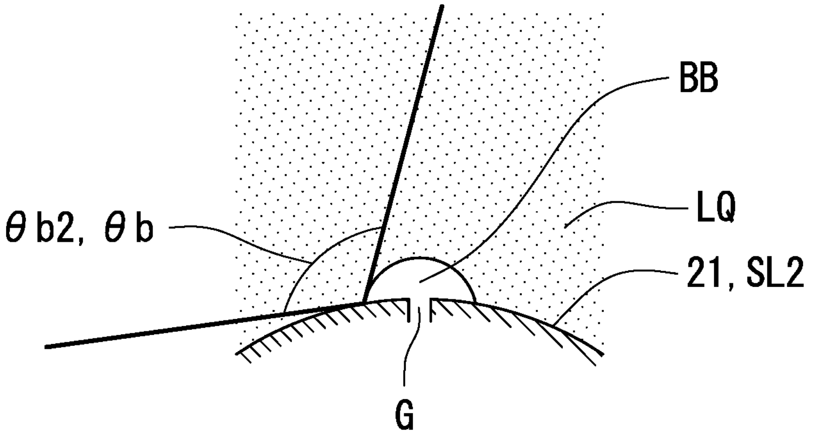

As illustrated in FIG. 12B, in the first embodiment, the bubble BB is supplied to the alkaline processing liquid LQ from the bubble hole G of the bubble supply pipe 21. Therefore, there are an interface between the bubble BB and the alkaline processing liquid LQ, an interface between the bubble BB and the bubble supply pipe 21, and an interface between the bubble supply pipe 21 and the alkaline processing liquid LQ. As a result, in the alkaline processing liquid LQ, there is the contact angle θb2 of the bubble supply pipe 21 with respect to the alkaline processing liquid LQ. In other words, in the alkaline processing liquid LQ, there is the contact angle θb2 of the material SL2 of the bubble supply pipe 21 with respect to the alkaline processing liquid LQ. Specifically, the contact angle θb2 is at a contact point between the bubble BB, the alkaline processing liquid LQ, and the bubble supply pipe 21.

The contact angle θb2 in the alkaline processing liquid LQ (FIG. 12B) is illustrated as the contact angle θb1 in the gas GS (FIG. 12A). In other words, the contact angle θb2 is equal to the contact angle θb1. Therefore, in the case where it is not necessary to distinguish the contact angle θb1 from the contact angle θb2, the contact angle θb1 and the contact angle θb2 may be individually or collectively referred to as a "contact angle θb."

For example, the material SL2 of the bubble supply pipe 21 may be a tetrafluoroethylene-perfluoroalkyl vinyl ether copolymer (PFA). The contact angle θb of PFA is about 110 degrees.

Second Embodiment

A substrate processing apparatus 100 according to a second embodiment of the present disclosure will be described with reference to FIGS. 1 and FIGS. 13 to 16. In the second embodiment, a trained model LM is used to adjust the bubbles BB from each bubble supply pipe 21, in which the first embodiment is mainly different from the second embodiment. The difference between the second embodiment and the first embodiment will be mainly described below.

Figure 13:
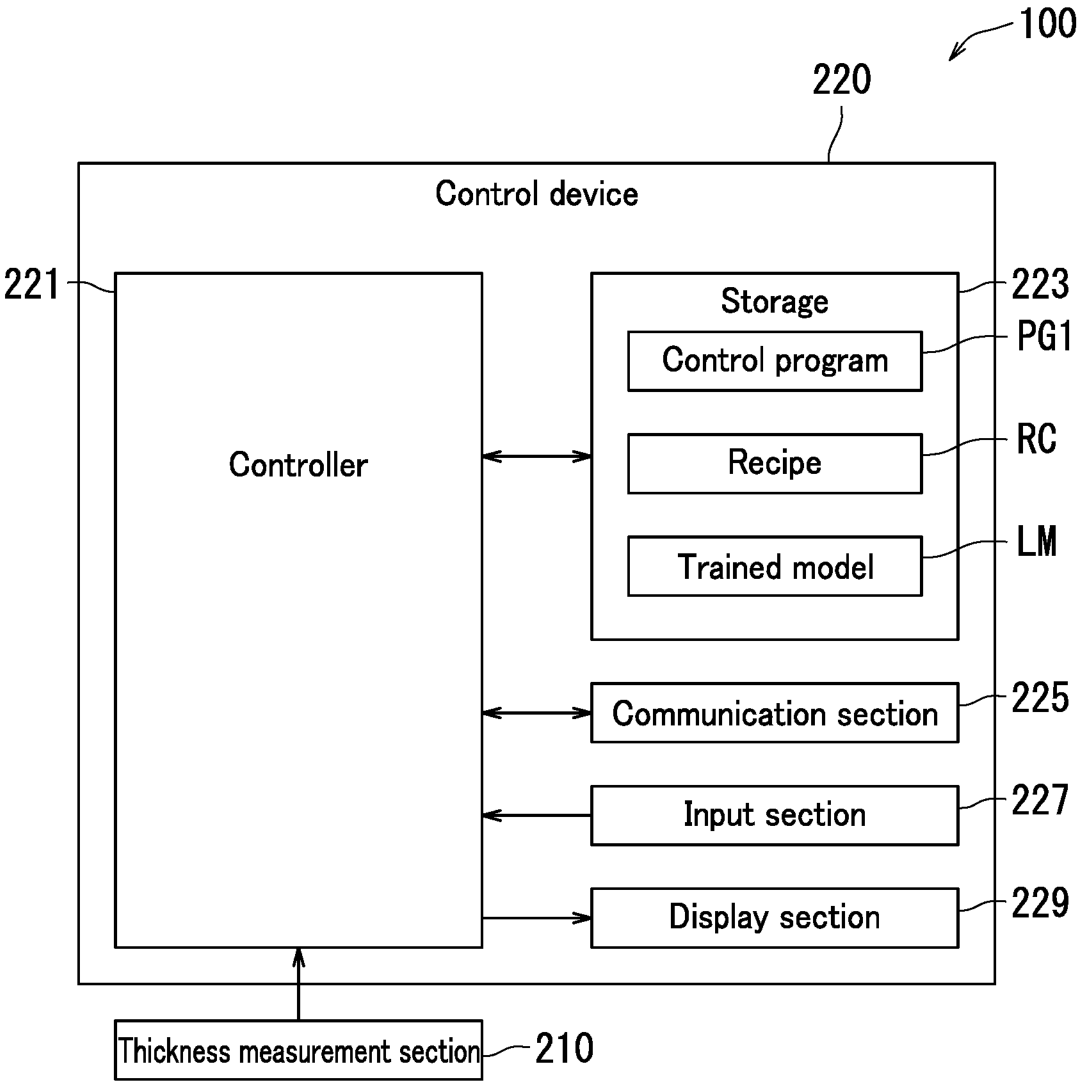
FIG. 13 is a block diagram illustrating a control device of a substrate processing apparatus according to a second embodiment.

FIG. 13 is a block diagram illustrating a control device 220 of the substrate processing apparatus 100 of the second embodiment. The control device 220 is, for example, a computer. As illustrated in FIG. 13, the control device 220 includes a controller 221, storage 223, a communication section 225, an input section 227, and a display section 229. The communication section 225 is connected to a network, through which the communication section 225 communicates with an external device. Examples of the network include the Internet, LANs, public telephone networks, and near-field wireless networks. The communication section 225 is a communication device, such as a network interface controller. The communication section 225 may have a wired communication module or a wireless communication module. The input section 227 is for inputting various kinds of information to the controller 221. For example, the input section 227 is a keyboard and a pointing device, or a touch panel. The display section 229 displays an image. The display section 229 is, for example, a liquid crystal display or an organic electroluminescent display.

The 223 stores a control program PG1, recipe information RC, and a trained model LM. The controller 221 executes the control program PG1 to treat the substrates W with the alkaline processing liquid LQ according to the recipe information RC. The recipe information RC specifies details of the processing of the substrate W and the procedure of the processing. Specifically, the 221 executes the control program PG1 to control the storage 223, the communication section 225, the input section 227, and the display section 229, and the substrate holding section 120, the processing liquid introduction section 130, the circulation section 140, the processing liquid supply section 150, the diluent supply section 160, the drainage section 170, the bubble adjustment section 180, the exhaust pipe 190, the bubble supply section 200, and the thickness measurement section 210 of FIG. 1. The controller 221 also executes the control program PG1 to activate the trained model LM.

The trained model LM is built by being trained with training data (hereinafter referred to as "training data DT").

The training data DT includes pre-immersion processing information K1 and post-immersion processing information K2. The pre-immersion processing information K1 is about a physical quantity indicating a processing amount of a learning target substrate Wa before immersion in the alkaline processing liquid LQ. The learning target substrate Wa is a substrate to be processed for acquiring learning data DT. The learning target substrate Wa has the same structure as that of the substrate W. The information about the physical quantity indicating the processing amount of the learning target substrate Wa before immersion in the alkaline processing liquid LQ is similar to information about the physical quantity indicating the processing amount of the substrate W before immersion in the alkaline processing liquid LQ. The post-immersion processing information K2 is about the physical quantity indicating the processing amount of the learning target substrate Wa after immersion in the alkaline processing liquid LQ and then pulling up from the alkaline processing liquid LQ. The information about the physical quantity indicating the processing amount of the learning target substrate Wa after immersion in the alkaline processing liquid LQ and then pulling up from the alkaline processing liquid LQ is similar to the information about the physical quantity indicating the processing amount of the substrate W after immersion in the alkaline processing liquid LQ and then pulling up from the alkaline processing liquid LQ.

The training data DT further includes at least one of flow rate information M1 indicating the flow rate of the gas GA supplied to each bubble supply pipe 21, timing information M2 indicating the supply timing of the gas GA to each bubble supply pipe 21, and duration information M3 indicating the supply duration of the gas GA to each bubble supply pipe 21, in a case where the learning target substrate Wa is immersed in the alkaline processing liquid LQ.

The pre-immersion processing information K1 is an explanatory variable. In other words, the pre-immersion processing information K1 is a feature amount. The post-immersion processing information K2, the flow rate information M1, the timing information M2, and the duration information M3 are an objective variable. For example, a "normal label" is added as an objective variable. Specifically, of the objective variables, the flow rate information M1, the timing information M2, and the duration information M3 are information that is obtained when the "physical quantity indicating the processing amount of the substrate W" indicated by the post-immersion processing information K2 is labeled as "normal." In the second embodiment, the trained model LM is generated by "supervised" learning.

The controller 221 inputs input information IF1 to the trained model LM to obtain output information IF2 from the trained model LM. The input information IF1 includes the information about the physical quantity indicating the processing amount of the substrate W before immersion in the alkaline processing liquid LQ. The output information IF2 includes the information indicating the control condition CN. The control condition CN includes at least one of the flow rate of the gas GA to each bubble supply pipe 21, the supply timing of the gas GA to each bubble supply pipe 21, and the supply duration of the gas GA to each bubble supply pipe 21, in a case where the substrate W is immersed in the alkaline processing liquid LQ.

The controller 221 adjusts the bubbles BB for each bubble supply pipe 21 based on the output information IF2. Specifically, the controller 221 controls the control condition CN for each bubble adjustment mechanism 182 included in the bubble adjustment section 180 by controlling each bubble adjustment mechanism 182, so as to obtain the settings indicated by the output information IF2. As a result, the bubbles BB are adjusted for each bubble supply pipe 21 according to the distribution of the physical quantity indicating the processing amount of the substrate W before immersion, and therefore, the distribution of the concentration of dissolved oxygen in the alkaline processing liquid LQ can be preferably adjusted. Thus, in the second embodiment, the in-plane uniformity of the processing amount of the substrate W by immersion in the alkaline processing liquid LQ can be improved.

In addition, because the output information IF2 from the trained model LM is used, the control condition CN (the flow rate of the gas GA, the supply timing of the gas GA, and the supply duration of the gas GA) can be accurately set for each bubble supply pipe 21. Specifically, the controller 221 can accurately set each bubble adjustment mechanism 182, and can thereby set the distribution of the concentration of dissolved oxygen according to the distribution of the physical quantity indicating the processing amount of the substrate W in the alkaline processing liquid LQ of the processing tank 110.

Figure 14:
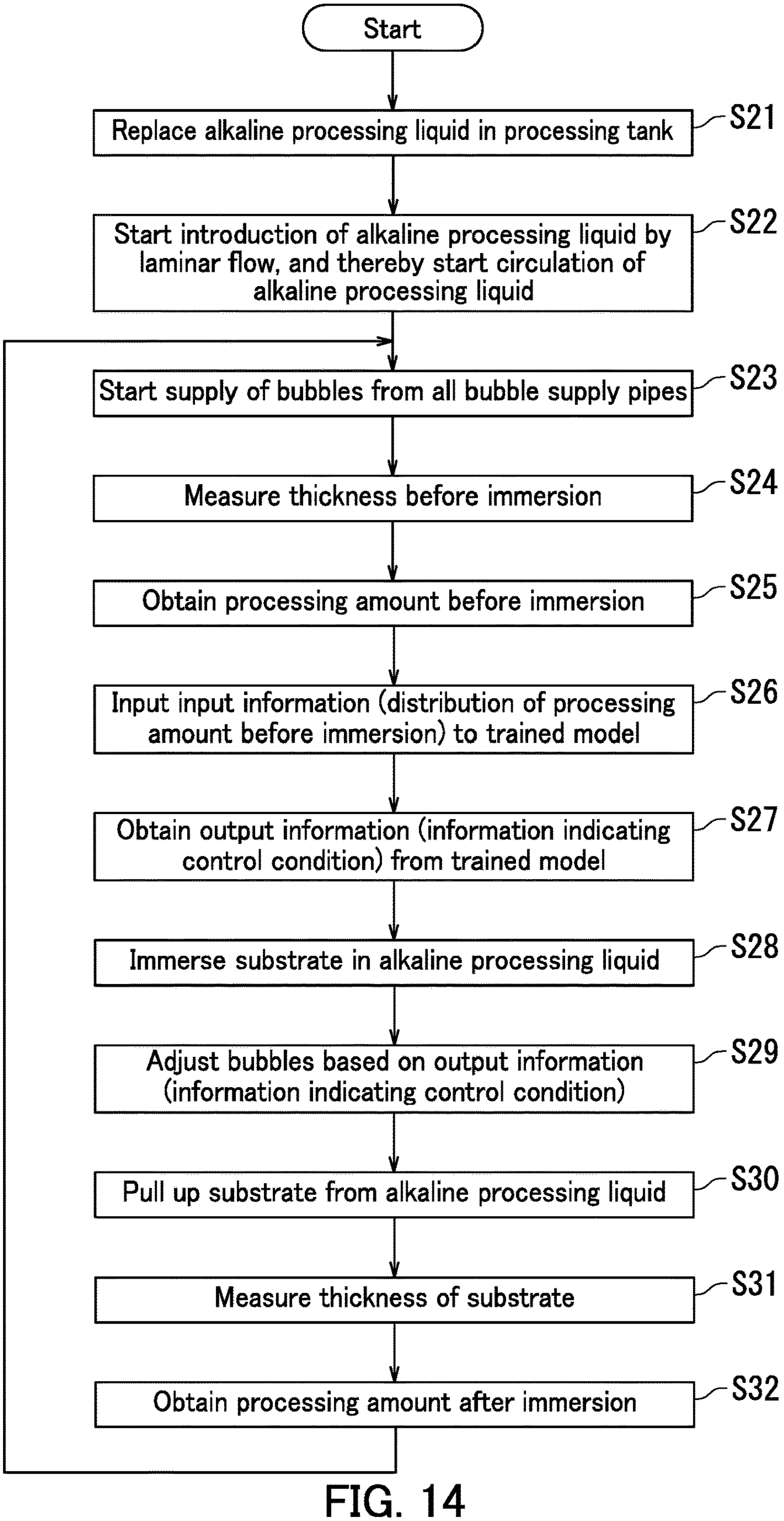
FIG. 14 is a flowchart illustrating a substrate processing method according to the second embodiment.

Next, the substrate processing method of the second embodiment will be described with reference to FIGS. 13 and 14. FIG. 14 is a flowchart illustrating the substrate processing method of the second embodiment. The substrate processing method is executed by the substrate processing apparatus 100. As illustrated in FIG. 14, the substrate processing method includes steps S21 to S32.

Steps S21 to S25 are similar to steps S1 to S5, respectively, of FIG. 10, and will not be described. After step S25, the processing method proceeds to step S26.

Next, in step S26, the controller 221 inputs the input information IF1 to the trained model LM. The input information IF1 indicates the distribution of the processing amount of the substrate W before immersion in the alkaline processing liquid LQ. Specifically, the information indicating the distribution of the processing amount of the substrate W indicates the distribution of the physical quantity indicating the processing amount of the substrate W. The storage 223 stores the input information IF1. The input information IF1 can be used as training data for machine learning. Step S26 corresponds to a portion of "adjusting the bubbles" of the present disclosure.

Next, in step S27, the controller 221 obtains the output information IF2 from the trained model LM. The output information IF2 includes information indicating the control condition CN. The control condition CN includes at least one of the flow rate of the gas GA, the supply timing of the gas GA, and the supply duration of the gas GA, in a case where the substrate W is immersed in the alkaline processing liquid LQ. The storage 223 stores the output information IF2. The output information IF2 can be used as training data for machine learning. Step S27 corresponds to a portion of the "adjusting the bubbles" of the present disclosure.

Next, in step S28, the substrate holding section 120 immerses a plurality of substrates W in the alkaline processing liquid LQ stored in the processing tank 110. Step S28 corresponds to an example of the "immersing a substrate" of the present disclosure. In addition, step S28 is similar to step S6 of FIG. 10.

Next, in step S29, the controller 221 controls the bubble adjustment section 180 based on the output information IF2 (information indicating the control condition CN) obtained from the trained model LM, to adjust the bubbles BB from the bubble supply pipes 21 separately, i.e., on a pipe-by-pipe basis. When the third predetermined period of time has completely passed after completion of the adjustment of the bubbles BB in step S29, the processing method proceeds to step S30. The "completion of the adjustment of the bubbles BB" refers to completion of setting of each bubble adjustment mechanism 182 of the bubble adjustment section 180. Step S29 corresponds to a portion of the "adjusting the bubbles" of the present disclosure.

Next, steps S30 to S32 are executed. Steps S30 to S32 are similar to steps S8 to S10, respectively, of FIG. 10, and will not be described. After step S10, the processing method proceeds to step S23.

Figure 15:
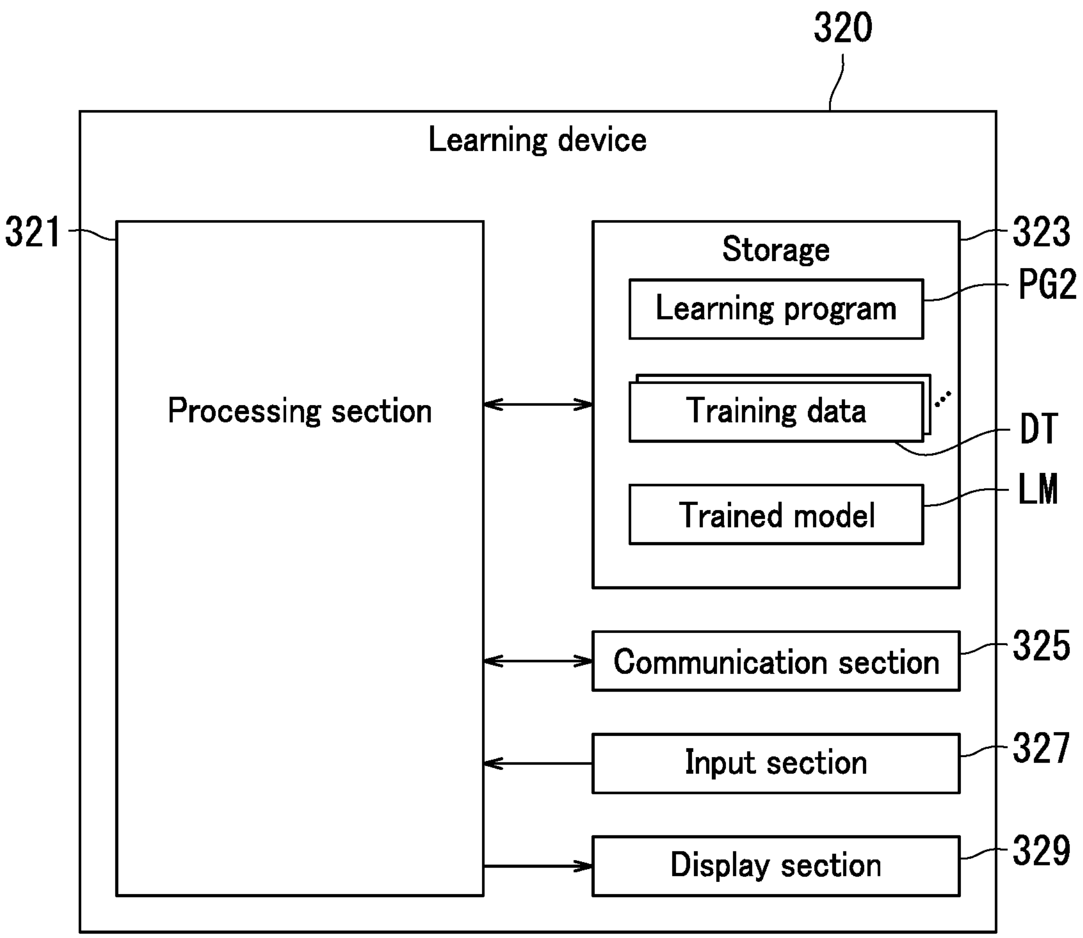
FIG. 15 is a block diagram illustrating a learning device in the second embodiment.

Next, a learning device 320 according to the second embodiment will be described with reference to FIG. 15. The learning device 320 is, for example, a computer. FIG. 15 is a block diagram illustrating the learning device 320. As illustrated in FIG. 15, the learning device 320 includes a processing section 321, storage 323, a communication section 325, an input section 327, and a display section 329.

The processing section 321 includes processors such as a CPU and a GPU. The storage 323 includes a storage device, and stores data and a computer program. A processor of the processing section 321 executes the computer program stored in the storage device of the storage 323 to execute various processes. For example, the storage 323 includes a main storage device and an auxiliary storage device like the storage 223 (FIG. 13). The storage 323 may also include a removable medium. The storage 323 is, for example, a non-transitory computer-readable storage medium.

The communication section 325 is connected to a network, through which the communication section 325 communicates with an external device. The communication section 325 is a communication device, such as a network interface controller. The communication section 325 may have a wired communication module or a wireless communication module. The input section 327 is an input device for inputting various kinds of information to the processing section 321. For example, the input section 327 is a keyboard and a pointing device, or a touch panel. The display section 329 displays an image. The display section 329 is, for example, a liquid crystal display or an organic electroluminescent display.

Still referring to FIG. 15, the processing section 321 will be described. The processing section 321 obtains a plurality of pieces of training data DT from the outside. For example, the processing section 321 obtains a plurality of pieces of training data DT from the substrate processing apparatus 100 of the first or second embodiment or a training data production device through the network and the communication section 325. The training data production device produces the training data DT based on data obtained from the substrate processing apparatus 100.

The processing section 321 controls the storage 323 such that the storage 323 stores each piece of training data DT. As a result, the storage 323 stores each piece of training data DT.

The storage 323 stores a learning program PG2. The learning program PG2 is for executing a machine learning algorithm that finds a predetermined pattern or rule in the plurality of pieces of training data DT, and builds a trained model LM that represents the found pattern or rule.

The machine learning algorithm is for supervised learning, and is not particularly limited. Examples of the machine learning algorithm include decision trees, nearest neighbor algorithms, naive Bayes classifiers, support-vector machines, and neural networks. Therefore, the trained model LM includes a decision tree, a nearest neighbor algorithm, a naive Bayes classifier, a support-vector machine, or a neural network. In machine learning for building the trained model LM, backpropagation may be utilized.

For example, a neural network includes an input layer, a single or multiple hidden layers, and an output layer. Specifically, examples of neural networks include deep neural networks (DNNs), recurrent neural networks (RNNs), and convolutional neural networks (CNNs). Deep learning is performed on a neural network. For example, a deep neural network includes an input layer, multiple hidden layers, and an output layer.

The processing section 321 performs machine learning using the plurality of pieces of training data DT according to the learning program PG2. As a result, a predetermined pattern or rule is found based on the plurality of pieces of training data DT, so that a trained model LM is built. In other words, the trained model LM is built by machine learning with the training data DT. The storage 323 stores the trained model LM.

Specifically, the controller 221 finds a predetermined pattern or rule between an explanatory variable and an objective variable contained in the training data DT by executing the learning program PG2 to build the trained model LM.

More specifically, the processing section 321 calculates a plurality of learned parameters by machine learning with the plurality of pieces of training data DT according to the learning program PG2, and builds the trained model LM including at least one function to which the plurality of learned parameters are applied. The learned parameters (coefficients) are obtained based on the result of machine learning with the plurality of pieces of training data DT.

The trained model LM causes a computer to receive the input information IF1 and output the output information IF2. In other words, the trained model LM receives the input information IF1 and outputs the output information IF2. Specifically, the trained model LM predicts the information about the control condition CN when the in-plane uniformity of the processing amount of the substrate W after immersion will satisfy a predetermined criterion.

Figure 16:
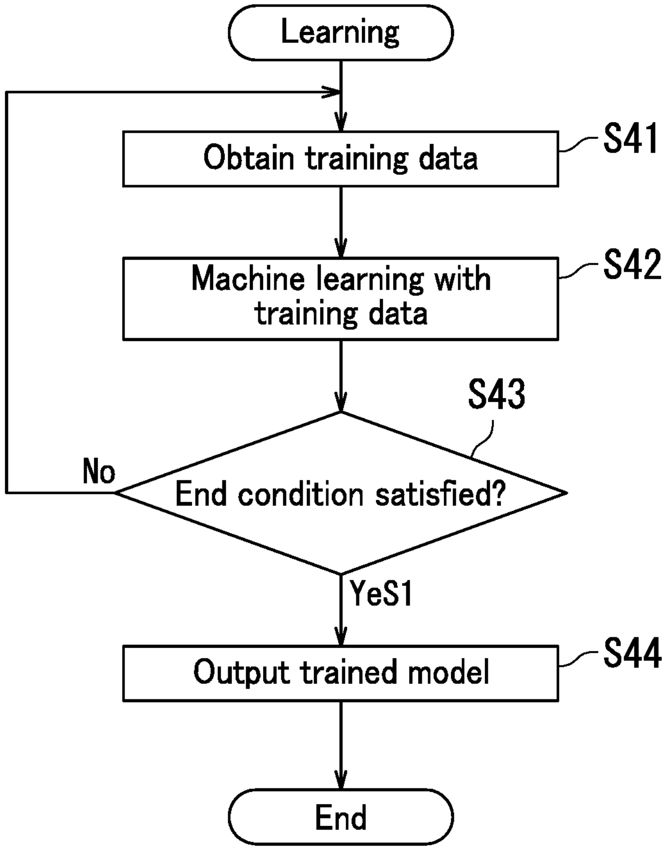
FIG. 16 is a flowchart illustrating a learning method in the second embodiment.

Next, a learning method according to the second embodiment will be described with reference to FIGS. 15 and 16. FIG. 16 is a flowchart illustrating the learning method of the second embodiment. As illustrated in FIG. 16, the learning method includes steps S41 to S44. The learning method is executed by the learning device 320.

As illustrated in FIGS. 15 and 16, in step S41, the processing section 321 of the learning device 320 obtains the plurality of pieces of training data DT from the substrate processing apparatus 100 or the training data production device.

Next, in step S42, the processing section 321 performs machine learning with the plurality of pieces of training data DT according to the learning program PG2.

Next, in step S43, the processing section 321 determines whether or not a learning end condition is satisfied. The learning end condition is a predetermined condition for ending machine learning. The learning end condition is, for example, that the number of iterations has reached a specified value.

If the result of the determination in step S43 is negative, the processing method proceeds to step S41. As a result, machine learning is repeated.

Meanwhile, if the result of the determination in step S43 is positive, the processing method proceeds to step S44.

In step S44, the processing section 321 outputs a plurality of most recent parameters (coefficients), i.e., a model (at least one function) to which a plurality of learned parameters (coefficients) are applied, as the trained model LM. Thereafter, the storage 323 stores the trained model LM.

Thus, the learning device 320 executes steps S41 to S44 to build the trained model LM.

As described above, in the second embodiment, the learning device 320 performs machine learning. Therefore, a pattern or rule is found based on the training data DT, which is very complex and contains a huge amount of features to be analyzed, and thereby, the trained model LM with high accuracy can be built. The controller 221 of the control device 220 illustrated in FIG. 13 inputs, to the trained model LM, the input information IF1 including the distribution of the processing amount of the substrate W before immersion, to cause the trained model LM to output the output information IF2 including the information about the control condition CN. Therefore, each bubble adjustment mechanism 182 can be quickly set, so that the bubbles BB can be quickly adjusted for each bubble supply pipe 21.

It should be noted that the control device 220 of FIGS. 1 and 13 may serve as the learning device 320 of FIG. 15.

Third Embodiment

Figure 17:
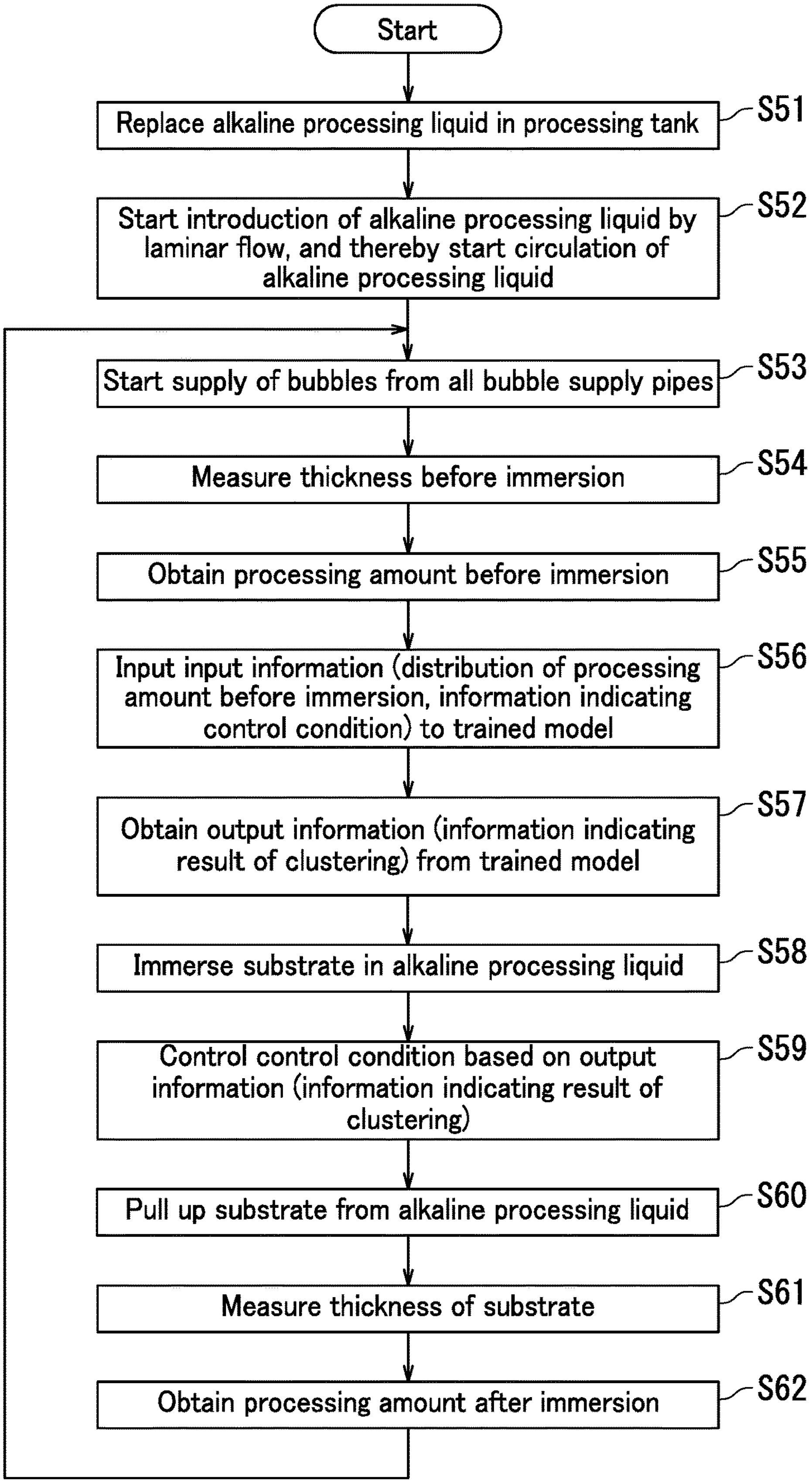
FIG. 17 is a flowchart illustrating a substrate processing method according to a third embodiment.

A substrate processing apparatus 100 according to a third embodiment of the present disclosure will be described with reference to FIGS. 1, 13, and 17. In the third embodiment, unsupervised learning is executed, in which the third embodiment is mainly different from the second embodiment. A main difference between the third embodiment and the second embodiment will be mainly described below.

Firstly, a description will be given with reference to FIGS. 1 and 13. The controller 221 activates a trained model LM by executing the control program PG1. The trained model LM is built by being trained with training data DT. The training data DT is similar to that the first embodiment and will not be described.

The controller 221 inputs input information IF3 to the trained model LM to obtain output information IF4 from the trained model LM. The trained model LM performs clustering on the input information IF3, and outputs the output information IF4 indicating the result of the clustering of the input information IF3. Specifically, the output information IF4 indicates a cluster in which the input information IF3 is classified. Clustering is to find pieces of information that are similar to or correlated with each other, and to group the pieces of information according to similarity or correlation. Therefore, by clustering, similar or correlated pieces of information are classified as a cluster.

The input information IF3 includes the information about the physical quantity indicating the processing amount of the substrate W before immersion in the alkaline processing liquid LQ, and the information indicating the control condition CN. The control condition CN includes at least one of the flow rate of the gas GA to each bubble supply pipe 21, the supply timing of the gas GA to each bubble supply pipe 21, and the supply duration of the gas GA to each bubble supply pipe 21, in a case where the substrate W is immersed in the alkaline processing liquid LQ. In the third embodiment, the information about the control condition CN included in the input information IF3 is information about the past control condition CN used in the processing of the substrate W by immersion in the past. For example, the information about the control condition CN included in the input information IF3 is about the previous control condition CN used in the previous processing of the substrate W by immersion.

The controller 221 controls the control condition CN based on the output information IF4. Specifically, if the result of the clustering of the input information IF3 indicated by the output information IF4 is classified as a cluster indicating a "normal processing," the controller 221 controls each bubble adjustment mechanism 182 using the information about the past control condition CN (e.g., the previous control condition CN used in the previous processing) indicated by the input information IF3, and thereby controls the bubbles BB from each bubble supply pipe 21.

Thus, the controller 221 controls the bubbles BB for each bubble supply pipe 21 by controlling each bubble adjustment mechanism 182 such that the past settings indicated by the input information IF3 (e.g., the previous settings) are provided. As a result, the bubbles BB are adjusted for each bubble supply pipe 21 according to the distribution of the physical quantity indicating the processing amount of the substrate W before immersion, and therefore, the distribution of the concentration of dissolved oxygen in the alkaline processing liquid LQ can be suitably adjusted. Thus, in the third embodiment, the in-plane uniformity of the processing amount of the substrate W by immersion in the alkaline processing liquid LQ can be improved.

In the case where the result of the clustering of the input information IF3 indicated by the output information IF4 is classified as a cluster indicating a "normal processing," it is not necessary to set each bubble adjustment mechanism 182 again, and therefore, the throughput of the processing of the substrate W can be improved.

Next, a substrate processing method according to the third embodiment will be described with reference to FIGS. 13 and 17. FIG. 17 is a flowchart illustrating the substrate processing method of the third embodiment. The substrate processing method is executed by the substrate processing apparatus 100. As illustrated in FIG. 17, the substrate processing method includes steps S51 to S62.

Steps S51 to S55 are similar to steps S1 to S5, respectively, of FIG. 10 and will not be described. After step S55, the processing method proceeds to step S56.

Next, in step S56, the controller 221 inputs the input information IF3 to the trained model LM. The input information IF3 includes the information indicating the distribution of the processing amount of the substrate W before immersion in the alkaline processing liquid LQ, and the information indicating the control condition CN. Specifically, the information indicating the distribution of the processing amount of the substrate W is about the distribution of the physical quantity indicating the processing amount of the substrate W. The control condition CN includes at least one of the flow rate of the gas GA, the supply timing of the gas GA, and the supply duration of the gas GA, in a case where the substrate W is immersed in the alkaline processing liquid LQ. The storage 223 stores the input information IF3. The input information IF3 can be used as training data for machine learning. Step S56 corresponds to a portion of the "adjusting the bubbles" of the present disclosure.

Next, in step S57, the controller 221 obtains the output information IF4 from the trained model LM. The output information IF4 includes information indicating the result of the clustering of the input information IF3. The storage 223 stores the output information IF4. The output information IF4 can be used as training data for machine learning. Step S57 corresponds to a portion of the "adjusting the bubbles" of the present disclosure.

Next, in step S58, the substrate holding section 120 immerses a plurality of substrates W in the alkaline processing liquid LQ stored in the processing tank 110. Step S58 corresponds to an example of the "immersing a substrate" of the present disclosure. In addition, step S58 is similar to step S6 of FIG. 10.

Next, in step S59, the controller 221 controls each bubble adjustment section 180 based on the output information IF2 (information indicating the result of the clustering) obtained from the trained model LM, and thereby controls the control condition CN for each bubble supply pipe 21. By controlling the control condition CN for each bubble supply pipe 21 separately, the bubbles BB from the bubble supply pipes 21 are adjusted on a pipe-by-pipe basis. After completion of the immersion during the third predetermined period of time, the processing method proceeds to step S60. Step S59 corresponds to a portion of the "adjusting the bubbles" of the present disclosure.

Next, steps S60 to S62 are executed. Steps S60 to S62 are similar to steps S8 to S10, respectively, of FIG. 10 and will not be described. After step S62, the processing method proceeds to step S53.

Here, a learning device 320 according to the third embodiment will be described with reference to FIG. 15. The learning program PG2 of FIG. 15 is for executing a machine learning algorithm that finds a predetermined pattern or rule based on a plurality of pieces of training data DT, and builds a trained model LM that represents the found pattern or rule.

In the third embodiment, the machine learning algorithm performs unsupervised learning. Examples of the machine learning algorithm include k-means clustering, k-medoids, hierarchical clustering, self-organizing maps, fuzzy c-means clustering, Gaussian mixture models, and neural networks.

The processing section 321 performs machine learning with the plurality of pieces of training data DT according to the learning program PG2. As a result, a predetermined pattern or rule is found based on the plurality of pieces of training data DT, and a trained model LM is built.

Specifically, the processing section 321 performs machine learning with the plurality of pieces of training data DT according to the learning program PG2 to calculate a plurality of learned parameters, and builds a trained model LM including at least one function to which the plurality of learned parameters are applied. The learned parameter is a parameter (coefficient) that is obtained based on the result of machine learning with the plurality of pieces of training data DT.

It should be noted that the process flow of the learning method of the third embodiment is similar to the process flow of the learning method of the second embodiment of FIG. 16.

Next, examples of the present disclosure will be specifically described. The present disclosure is not limited to the examples below.

EXAMPLES

Examples 1 and 2

Examples 1 and 2 of the present disclosure will be described with reference to FIGS. 18 to 20. In Examples 1 and 2 of the present disclosure, the substrate processing apparatus 100 described above with reference to FIGS. 1 and 4A to 6 was used. It should be noted that the substrate processing apparatus 100 in Examples 1 and 2 is different from the substrate processing apparatus 100 described above with reference to FIGS. 1 and 4A to 6 in the number of bubble supply pipes 21, the number of pipes 181, and the number of bubble adjustment mechanisms 182.

Figure 18:
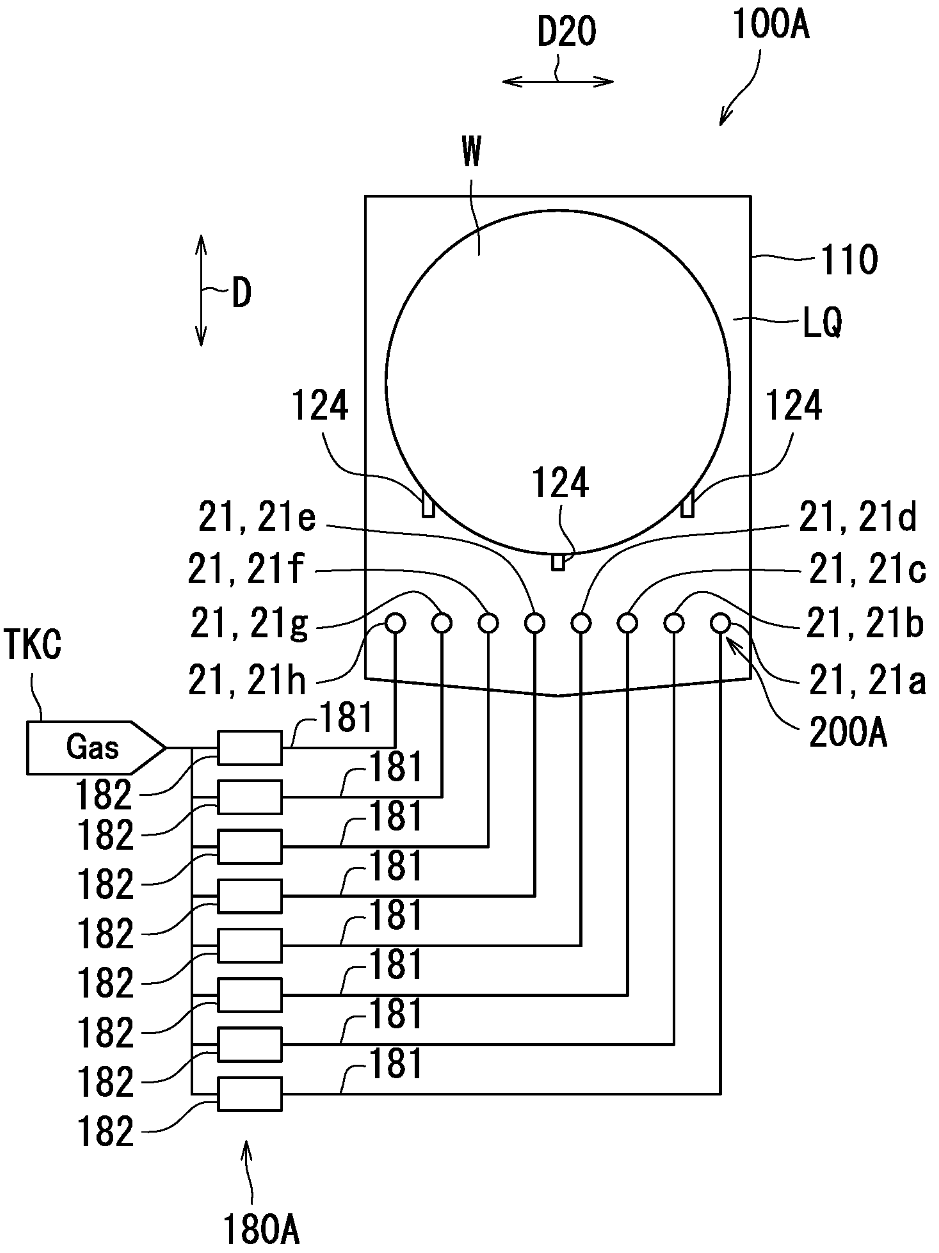
FIG. 18 is a schematic cross-sectional view illustrating a substrate processing apparatus according to examples of the present disclosure.

FIG. 18 is a schematic cross-sectional view illustrating a substrate processing apparatus 100A according to Examples 1 and 2 of the present disclosure. As illustrated in FIG. 18, in the substrate processing apparatus 100A, the bubble supply section 200A included eight bubble supply pipes 21. The bubble adjustment section 180A included eight bubble adjustment mechanisms 182. The substrate processing apparatus 100A further included eight pipes 181. The alkaline processing liquid LQ was TMAH. The concentration of TMAH was 0.31%. The gas GA supplied from the pipe 181 to the bubble supply pipe 21 was nitrogen. The total flow rate of nitrogen in the eight pipes 181 (eight bubble supply pipes 21) was 30 L/min.

The thicknesses of the polysilicon films of substrates W were measured by the thickness measurement section 210 before immersion of the substrate W in the alkaline processing liquid LQ. Thereafter, a batch of substrates W (25 substrates) were immersed in the alkaline processing liquid LQ one hour after the start of supply of the bubbles BB to the alkaline processing liquid LQ. The immersion duration was 140 seconds. After the immersion duration had passed, the substrates W were pulled up from the alkaline processing liquid LQ. Thereafter, the thicknesses of the polysilicon films of the substrates W were measured by the thickness measurement section 210. Moreover, the controller 221 obtained the amount of etching of each substrate W by subtracting the thickness of the substrate W after pulling up from the alkaline processing liquid LQ from the thickness of the substrate W before immersion. Thereafter, the controller 221 created map images MP1 and MP2 indicating the distribution of the amount of etching of the substrate W.

In Example 1 of the present disclosure, of eight bubble supply pipes 21*a* to 21*h*, the bubble supply pipes 21*b*, 21*d*, 21*e*, and 21*g* shut off the supply of the bubbles BB, while the bubble supply pipes 21*a*, 21*c*, 21*f*, and 21*h* supplied the bubbles BB. Thus, in Example 1, four bubble supply pipes 21 were used.

Figure 19:
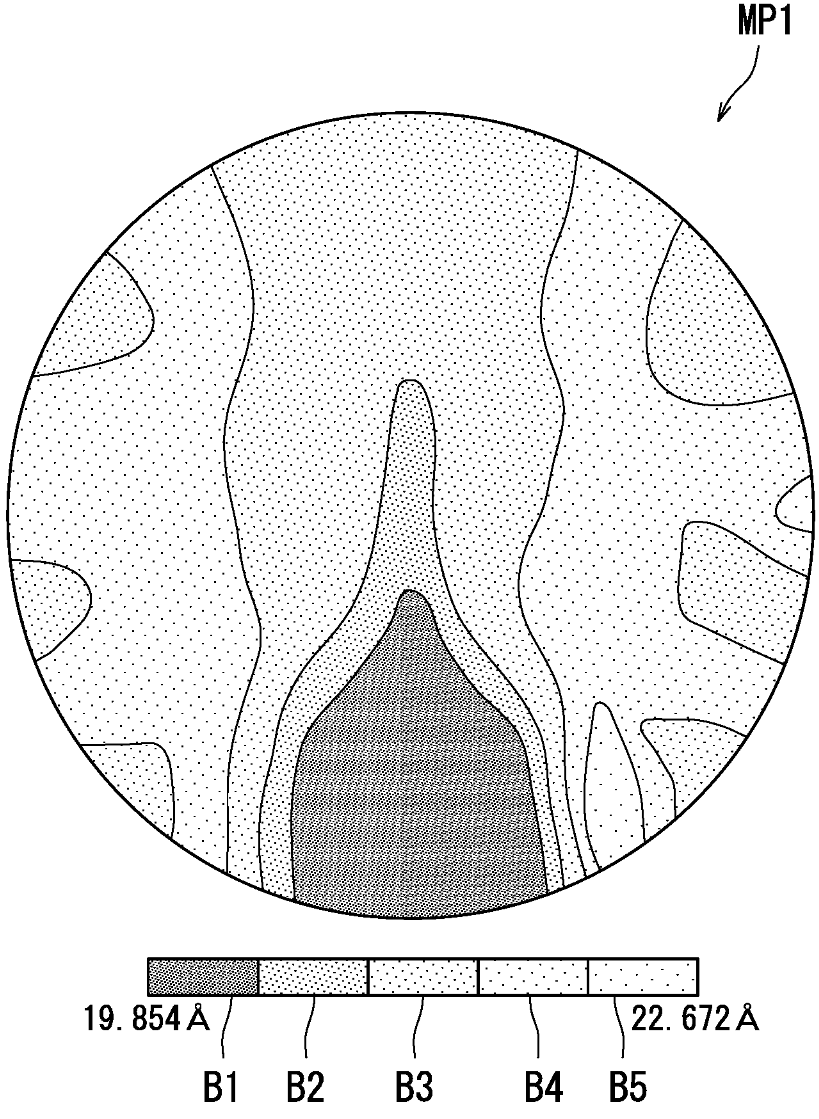
FIG. 19 is a diagram illustrating the result of processing of a substrate in Example 1 of the present disclosure.

FIG. 19 is a diagram illustrating the result of the processing of a substrate W in Example 1 of the present disclosure. FIG. 19 illustrates the map image MP1 of the amount of etching of the substrate W. In the map image MP1, the sparser the dots, the greater the amount of etching. Although the map image MP1 actually includes gradations of the amount of etching, the amount of etching is represented in a simplified manner, i.e., in five levels.

As can be seen from the map image MP1, variations in the amount of etching fell within the range of 19.854 to 22.672 angstroms. Thus, by supplying the bubbles BB from the four bubble supply pipes 21, the concentration of dissolved oxygen in the alkaline processing liquid LQ was reduced, resulting in effective etching.

In Example 1, the difference between the greatest amount of etching (22.672 angstroms) and the smallest amount of etching (19.854 angstroms) was 2.818 angstroms.

Meanwhile, in Example 2 of the present disclosure, all of the eight bubble supply pipes 21*a* to 21*h* supplied the bubbles BB. In other words, in Example 2, the eight bubble supply pipes 21 were used.

Figure 20:
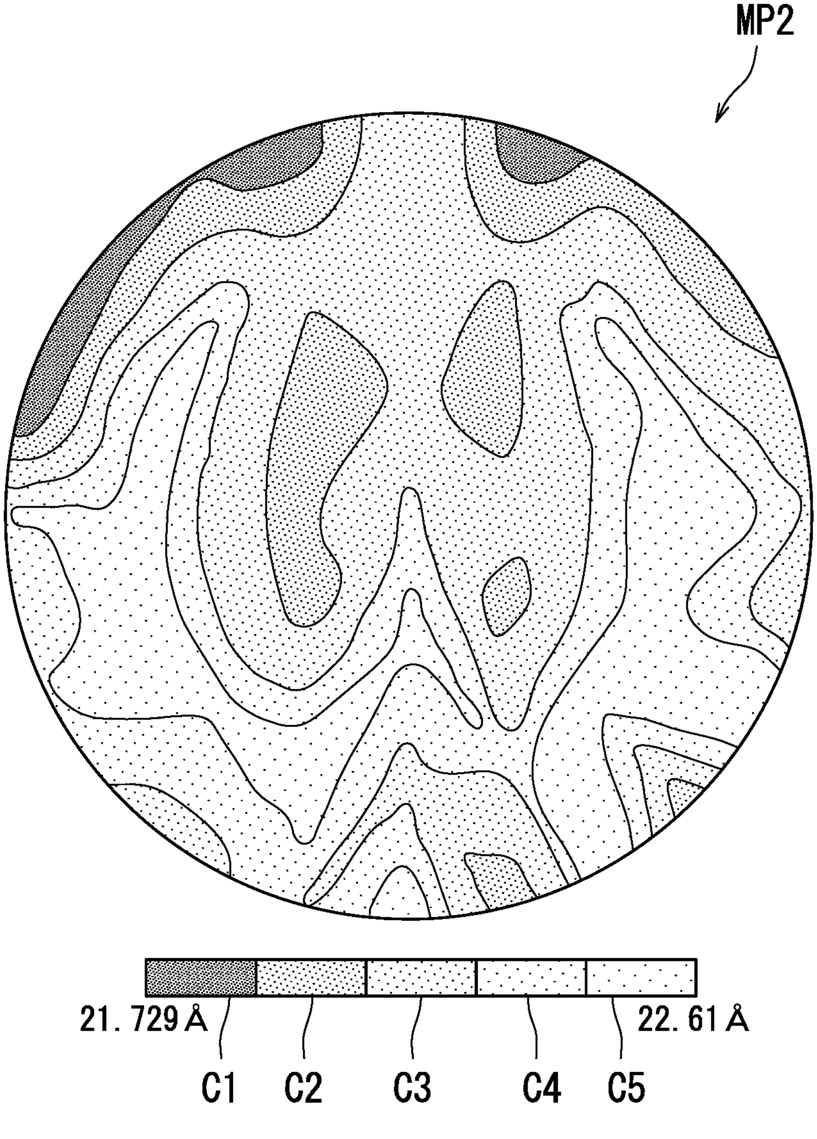
FIG. 20 is a diagram illustrating the result of processing of a substrate in Example 2 of the present disclosure.

FIG. 20 is a diagram illustrating the result of the processing of a substrate W in Example 2 of the present disclosure. FIG. 20 illustrates the map image MP2 of the amount of etching of the substrate W. In the map image MP2, the sparser the dots, the greater the amount of etching. Although the map image MP2 actually includes gradations of the amount of etching, the amount of etching is represented in a simplified manner, i.e., in five levels.

As can be seen from the map image MP2, variations in the amount of etching fell within the range of 21.729 to 22.61 angstroms. Thus, by supplying the bubbles BB from the eight bubble supply pipes 21, the concentration of dissolved oxygen in the alkaline processing liquid LQ was further reduced, resulting in more effective etching.

In Example 2, the difference between the greatest amount of etching (22.61 angstroms) and the smallest amount of etching (21.729 angstroms) was 0.881 angstroms.

As can be seen from the result of comparison of Example 1 with Example 2, the difference (0.881 angstroms) between the greatest amount of etching and the smallest amount of etching in Example 2 was smaller than that (2.818 angstroms) in Example 1. In other words, the in-plane uniformity of the amount of etching of the substrate W in Example 2 was better than that in Example 1.

Thus, the greater number of bubble supply pipes 21 supplying the bubbles BB provided, the higher in-plane uniformity of the amount of etching of the substrate W. This may be because the greater number of bubble supply pipes 21 supplying the bubbles BB led to the rise of a greater number of bubbles BB in the alkaline processing liquid LQ, which reduced the concentration of dissolved oxygen.

Examples 3, 4, and 5

Examples 3 to 5 of the present disclosure will be described with reference to FIGS. 21A to 22C. In Examples 3 to 5, an approximate model of a bubble supply pipe 21 was created to simulate the production and behavior of the bubbles BB by the volume-of-fluid (VOF) method. The VOF method is for analyzing free-surface flows.

Figure 21A:
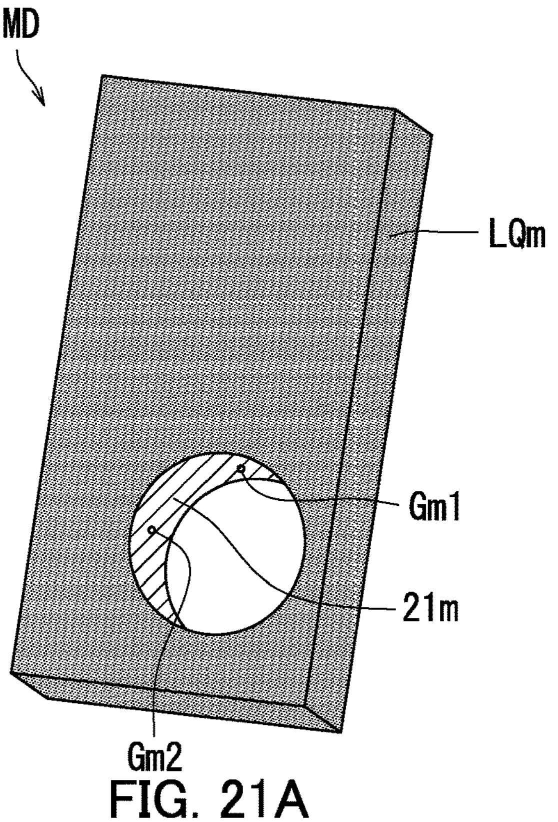
FIG. 21A is a perspective view illustrating a simulation model in Examples 3 to 5 of the present disclosure.
Figure 21B:
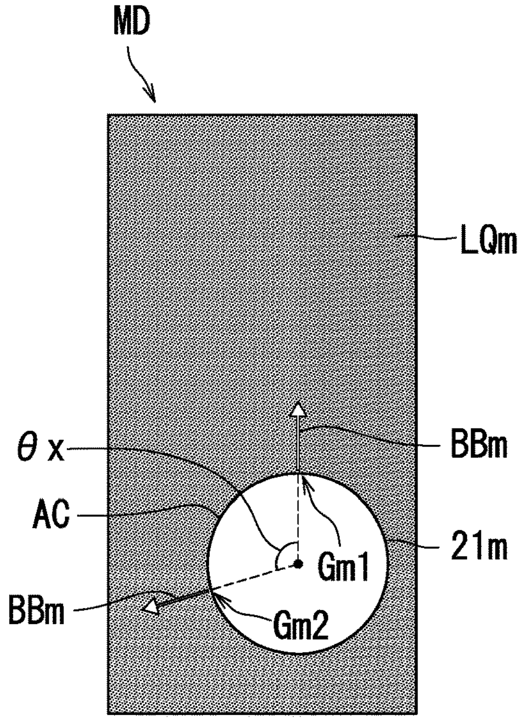
FIG. 21B is a front view illustrating the simulation model in Examples 3 to 5 of the present disclosure.

FIG. 21A is a perspective view illustrating a simulation model MD in Examples 3 to 5 of the present disclosure. FIG. 21B is a front view illustrating the simulation model MD in Examples 3 to 5 of the present disclosure.

As illustrated in FIG. 21A, the simulation model MD included a bubble supply pipe model 21*m* and an alkaline processing liquid model LQm. The bubble supply pipe model 21*m* was an approximate model of an outer wall surface of a bubble supply pipe 21. The bubble supply pipe model 21*m* did not include any thickness element of the bubble supply pipe 21. The bubble supply pipe model 21*m* is in the shape of a circular ring. The bubble supply pipe model 21*m* had a diameter of 6 mm. The bubble supply pipe model 21*m* had two bubble hole models Gm1 and Gm2. The bubble hole models Gm1 and Gm2, which are each in the shape of a circle, were an approximate model of the bubble hole G. The bubble hole models Gm1 and Gm2 each had a diameter of 0.2 mm.

As illustrated in FIG. 21B, a central angle θx of an arc AC connecting the bubble hole models Gm1 and Gm2 was 105 degrees.

The alkaline processing liquid model LQm was an approximate model of the alkaline processing liquid LQ. Specifically, the alkaline processing liquid model LQm was an approximate model of TMAH. The bubble supply pipe model 21*m* was disposed in the alkaline processing liquid model LQm.

In Examples 3 to 5, a bubble model BBm was built from the bubble hole models Gm1 and Gm2, and the production and behavior of the bubbles BB were simulated. The bubble model BBm was an approximate model of the nitrogen bubbles BB. The flow rate of nitrogen for building the bubble model BBm indicating the bubbles BB was set to 17 m/s.

Figure 22A:
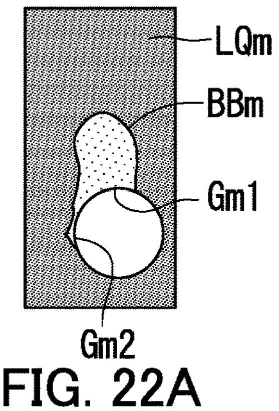
FIG. 22A is a diagram illustrating the result of simulation in Example 3.

FIG. 22A is a diagram illustrating the result of the simulation in Example 3. FIG. 22A illustrates a state in which 0.95 seconds had passed since the building start of the bubble model BBm.

As illustrated in FIG. 22A, in Example 3, the bubble supply pipe model 21*m* was hydrophobic. Specifically, the contact angle θb2 (FIG. 12B) of the bubble supply pipe model 21*m* with respect to the alkaline processing liquid model LQm was set to 110 degrees. In other words, the contact angle θb2 of the bubble supply pipe 21 was set to 110 degrees, and the production and behavior of the bubbles BB were simulated.

In Example 3, the bubble model BBm supplied from the bubble hole model Gm1 and the bubble model BBm supplied from the bubble hole model Gm2 joined together at the surface of the bubble supply pipe model 21*m*, to build a single bubble model BBm. Although in the simulation of Example 3, the bubble hole models Gm1 and Gm2, which were arranged in a circumferential direction of the bubble supply pipe model 21*m*, were used, it can be inferred that the bubble supply pipe 21 having bubble holes G arranged in the first direction D10 (FIG. 5) provides similar production and behavior of the bubbles BB. Therefore, according to Example 3, it can be inferred that if the bubble supply pipe 21 is hydrophobic, bubbles BB supplied from adjacent bubble holes G (FIG. 5) are likely to join together on the outer wall surface of the bubble supply pipe 21 in the alkaline processing liquid LQ.

Figure 22B:
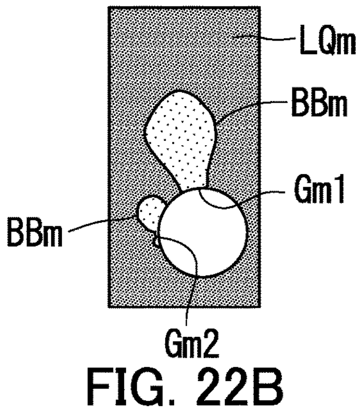
FIG. 22B is a diagram illustrating the result of simulation in Example 4.

FIG. 22B is a diagram illustrating the result of the simulation in Example 4. FIG. 22B illustrates a state in which 0.95 seconds had passed since the building start of the bubble model BBm.

As illustrated in FIG. 22B, in Example 4, the bubble supply pipe model 21*m* was hydrophilic. Specifically, the contact angle θa2 of the bubble supply pipe model 21*m* with respect to the alkaline processing liquid model LQm was set to 80 degrees (FIG. 11B). Specifically, the contact angle θa2 of the bubble supply pipe 21 was set to 80 degrees, and the production and behavior of the bubbles BB were simulated.

In Example 4, the bubble model BBm supplied from the bubble hole model Gm1 was kept separate from the bubble model BBm supplied from the bubble hole model Gm2 on the surface of the bubble supply pipe model 21*m*. Although in the simulation of Example 4, the bubble hole models Gm1 and Gm2 were arranged in the circumferential direction of the bubble supply pipe model 21*m*, it can be inferred that the bubble supply pipe 21 having bubble holes G arranged in the first direction D10 (FIG. 5) provides similar production and behavior of the bubbles BB. Therefore, according to Example 4, if the bubble supply pipe 21 is hydrophilic, bubbles BB supplied from adjacent bubble holes G (FIG. 5) are likely to be kept separate from each other on the outer wall surface of the bubble supply pipe 21 in the alkaline processing liquid LQ. Thus, it can be inferred that the bubbles BB are more likely to be kept separate from each other on the outer wall surface of the bubble supply pipe 21 in the alkaline processing liquid LQ when the bubble supply pipe 21 is hydrophilic than when the bubble supply pipe 21 is hydrophobic. Therefore, it can be inferred that a large number of bubbles BB supplied from the plurality of bubble holes G have a smaller average volume (size) when the bubble supply pipe 21 is hydrophilic than when the bubble supply pipe 21 is hydrophobic.

Figure 22C:
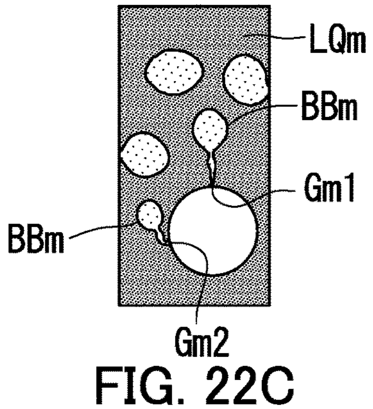
FIG. 22C is a diagram illustrating the result of simulation in Example 5.

FIG. 22C is a diagram illustrating the result of the simulation in Example 5. FIG. 22C illustrates a state in which 0.95 seconds had passed since the building start of the bubble model BBm.

As illustrated in FIG. 22C, in Example 5, the bubble supply pipe model 21*m* was hydrophilic. Specifically, the contact angle θa2 of the bubble supply pipe model 21*m* with respect to the alkaline processing liquid model LQm was set to 10 degrees (FIG. 11B). Specifically, the contact angle θa2 of the bubble supply pipe 21 was set to 10 degrees, and the production and behavior of the bubbles BB were simulated.

In Example 5, the bubble model BBm supplied from the bubble hole model Gm1 was kept separate from the bubble model BBm supplied from the bubble hole model Gm2 on the surface of the bubble supply pipe model 21*m*. The distance between the bubble model BBm supplied from the bubble hole model Gm1 and the bubble model BBm supplied from the bubble hole model Gm2 was greater in Example 5 than in Example 4. In addition, the volume (size) of the bubble model BBm was smaller in Example 5 than in Example 4. Although in the simulation of Example 5, the bubble hole models Gm1 and Gm2, which were arranged in a circumferential direction of the bubble supply pipe model 21*m*, were used, it can be inferred that the bubble supply pipe 21 having bubble holes G arranged in the first direction D10 (FIG. 5) provides similar production and behavior of the bubbles BB. Therefore, according to Example 5, it can be inferred that a smaller contact angle θa2 of a hydrophilic bubble supply pipe 21 is more likely to keep bubbles BB supplied from adjacent bubble holes G (FIG. 5) separate from each other on the outer wall surface of the bubble supply pipe 21 in the alkaline processing liquid LQ. As a result, according to Example 5, it can be inferred that a smaller contact angle θa2 of the hydrophilic bubble supply pipe 21 allows production of a large number of bubbles BB having a smaller average volume (size) from the plurality of bubble holes G.

In the foregoing, some embodiments of the present disclosure have been described. It should be noted that the present disclosure is not limited to the above embodiments, and can be carried out in various embodiments without departing the scope and spirit thereof. Modifications and changes may be made, as appropriate, to the components disclosed in the above embodiments. For example, some of all components disclosed in an embodiment may be added to the components of another embodiment, or may be removed.

The drawings mainly illustrate the components schematically for ease of understanding. The thicknesses, lengths, numbers, spaces, etc., of the components shown are not to scale for the sake of convenience of illustration. The configurations and arrangements of the components illustrated in the above embodiments are only for illustrative purposes and are not particularly limited, and may be changed and modified without substantially departing the advantages of the present disclosure.

What is claimed is:

1. A substrate processing method that is executed by a substrate processing apparatus including a processing tank and a plurality of bubble supply pipes disposed in the processing tank, the method comprising:

immersing a substrate in an alkaline processing liquid stored in the processing tank;

supplying bubbles to the alkaline processing liquid from below the substrate with the substrate immersed in the alkaline processing liquid, the bubbles being supplied from a plurality of bubble holes provided in each of the plurality of bubble supply pipes; and adjusting the bubbles for each of the plurality of bubble supply pipes; wherein the supplying bubbles includes supplying a gas to each of the plurality of bubble supply pipes separately to supply the bubbles from the bubble holes to the alkaline processing liquid, and the adjusting the bubbles includes controlling a control condition for each of the bubble supply pipes, based on a distribution of a physical quantity indicating a processing amount of the substrate before immersion of the substrate in the alkaline processing liquid, so as to adjust a distribution of the bubbles on a surface of the substrate.

2. The substrate processing method according to claim 1, wherein the substrate processing apparatus further includes a plate disposed below at least one bubble supply pipe from the plurality bubble supply pipes inside the processing tank, and the method further includes introducing an alkaline processing liquid into the processing tank, upward from a plurality of processing liquid holes provided in the plate, with the alkaline processing liquid stored in the processing tank.

3. The substrate processing method according to claim 1, wherein the control condition includes at least one of a flow rate of the gas, a timing of supply of the gas, and a duration of supply of the gas.

4. The substrate processing method according to claim 1, wherein the bubble supply pipe has a hydrophilic property.

5. The substrate processing method according to claim 4, wherein a material for the bubble supply pipe is quartz or polyether ether ketone.

6. A substrate processing method that is executed by a substrate processing apparatus including a processing tank and a plurality of bubble supply pipes disposed in the processing tank, the method comprising:

immersing a substrate in an alkaline processing liquid stored in the processing tank;

supplying bubbles to the alkaline processing liquid from below the substrate with the substrate immersed in the alkaline processing liquid, the bubbles being supplied from a plurality of bubble holes provided in each of the plurality of bubble supply pipes; and adjusting the bubbles for each of the plurality of bubble supply pipes; wherein the supplying bubbles includes supplying a gas to each of the bubble supply pipes separately to supply the bubbles from the bubble holes to the alkaline processing liquid, the adjusting the bubbles includes adjusting the bubbles for each of the bubble supply pipes using a trained model built by being trained with training data, the training data includes pre-immersion processing information and post-immersion processing information, the pre-immersion processing information indicates a distribution of a physical quantity indicating a processing amount of a learning target substrate before immersion in the alkaline processing liquid, the post-immersion processing information indicates a distribution of the physical quantity indicating the processing amount of the learning target substrate after immersion in the alkaline processing liquid and pulling up from the alkaline processing liquid, the training data further includes at least one of flow rate information indicating a flow rate of the gas, timing information indicating a timing of supply of the gas, and duration information indicating a duration of supply of the gas, in a case where the learning target substrate is immersed in the alkaline processing liquid, the adjusting the bubbles includes inputting input information to the trained model to obtain output information from the trained model, the input information includes information about a distribution of a physical quantity indicating a processing amount of the substrate before immersion in the alkaline processing liquid, the output information includes information indicating a control condition, the control condition includes at least one of a flow rate of the gas, a timing of supply of the gas, and a duration of supply of the gas, in a case where immersion of the substrate is immersed in the alkaline processing liquid, and the adjusting the bubbles includes controlling the control condition for each of the bubble supply pipes based on the output information to adjust a distribution of the bubbles on a surface of the substrate.

7. A substrate processing method that is executed by a substrate processing apparatus including a processing tank and a plurality of bubble supply pipes disposed in the processing tank, the method comprising:

immersing a substrate in an alkaline processing liquid stored in the processing tank;

supplying bubbles to the alkaline processing liquid from below the substrate with the substrate immersed in the alkaline processing liquid, the bubbles being supplied from a plurality of bubble holes provided in each of the plurality of bubble supply pipes; and adjusting the bubbles for each of the plurality of bubble supply pipes; wherein the supplying the bubbles includes supplying a gas to each of the bubble supply pipes separately to supply the bubbles from the bubble holes to the alkaline processing liquid, the adjusting the bubbles includes adjusting the bubbles for each of the bubble supply pipes using a trained model built by being trained with training data, the training data includes pre-immersion processing information and post-immersion processing information, the pre-immersion processing information indicates a distribution of a physical quantity indicating a processing amount of a learning target substrate before immersion in the alkaline processing liquid, the post-immersion processing information indicates a distribution of the physical quantity indicating the processing amount of the learning target substrate after immersion in the alkaline processing liquid and pulling up from the alkaline processing liquid, the training data further includes at least one of flow rate information indicating a flow rate of the gas, timing information indicating a timing of supply of the gas, and duration information indicating a duration of supply of the gas, in a case where the learning target substrate is immersed in the alkaline processing liquid, the adjusting the bubbles includes inputting input information to the trained model to obtain output information from the trained model, the input information includes information about a distribution of a physical quantity indicating a processing amount of the substrate before immersion in the alkaline processing liquid, and information indicating a control condition, the control condition includes at least one of a flow rate of the gas, a timing of supply of the gas, and a duration of supply of the gas, in a case where the substrate is immersed in the alkaline processing liquid, the output information includes information indicating a result of clustering of the input information, and the adjusting the bubbles includes controlling the control condition for each of the bubble supply pipes based on the output information to adjust a distribution of the bubbles on a surface of the substrate.

8. A substrate processing apparatus comprising:

a processing tank configured to store an alkaline processing liquid;

a substrate holding section configured to hold a substrate, and immerse the substrate in the alkaline processing liquid stored in the processing tank;

a plurality of bubble supply pipes each having a plurality of bubble holes and disposed in the processing tank, and configured to supply bubbles to the alkaline processing liquid from below the substrate with the substrate immersed in the alkaline processing liquid, the bubbles being supplied from the plurality of bubble holes;

a bubble adjustment section configured to adjust the bubbles for each of the bubble supply pipes; and a controller; wherein the bubble adjustment section supplies a gas to each of the bubble supply pipes separately to supply the bubbles from the bubble holes to the alkaline processing liquid, the controller is configured to control the bubble adjustment section to control a control condition for adjusting the bubbles for each of the bubble supply pipes, and the controller is configured to control the control condition for each of the bubble supply pipes based on a distribution of a physical quantity indicating a processing amount of the substrate before immersion in the alkaline processing liquid to adjust a distribution of the bubbles on a surface of the substrate.

9. The substrate processing apparatus according to claim 8, further comprising, a processing liquid introduction section disposed below the bubble supply pipe inside the processing tank; wherein the processing liquid introduction section includes a plate having a plurality of processing liquid holes, and the processing liquid introduction section introduces an alkaline processing liquid into the processing tank, upward from the plurality of processing liquid holes, with the alkaline processing liquid stored in the processing tank.

10. The substrate processing apparatus according to claim 8, wherein the control condition includes at least one of a flow rate of the gas, a timing of supply of the gas, and a duration of supply of the gas.

11. The substrate processing apparatus according to claim 8, wherein the bubble supply pipe has a hydrophilic property.

12. The substrate processing apparatus according to claim 11, wherein a material for the bubble supply pipe is quartz or polyether ether ketone.

13. A substrate processing apparatus comprising:

a processing tank configured to store an alkaline processing liquid;

a substrate holding section configured to hold a substrate, and immerse the substrate in the alkaline processing liquid stored in the processing tank;

a plurality of bubble supply pipes each having a plurality of bubble holes and disposed in the processing tank, and configured to supply bubbles to the alkaline processing liquid from below the substrate with the substrate immersed in the alkaline processing liquid, the bubbles being supplied from the plurality of bubble holes;

a bubble adjustment section configured to adjust the bubbles for each of the bubble supply pipes;

storage configured to store a trained model built by being trained with training data; and a controller configured to control the storage and configured to input information into the trained model, wherein the bubble adjustment section supplies a gas to each of the bubble supply pipes separately to supply the bubbles from the bubble holes to the alkaline processing liquid, the training data includes pre-immersion processing information and post-immersion processing information, the pre-immersion processing information indicates a distribution of a physical quantity indicating a processing amount of a learning target substrate before immersion in the alkaline processing liquid, the post-immersion processing information indicates a distribution of the physical quantity indicating the processing amount of the learning target substrate after immersion in the alkaline processing liquid and pulling up from the alkaline processing liquid, the training data further includes at least one of flow rate information indicating a flow rate of the gas, timing information indicating a timing of supply of the gas, and duration information indicating a duration of supply of the gas, during immersion of the learning target substrate in the alkaline processing liquid, the controller is configured to input information to the trained model to obtain output information from the trained model, the input information includes information about a distribution of a physical quantity indicating a processing amount of the substrate before immersion in the alkaline processing liquid, the output information includes information indicating a control condition, the control condition includes at least one of a flow rate of the gas, a timing of supply of the gas, and a duration of supply of the gas, during immersion of the substrate in the alkaline processing liquid, and the controller is configured to control the control condition for each of the bubble supply pipes based on the output information to adjust a distribution of the bubbles on a surface of the substrate.

14. A substrate processing apparatus comprising:

a processing tank configured to store an alkaline processing liquid;

a substrate holding section configured to hold a substrate, and immerse the substrate in the alkaline processing liquid stored in the processing tank;

a plurality of bubble supply pipes each having a plurality of bubble holes and disposed in the processing tank, and configured to supply bubbles to the alkaline processing liquid from below the substrate with the substrate immersed in the alkaline processing liquid, the bubbles being supplied from the plurality of bubble holes;

a bubble adjustment section configured to adjust the bubbles for each of the bubble supply pipes;

storage configured to store a trained model built by being trained with training data; and a controller configured to control the storage, wherein the bubble adjustment section supplies a gas to each of the bubble supply pipes separately to supply the bubbles from the bubble holes to the alkaline processing liquid, the training data includes pre-immersion processing information and post-immersion processing information, the pre-immersion processing information indicates a distribution of a physical quantity indicating a processing amount of a learning target substrate before immersion in the alkaline processing liquid, the post-immersion processing information indicates a distribution of the physical quantity indicating the processing amount of the learning target substrate after immersion in the alkaline processing liquid and pulling up from the alkaline processing liquid, the training data further includes at least one of flow rate information indicating a flow rate of the gas, timing information indicating a timing of supply of the gas, and duration information indicating a duration of supply of the gas, in a case where the learning target substrate is immersed in the alkaline processing liquid, the controller is configured to input information to the trained model to obtain output information from the trained model, the input information includes information about a distribution of a physical quantity indicating a processing amount of the substrate before immersion in the alkaline processing liquid, and information indicating a control condition, the control condition includes at least one of a flow rate of the gas, a timing of supply of the gas, and a duration of supply of the gas, during immersion of the substrate in the alkaline processing liquid, the output information includes information indicating a result of clustering of the input information, and the controller is configured to control the control condition for each of the bubble supply pipes based on the output information to adjust a distribution of the bubbles on a surface of the substrate.

15. A substrate processing apparatus comprising:

a processing tank configured to store an alkaline processing liquid;

a substrate holding section configured to hold a substrate, and immerse the substrate in the alkaline processing liquid stored in the processing tank; and a bubble supply pipe having a plurality of bubble holes and disposed in the processing tank, and configured to supply bubbles to the alkaline processing liquid from below the substrate with the substrate immersed in the alkaline processing liquid, the bubbles being supplied from the plurality of bubble holes; wherein the substrate holding section holds a plurality of the substrates with the substrates spaced apart in a predetermined direction, the bubble supply pipe extends in the predetermined direction, in the bubble supply pipe, the plurality of bubble holes are arranged and spaced apart in the predetermined direction, an array of the plurality of substrates includes a plurality of clearances, each of the plurality of clearances is a space between adjacent ones of the substrates in the predetermined direction, the plurality of bubble holes include a plurality of first bubble holes disposed outward in the predetermined direction of one of the plurality of substrates disposed at one end in the predetermined direction, a plurality of second bubble holes disposed outward in the predetermined direction of one of the plurality of substrates disposed at the other end in the predetermined direction, and a plurality of third bubble holes disposed, corresponding to the plurality of clearances, respectively, there are more first bubble holes than third bubble holes, and there are more second bubble holes than third bubble holes.

* * * * *